US011432695B2

(12) United States Patent
Jang et al.

(10) Patent No.: US 11,432,695 B2
(45) Date of Patent: Sep. 6, 2022

(54) MOBILE ROBOT

(71) Applicant: LG ELECTRONICS INC., Seoul (KR)

(72) Inventors: Jaewon Jang, Seoul (KR); Youngbin Kim, Seoul (KR); Yeongjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 210 days.

(21) Appl. No.: 16/943,064

(22) Filed: Jul. 30, 2020

(65) Prior Publication Data
US 2021/0030230 A1 Feb. 4, 2021

(30) Foreign Application Priority Data

Jul. 31, 2019 (KR) .................. 10-2019-0093485
Dec. 27, 2019 (KR) .................. 10-2019-0176628

(51) Int. Cl.
*A47L 11/283* (2006.01)
*A47L 11/40* (2006.01)
*B25J 11/00* (2006.01)

(52) U.S. Cl.
CPC ......... *A47L 11/283* (2013.01); *A47L 11/4038* (2013.01); *A47L 11/4069* (2013.01); *A47L 11/4083* (2013.01); *A47L 11/4088* (2013.01); *B25J 11/0085* (2013.01)

(58) Field of Classification Search
CPC ............... A47L 11/283; A47L 11/4038; A47L 11/4069; A47L 11/4083; A47L 11/4088; A47L 2201/00
See application file for complete search history.

(56) References Cited

U.S. PATENT DOCUMENTS 3,183,542 A * 5/1965 Anders ............... A47L 11/4038
15/98
8,887,348 B2 * 11/2014 Kenter ............... A47L 11/4075
15/98
2016/0367099 A1 12/2016 Yan

FOREIGN PATENT DOCUMENTS

| EP | 2888980 A1 | 7/2015 |
|---|---|---|
| KR | 20-0148062 | 6/1999 |
| KR | 10-2005-0012047 | 1/2005 |

(Continued)

OTHER PUBLICATIONS

PCT International Search Report for Application No. PCT/KR2020/001342, dated May 27, 2020 (3 pages).

(Continued)

*Primary Examiner* — Randall E Chin
(74) *Attorney, Agent, or Firm* — Birch, Stewart, Kolasch & Birch, LLP

(57) ABSTRACT

Disclosed is a mobile robot including a body, a rotating plate rotatably installed on the body and having a lower surface where a mop portion is attached, and an attachment guider installed on the lower surface of the rotating plate to guide an attachment position of the mop portion. The attachment guider includes a guide rim and a plurality of elastic pieces. The guide rim is disposed to surround a rotation axis of the rotating plate. The plurality of elastic pieces extend from the guide rim in a direction toward the rotation axis, have a free end protruding to a lower side or downward than the guide rim, and are spaced apart from each other along a circumference of the guide rim.

20 Claims, 39 Drawing Sheets

(56) References Cited

FOREIGN PATENT DOCUMENTS

| KR | 20-2017-0002133 | 6/2017 |
| KR | 10-2018-0105109 | 9/2018 |
| KR | 10-2019-0015932 | 2/2019 |

OTHER PUBLICATIONS

European Search Report for European Patent Application No. 20188700.7, dated Jan. 12, 2021 (5 pages).

\* cited by examiner

MOBILE ROBOT

TECHNICAL FIELD

The present disclosure relates to a mobile robot configured to mop a surface.

BACKGROUND

A mobile robot is a device that cleans a floor by inhaling a foreign material such as a dust on the floor or wiping a foreign material on the floor. Recently, a mobile robot capable of mopping a floor has been developed. In addition, a robot cleaner is a device that cleans while driving or traveling on its own.

Korean Patent Publication No. 10-802790 (KR'790) discloses a robot cleaner capable of moving by a mop surface. The robot cleaner of KR'790 is provided with a first rotating member and a second rotating member fixing a pair of mop surfaces and arranged in a left-right direction. The first rotating member and the second rotating member are inclined downward toward an outside with respect to axes in an up-down direction or a vertical direction. The robot cleaner of KR'790 moves as the first rotating member and the second rotating member rotate in a state that only the mop surfaces fixed to the first rotating member and the second rotating member are in contact with the floor.

In the robot cleaner of KR'790, an alignment mark or the like to guide an exact location of a mop is not used when the mop is attached to and is separated from the rotating member. Therefore, a user approximately or roughly aligns and attaches a mop by eye. In this instance, if the mop is attached at a position out of its original position, interference between mops attached to two rotating members may occur. Accordingly, the robot cleaner may not move even when the two rotating members rotates, a floor is not mopped because a part of the mop may be spaced from the floor, and the rotating member may be damaged due to the interference between the mops.

Since some conventional robot cleaners proceed only by friction force of spin mops and a water level of stored water in a water tank is variable, it may be difficult to effectively mop a floor and driving power may be not sufficient.

Particularly, it may be very difficult for the conventional wet-type robot to adjust a traveling direction by friction force with rotating mops. According, cleaning is performed only by a random driving, and cleaning by a pattern driving being able to meticulously clean is not possible.

Further, in the conventional art, since the cleaning is possible only by the random driving, meticulous cleaning at a corner of a floor or an area adjacent to a wall may be difficult.

SUMMARY

Firstly, the present disclosure is for providing a mobile robot being able to allow a user to visually recognize an attachment position of a mop portion when the mop portion is attached in a state that a body is turned over and to recognize an attachment position of a mop portion by tactile sense or so on using a finger of a user when the mop portion is attached in a state that a body is not turned over.

Secondly, the present disclosure is for providing a mobile robot being able to move a mop portion close to its original position through a deformation of an attachment guider for guiding the mop portion by self-load or tare weight of the mobile robot, even when the mop portion is attached at a position out of the original position.

Thirdly, the present disclosure is for providing a mobile robot being able to make an entire portion of a mop portion be in contact with a floor even when the mop portion is attached at a position out of its original position. Specifically, if the mop portion is attached at the position out of the original position, an attachment guider is deformed when cleaning is performed and a partial area of the mop portion protrudes by a height of the attachment guider, and thus, the entire portion of the mop portion can be in contact with the floor.

Fourthly, the present disclosure is for providing a mobile robot being able to increase friction between a mop portion and a floor for effective mopping and driving of the mobile robot.

Since the conventional robot cleaner moves by a pair of rotating mop surfaces at a left side and a right side, friction force generated by the pair of rotating mop surfaces may be frequently changed and thus a straight driving may be difficult. Since the straight driving is difficult, the conventional robot cleaner may pass an area where the straight driving is necessary, such as, an area adjacent to a wall or so on, without mopping a floor. Thus, an area where the mopping is not performed may increase. Accordingly, fifthly, the present disclosure is for providing a mobile robot being able to solve this problem.

Sixthly, the present disclosure is for providing a device being able to perform both of dry-type cleaning and wet-type cleaning and thus to perform clean and efficient mopping.

When a body of a cleaner has a circular shape or a shape close to a circular shape, rotation in place is easy. When the rotation in place is easy, a cleaner can easily escape from an obstacle area or a corner. However, when the body of the cleaner has the circular shape, a width of an agitator is limited to be smaller than a diameter of the body so that the agitator is not disturbed by an obstacle during the body rotates. Accordingly, seventhly, the present disclosure is for providing a cleaner being able to maximize a width of an agitator in a state that the agitator does not protrude from a body by disposing a storage space that stores a foreign material collected from the agitator at a front side than the agitator. Therefore, a size of an area to be cleaned at once is not reduced. In this instance, the cleaner according to the present disclosure makes rotation of the body easy by limiting the width of the agitator to be smaller than a diameter of the body.

Eighthly, the present disclosure is for providing a cleaner being able to make rotation of a body easy by a circular shape of the body. In this instance, the cleaner according to the present disclosure can reduce friction between an obstacle and spin mops, make rotation of the body easy, and maximize a size of an area to be cleaned at once when the body rotates by disposing rotation axes of a pair of spin mops to be eccentrical or deviated from a center of the body and disposing a part of each spin mop to be overlapped with the body vertically.

The present disclosure is also for providing a robot cleaner or a mobile robot being able to increase friction force between a mop and a floor regardless of a water-level change in a water tank for effective mopping and traveling and to perform a pattern driving that allows meticulous cleaning through accurate driving.

To solve the problems, a mobile robot according to the present disclosure includes an attachment guider for guiding an attachment of a mop portion to a rotating plate.

More particularly, a mobile robot according to the present disclosure includes a body, a rotating plate rotatably installed on the body and having a lower surface where a mop portion is attached, and an attachment guider installed on the lower surface of the rotating plate to guide an attachment position of the mop portion. The attachment guider includes a guide rim and an elastic piece. The guide rim is disposed to surround an extension line of a rotation axis of the rotating plate. The elastic piece extends from the guide rim in a direction toward an inner side of the guide rim, and one end of the elastic piece is positioned at a lower side than the guide rim.

The elastic piece may have or provide elastic restoring force to a lower side or downside.

The elastic piece may have a free end disposed to be spaced apart from the extension line of the rotation axis.

The elastic piece may include a plurality of elastic pieces. Free ends of the plurality of elastic pieces may form a part of a circular orbit having a center at the extension line of the rotation axis.

A width of the elastic piece may increase as it approaches the guide rim.

The elastic piece may include a first portion, a second portion, and a third portion. The first portion may have one end connected to an inner circumference of the guide rim and have a first slope. The second portion may have one end connected to the other end of the first portion and have a second slope greater than the first slope. The third portion may have one end connected to the other end of the second portion and the other end formed of a free end, and may have a slope smaller than the second slope.

The second slope of the second portion may increase as it approaches the rotation axis.

The other end of the third portion may be positioned at a lower side than the other end of the second portion. The other end of the second portion may be positioned at a lower side than the other end of the first portion.

The other end of the first portion may be disposed at a lower side than the guide rim.

A length of the elastic piece may be greater than a maximum width of the elastic piece.

The elastic piece includes a plurality of elastic pieces. The plurality of elastic pieces may be spaced apart from each other at regular intervals.

The elastic piece may form a downward slope in a direction toward a center of the guide rim.

The attachment guider may include a metal material.

Also, the lower surface of the rotating plate may include a receiving groove recessed to an upper side, accommodating the attachment guider, and exposing a lower portion of the attachment guider.

Further, the mobile robot according to the present disclosure may further include the mop portion attached to the lower surface of the rotating plate and having a guide hole where a part of the attachment guider is inserted at a center of the mop portion.

In addition, the mobile robot according to the present disclosure may further include a water supply module for supplying water to the mop portion.

In addition, the mobile robot according to the present disclosure may further include a mop motor for providing rotational force to the rotating plate.

The rotating plate may include a left rotating plate and a right rotating plate spaced apart from the left rotating plate. A lower surface of the left rotating plate may form a downward slope toward a left front side, and a lower surface of the right rotating plate may form a downward slope toward a right front side.

In addition, the mobile robot according to the present disclosure may further include a sweep module. The sweep module may include a collection portion forming a collection space for storing a foreign material, a sweeping portion rotating to introduce the foreign material into the collection space, and a sweeping motor providing driving force to the sweeping portion.

In addition, a mobile robot according to the present disclosure includes a body, a rotating plate rotatably installed on the body and having a lower surface where a mop portion is attached, and an attachment guider installed on the lower surface of the rotating plate to guide an attachment position of the mop portion. The attachment guider includes a guide rim and a plurality of elastic pieces. The guide rim is disposed to surround an extension line of a rotation axis of the rotating plate. The plurality of elastic pieces extend from the guide rim in a direction toward the rotation axis and form a downward slope in a direction toward the rotation axis.

According to the present disclosure, an attachment guider is disposed at a rotating plate to allow a user to visually recognize an attachment position of a mop portion.

According to the present disclosure, an attachment guider includes a plurality of elastic pieces inclined to a lower side or downward in a direction toward a rotation axis. Thus, even when a mop portion is attached by a user at a position out of its original position, a mop portion is moved by elastic force of the plurality of elastic pieces to be close to the original position. Accordingly, even when a user incorrectly attaches a mop portion, a mobile robot can operate normally and damage to the mobile robot can be prevented.

According to the present disclosure, an attachment guider includes a plurality of elastic pieces inclined to a lower side or downward in a direction toward a rotation axis. Thus, even when a mop portion is attached by a user at a position out of its original position and thus a part of the mop portion is protruded, a height of a bottom surface of the mop portion is adjusted uniformly by elastic deformation of the plurality of elastic pieces. Accordingly, even when a user incorrectly attaches a mop portion, a mobile robot can mop a floor.

In addition, according to the present disclosure, mopping efficiency can be enhanced since a mobile robot is supported by a mop module.

Further, according to the present disclosure, stability of a mobile robot in a left-right direction can be secured by a pair of spin mops arranged in a left-right direction. Also, a sweep module spaced apart from a mop module in a front-rear direction are in contact with a floor by an auxiliary wheel, thereby stability of a mobile robot in a front-rear direction can be also increased.

In addition, according to the present disclosure, a sweep module provides friction force against shaking of a mop module in a left-right direction, and thus, a mobile robot can move straight while moving due to the friction force of the mop surface.

In addition, a pair of collection portions where foreign materials are accommodated are provided to be bisymmetrical or bilateral-symmetrical to each other with respect to an imaginary central vertical plane, which is a reference plane in which a pair of spin mops are bisymmetrical or bilateral-symmetrical to each other, thereby achieving an accurate driving control by the pair of spin mops at a left side and a right side and preventing an unexpected eccentric movement.

In addition, according to the present disclosure, a body has a circular shape and a dry-type module does not protrude to an outside of the body. Accordingly, a mobile robot can be freely rotated at any position in a cleaning area and an agitator can have a sufficiently large width. Therefore, a cleaning range can be wide, and collecting a foreign material having a relatively large size and then mopping a floor can be operated.

DETAILED DESCRIPTION

Figure 1:
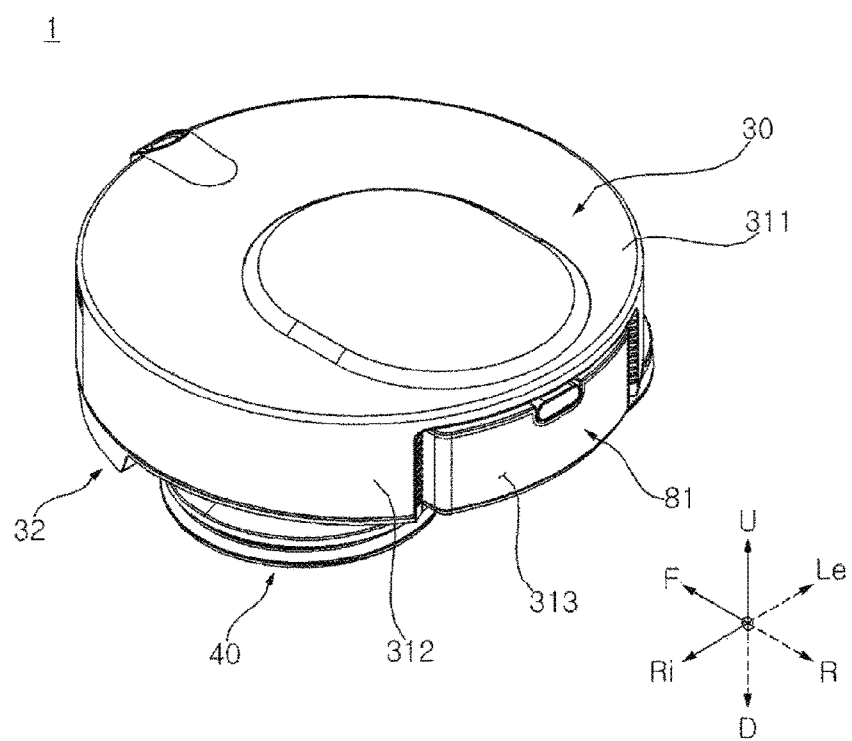
FIG. 1 is a perspective view of a mobile robot according to a first embodiment of the present disclosure.
Figure 2:
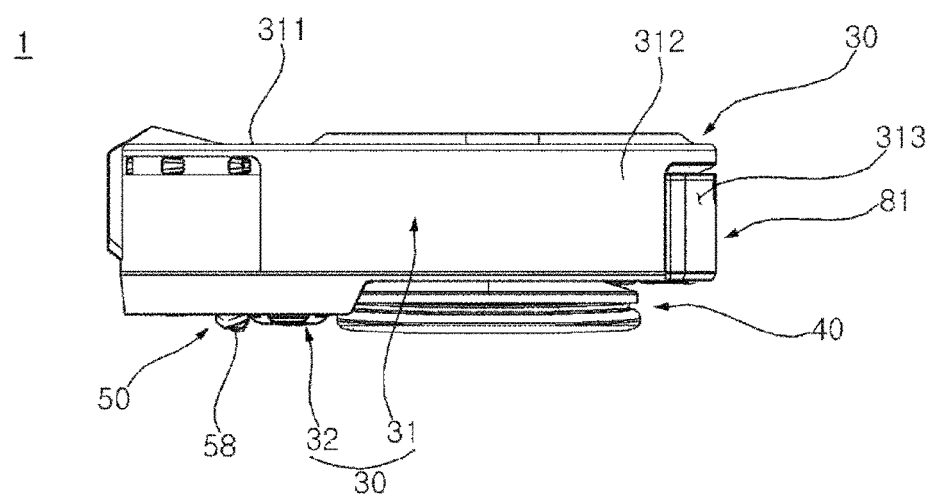
FIG. 2 is a left side view of the mobile robot shown in FIG. 1.
Figure 3:
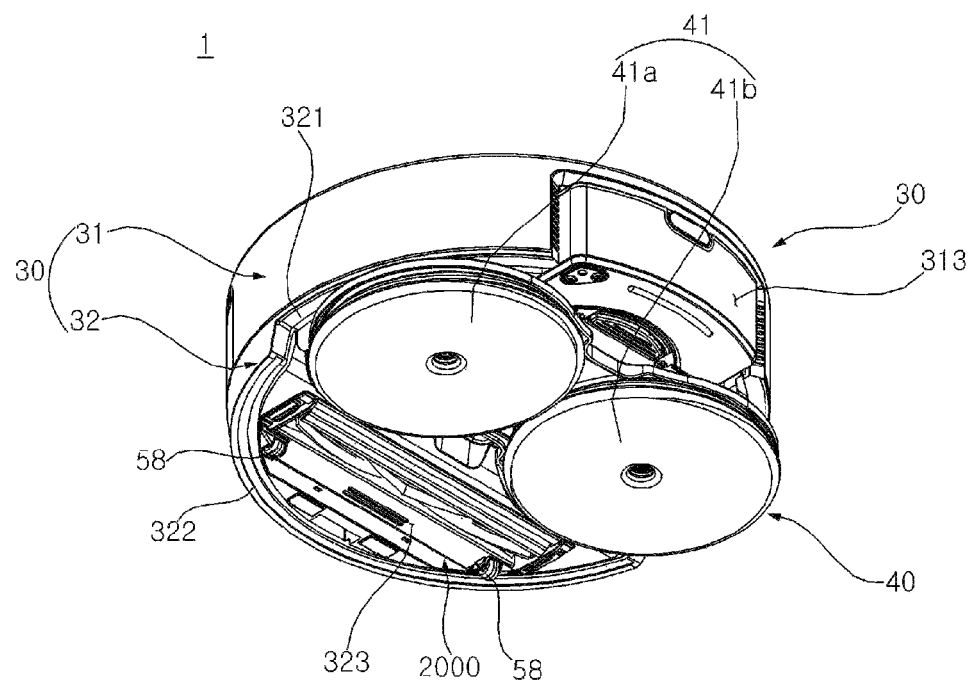
FIG. 3 is a bottom perspective view of the mobile robot shown in FIG. 1.
Figure 4:
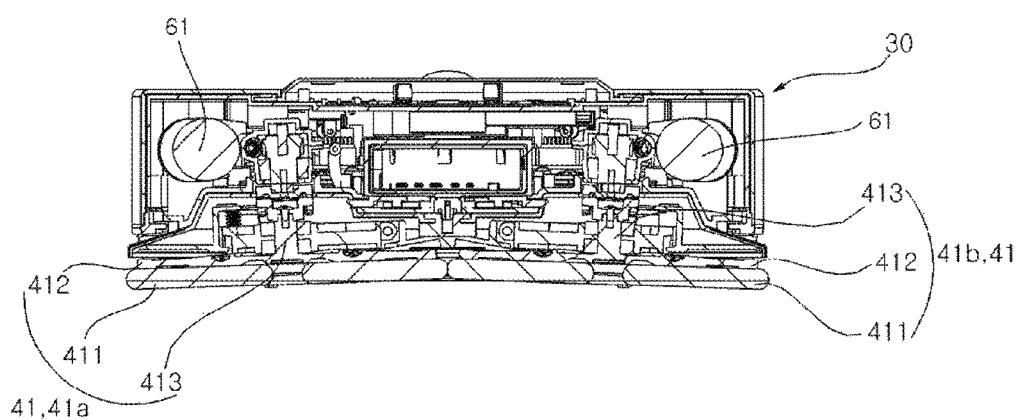
FIG. 4 is a front cross-sectional view of the mobile robot shown in FIG. 1.
Figure 5:
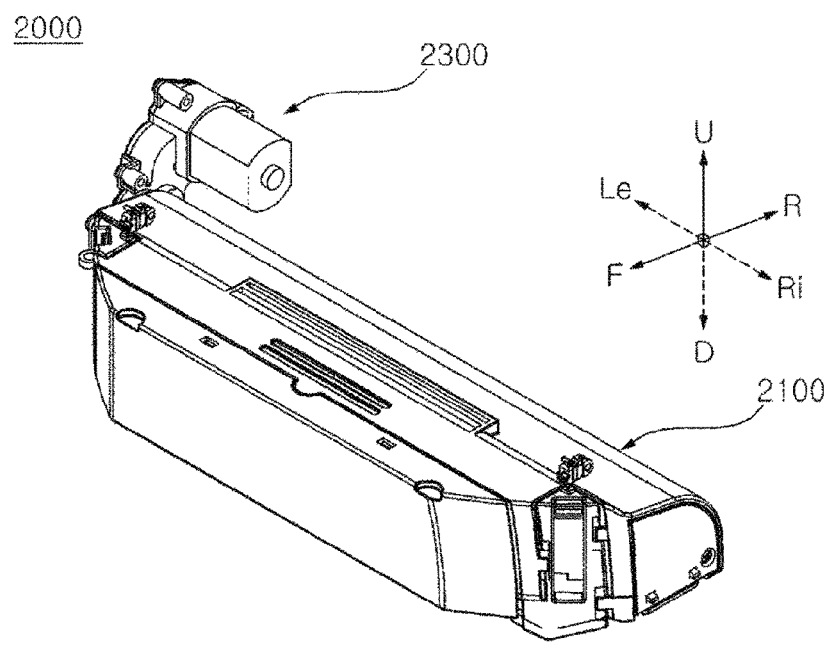
FIG. 5 is a perspective view of a sweep module shown in FIG. 3.

Expressions referring to directions such as a front direction (a frontward direction or a forward direction) (F), a rear direction (a rearward direction) (R), a left direction (a leftward direction) (Le), a right direction (a rightward direction) (Ri), an upper direction (an up direction or an upward direction) (U), and a down direction (an downward direction) (D), or so on may be defined as indicated in the drawings. This is just for explaining the present disclosure to be clearly understood. Therefore, directions may be defined differently depending on where a reference is placed.

For example, a direction parallel to an imaginary line connecting a central axis of a left spin mop and a central axis of a right spin mop may be defined as a left-right direction. A direction perpendicular to the left-right direction and parallel to the central axes of the spin mops or has an error angle within 5 degrees with the central axes of the spin mops may be defined as an up-down direction or a vertical direction. A direction perpendicular to each of the left-right direction and the up-down direction may be defined as a front-back direction or a longitudinal direction. A front direction may mean a main traveling direction of a mobile robot or a main traveling direction of a pattern traveling of a mobile robot. In this instance, the main traveling direction may mean a vector sum value of directions traveling in a predetermined time.

A term of 'first', 'second', 'third', or so on in front of a component mentioned below is only to avoid confusion between the component being referred to and other component, and does not relate to an order, an importance, or a master-servant relationship between components. For example, an embodiment only having a second component without a first component may be possible.

A term of 'a mop' or 'a mop portion' mentioned hereinafter may have any of materials such as fabric or paper, and may be a multi-use product being able to be used repeatedly through washing or a disposable product.

The present disclosure may be applied to a mobile robot manually moved by a user or a robot cleaner traveling or driving on its own. Hereinafter, an embodiment will be described based on a robot cleaner.

A cleaner 1 according to an embodiment of the present disclosure may include a body 30 having a controller. The cleaner 1 may include a mop module 40 to mop a floor (a surface to be cleaned) while being in contact with the floor. The cleaner 1 may include a sweep module 2000 provided to collect a foreign material on the floor.

The mop module 40 may be disposed at a lower side of the body 30 and may support the body 30. The sweep module 2000 may be disposed at the lower side of the body 30 and may support the body 30. In the present embodiment, the body 30 may be supported by the mop module 40 and the sweep module 2000. The body 30 may form an appearance or an exterior. The body 30 may be arranged to connect the mop module 40 and the sweep module 2000.

The mop module 40 may form an appearance or an exterior. The mop module 40 is disposed at the lower side of the body 30. The mop module 40 is disposed at a rear side of the sweep module 2000. The mop module 40 provides driving force for a movement of the cleaner 1. In order to move the cleaner 1, the mop module 40 may be preferably disposed at the rear side of the cleaner 1.

The mop module 40 may be provided with at least one mop portion 411 to mop the floor while rotating. The mop module 40 may include at least one spin mop 41, and the spin mop 41 may rotate in a clockwise direction or a counterclockwise direction when viewed from an upper side. The spin mop 41 may be in contact with the floor.

In the present embodiment, the mop module 40 may include a pair of spin mops 41a and 41b. The pair of spin mops 41a and 41b may rotate in a clockwise direction or a counterclockwise direction when viewed from an upper side, and may mop the floor through rotation. When the pair of spin mops 41a and 41b are viewed from a front side of a traveling direction of the cleaner, a spin mop disposed at a left side may be referred to as a left spin mop 41a, and a spin mop disposed at a right side may be defined as a right spin mop 41b.

Each of the left spin mop 41a and the right spin mop 41b may be rotated with respect to its rotation axis. The rotation axis may be arranged in an up-down direction. The left spin mop 41a and the right spin mop 41b may be rotated independently of each other.

Each of the left spin mop 41a and the right spin mop 41b may include a rotating plate 412 to which the mop portion 411 is attached and a spin shaft 414. Each of the left spin mop 41a and the right spin mop 41b may include a water container (a water receiving portion) 413.

The left spin mop 41a and the right spin mop 41b may be rotatably installed on a lower portion of the body 30, be in contact with a floor, and move the body 30.

Rotation axes osa and osb (see FIG. 23) of the pair of spin mops may cross a lower surface of the body and be vertically overlapped with the body. The rotation axes osa and osb of the pair of spin mops may be eccentrical or deviated from a center of the body, and a part of the left spin mop 41a and a part of the right spin mop 41b may be vertically overlapped with the body 30.

Therefore, according to the present disclosure, rotation of the body is not hindered or disturbed by a shape of the spin mop when the body rotates. That is, when a part of each spin mop is exposed to an outside of the body, the spin mop has a circular shape, and thus, friction between an obstacle and the spin mop is reduced when the body rotates. Accordingly, the rotation of the body can be easy.

That is, if entire portions of the left spin mop 41a and the right spin mop 41b overlap vertically with the body 30, rotational motion of the body 30 is easy, but an area to be cleaned at once is too small. Thus, the left spin mop 41a and the right spin mop 41b may be exposed to the outside of the body 30 to a degree that it does not disturb the rotation of the body 30, and an area to be cleaned by the left spin mop 41a and the right spin mop 41b can be maximized.

A ratio of an area where the left spin mop 41a or the right spin mop 41b is vertically overlapped with the body 30 may be preferably 85% to 95% of each spin mop. Considering a relationship with a sweep module, a position where each spin mop is exposed may be preferably positioned between a lateral side and a rear side of the body 30. A distance between a center of the body 30 and the rotation axis osa of the left spin mop 41a may be the same as a distance between the center of the body 30 and the rotation axis osb of the right spin mop 41b.

The sweep module 2000 may form an appearance or an exterior. The sweep module 2000 may be disposed at a front side of the mop module 40. In order to prevent a foreign material on the floor from first contacting the mop module 40, the sweep module 2000 may preferably disposed at the front side of the cleaner 1 in a traveling direction.

The sweep module 2000 may be spaced apart from the mop module 40. The sweep module 2000 may disposed at the front side of the mop module 40 and be in contact with the floor. The sweep module 2000 collects the foreign material on the floor.

The sweep module 2000 may be in contact with the floor and may collect the foreign material at the front side of the sweep module 2000 to an inside when the cleaner 1 moves. The sweep module 2000 may be disposed at a lower side of the body 30. A width of the sweep module 2000 in a left-right direction may be smaller than a width of the mop module 40 in the left-right direction.

The body 30 may include a case 31 forming an appearance or an exterior and a base 32 disposed at a lower side of the case 31.

The case 31 may form a side surface and an upper surface of the body 30. The base 32 may form a bottom surface of the body 30.

An outer surface of the body 30 may form at least a part of a circle having a radius having an error with a reference radius within a reference error range. In this instance, the phrase of "a circle having a radius having an error with a reference radius within a reference error range" may mean that the circle is a perfect circle, and also, that, even though the circle is not a perfect circle, the radius is within the error range at each center angle or at each region.

Specifically, when viewed from a vertical direction, 50% or more of the body 30 may form a part of a circular shape, and the remaining portion of the body 30 may have a shape close to a circular shape in consideration of coupling with other components or elements. In this instance, the circular shape may not mean a complete circle of mathematical meaning, but may mean a circle of engineering meaning with error.

In the present embodiment, the case 31 may have a cylindrical shape with an open bottom surface. When viewed in a top view, an overall shape of the case 31 may be a circular shape. Since the case 31 has a plane shape of a circular shape, a rotation radius when rotating can be minimized.

The case 31 may include an upper wall 311 having an overall shape in a circular shape, and a side wall 312 formed integrally with the upper wall 311 and extending downward from an edge of the upper wall 311.

A part of the sidewall 312 may be open. An opened portion of the side wall 312 may be defined as a water-tank insertion opening (a water-tank insertion hole or a water-tank insertion portion) 313, and a water tank 81 may be detachably installed through the water-tank insertion opening 313. The water-tank insertion opening 313 may be disposed at a rear side based on the traveling direction of the cleaner. Since the water tank 81 is inserted through the water-tank insertion opening 313, the water-tank insertion opening 313 may be preferably disposed close to the mop module 40.

The mop module 40 may be coupled to the base 32. The sweep module 2000 may be coupled to the base 32. A controller Co and a battery Bt may be disposed in an inner space formed by the case 31 and the base 32. In addition, a mop driving unit (a mop driver) 60 may be disposed on the body 30. A water supply module may be disposed at the body 30.

The base 32 may include a base body 321, a base guard 322, and an insertion hole 323. The base body 321 may cover the opened bottom surface of the case 31. The base guard 322 may be formed along an outer edge of the base body 321 and protrude downward from the edge of the base body 321. The insertion hole 323 may penetrate through the base body 321 in an up-down direction, and the sweep module 2000 may be detachably inserted into the insertion hole 323.

The sweep module 2000 may be detachably mounted or installed on the body 30 through the insertion hole 323. The sweep module 2000 may be positioned at a front side than the mop module 40 and collect a foreign material at the front side of the mop module 40. The sweep module 2000 may be detachably assembled with the base 32. The sweep module 2000 in an assembled state with the base 32 may be separated from the base 32 through a lever 2500.

An installation space 325 in which the sweep module 2000 is mounted is formed at the base 32. In the present embodiment, a storage housing 326 forming the installation space 325 may be further provided. The storage housing 326 may be assembled with the base 32 and may be disposed at an upper side of the insertion hole 323.

The storage housing 326 may protrude to an upper side from the base body 321.

A lower side of the storage housing 326 may be opened to communicate with the insertion hole 323. An interior space of the storage housing 326 provides the installation space 325. The installation space 325 of the storage housing 326 corresponds to a shape of the sweep module 2000.

The sweep module 2000 may include a dust housing 2100, an agitator 2200, a driving unit 2300, a driving coupling 2320, a driven coupling 2220, and a lever 2500. The dust housing 2100 may be detachably assembled with the body 30, and a foreign material may be stored in the dust housing 2100. The agitator 2200 may be rotatably assembled with the dust housing 2100. The driving unit 2300 may be installed on the body 30 and provide rotational force to the agitator 2200. The driving coupling 2320 may be disposed at the driving unit 2300 and transmit the rotational force of the driving unit 2300 to the agitator 2200. The driven coupling 2220 may transmit the rotational force of the driving coupling 2320 to the agitator 2200. The lever 2500 may be disposed at the dust housing 2100. The lever 2500 may couple or separate the driving coupling 2320 and the driven coupling 2220 by receiving operation force.

The dust housing 2100 accommodates the agitator 2200. A foreign material collected through the rotation of the agitator 2200 may be stored in the dust housing 2100. That is, the dust housing 2100 provides an installation and operation structure of the agitator 2200, and also provides a storage space for a foreign material.

The dust housing 2100 may include a collection space 2102 for a rotation of the agitator 2200 and a storage space 2104 for storing a foreign material. The dust housing 2100 may longitudinally extend in a left-right direction. A width of the dust housing 2100 may be narrower than a width of the mop module 40.

The dust housing may be formed by separately fabricating a structure for the collection space 2102 and a structure for the storage space 2104 and assembling them each other. In the present embodiment, the collection space 2102 and the storage space 2104 are disposed in the dust housing 2100, and a partition 2145 for partitioning the collection space 2102 and the storage space 2104 may be disposed.

In the present embodiment, the dust housing 2100 may include an upper housing 2110, a lower housing 2140, and a dust cover 2150. The upper housing 2110 may provide an upper outer shape. The lower housing 2140 may be disposed at a lower side of the upper housing 2110 and be coupled to the upper housing 2110. The dust cover 2150 may detachably assembled with at least one of the upper housing 2110 and the lower housing 2140.

The collection space 2102 and the storage space 2104 are formed by assembling the upper housing 2110 and the lower housing 2140. That is, the upper housing 2110 may provide an upper partial space of the collection space 2102 and an upper partial space of the storage space 2104, and the lower housing 2140 may provide the remaining lower space of the collection space 2102 and the remaining lower space of the storage space 2014.

In the present embodiment, the collection space 2102 may be positioned at a rear side of the storage space 2104.

That is, the storage space 2104 is positioned at a front side of the collection space 2102, and the dust cover 2150 is positioned at a front side than the upper housing 2110.

In addition, the storage space 2014 may be disposed at a front side of the agitator 2200. When the body of the cleaner has a circular shape or a shape close to a circular shape, rotation in place is easy. When the rotation in place is easy, the cleaner can easily escape from an obstacle area or a corner. However, when the body of the cleaner has a circular shape, a width of an agitator is limited to be smaller than a diameter of the body so that the agitator is not disturbed by the obstacle during the body rotates. Accordingly, in the present disclosure, rotation of the body can be easy by limiting the width of the agitator to be smaller than the diameter of the body. Also, the width of the agitator can be maximized in a state that the agitator does not protrude from the body by disposing the storage space that stores a foreign material collected from the agitator at a front side than the agitator. Therefore, a size of an area to be cleaned at once is not reduced.

The upper housing 2110 and the lower housing 2140 may be integrally assembled. The upper housing 2110 and the lower housing 2140 that are integrally assembled may be defined as a housing assembly 2001.

The dust cover 2150 is detachably assembled with the housing assembly. When the dust cover 2150 is separated from the housing assembly, the storage space 2104 is exposed to an outside. The foreign material stored in the storage space 2104 may be discarded when the dust cover 2150 is separated.

The upper housing 2110 provides an upper surface, a left upper surface, a right upper surface, and a rear surface of the dust housing 2100. The upper housing 2110 forms an upper side of the collection space 2102 and the storage space 2104. The upper housing 2110 provides upper partial portions of the collection space 2102 and the storage space 2104.

The upper housing 2110 may include a first upper housing portion 2112, a second upper housing portion 2114, a third upper housing portion 2116, and a fourth housing portion 2118. The first upper housing portion 2112 may form an upper wall of the storage space 2104. The second upper housing portion 2114 may be integrally connected with the first upper housing portion 2112 and forms an upper wall and a rear wall of the collection space 2102. The third upper housing portion 2116 may provide a part of a left wall of the collection space 2102 and the storage space 2104, and the fourth upper housing portion 2118 may provide a part of a right wall of the collection space 2102 and the storage space 2104.

A shape of the first upper housing 2112 is not limited. However, since the second upper housing portion 2114 accommodates the agitator 2200, the second upper housing portion 2114 may have a shape corresponding to a shape of the agitator 2200.

At least a part of the second upper housing portion 2114 may have a center of curvature at a rotation axis of the agitator 2200. At least a part of the second upper housing portion 2114 may have an arc shape.

In the present embodiment, the second upper housing portion 2114 may have a radius of curvature R1 greater than a diameter of the agitator 2200. An outer edge of the agitator 2200 may be preferably in contact with an inner surface of the second upper housing portion 2114.

A foreign material collected through a contact of the agitator 2200 and the second upper housing portion 2114 may be moved to the storage space 2104 along the inner surface of the second upper housing portion 2114. When the agitator 2200 and the second upper housing 2114 are spaced apart from each other, the foreign material collected by the agitator 2200 may fall back to the floor.

A collection opening surface 2101 may be formed at the lower housing 2140. The collection opening surface 2101 may be exposed to the floor. The agitator 2200 may penetrate the collection opening surface 2101 and protrude to a down side than the collection opening surface 2101.

The collection opening surface 2101 may be disposed at a rear side than the storage space 2102.

The lower housing 2140 may be disposed at a lower side of the upper housing 2110 and may be spaced apart from the upper housing 2110 to form a storage opening surface 2103.

In the present embodiment, the lower housing 2140 and the upper housing 2110 may be spaced apart from each other in the up-down direction.

The lower housing 2140 may include a first lower housing portion 2142, a third lower housing portion 2146, a fourth lower housing portion 2148, and a partition 2145. The first lower housing portion 2142 may form a lower wall of the storage space 2104 and has the collection opening surface 2101 where the foreign material is collected. The third lower housing portion 2146 may provide a rest of the left wall of the collection space 2102 and the storage space 2104, and the fourth lower housing portion 2148 may provide a rest of the right wall of the collection space 2102 and the storage space 2104, The partition 2145 may be integral with the first lower housing portion 2142, and may partition the collection space 2102 and the storage space 2104.

In the present embodiment, the first lower housing portion 2142, the third lower housing portion 2146, the fourth lower housing portion 2148, and the partition 2145 may be formed to have an integral structure. Unlike the present embodiment, any one of the first lower housing portion 2142, the third lower housing portion 2146, the fourth lower housing portion 2148, or the partition 2145 may be separately manufactured and then be assembled.

A left wall 2011 of the housing assembly 2001 may be provided through assembling the third lower housing portion 2146 and the third upper housing portion 2116. A right wall 2012 of the housing assembly 2001 may be provided through assembling the fourth lower housing portion 2148 and the fourth upper housing portion 2118.

A left rotation axis of the agitator 2200 may penetrate the left wall 2011 of the housing assembly, and a right rotation axis of the agitator 2200 may penetrate the right wall 2012 of the housing assembly.

The partition 2145 may protrude to an upper side from the first lower housing portion 2142. A length of the partition 2145 in the left-right direction may correspond to or relate to a length of the agitator 2200 in the left-right direction. The length of the partition 2145 in the left-right direction may be greater than the length of the agitator 2200 in the left-right direction.

The partition 2145 may include a first partition portion 2145a and a second partition portion 2145b. The first partition portion 2145a may protrude to an upper side from the first lower housing portion 2142, form the collection opening surface 2101, and partition the collection space 2102 and the storage space 2104. The first partition portion 2145a may be not in contact with the agitator 2200. The second partition portion 2145b may extend to an upper side from the first partition portion 2145a, partition the collection space 2102 and the storage space 2104, and be in contact with the agitator 2200.

The first partition portion 2145a may protrude to the upper side from the first lower housing portion 2142. The collection opening surface 2101 may be formed between the first partition portion 2145a and a rear end 2140b of the first lower housing portion 2142.

A length L1 of the collection opening surface 2101 in a front-rear direction may be smaller than a diameter of the agitator 2200. Since the length L1 of the collection opening surface 2101 in the front-rear direction is smaller than the diameter of the agitator 2200, the agitator 2200 cannot be drawn out to an outside through the collection opening surface 2101.

The agitator 2200 may be mounted on an upper side of the lower housing portion 2140, and a lower end of the agitator 2200 may protrude to an outside of the collection opening surface 2101 and thus may be in contact with the floor.

The first partition portion 2145*a* may be not in contact with the agitator 2200.

However, the second partition portion 2145*b* may be in contact with the agitator 2200.

The second partition portion 2145*b* may have an arc shape. A curvature center of the second partition 2145*b* may be positioned at a rotation axis Ax of the agitator 2200. A radius of curvature R2 of the second partition 2145*b* may be equal to or smaller than a diameter of the agitator 2200.

The second partition portion 2145*b* may have a curved surface facing the agitator 2200. An upper end 2147*a* of the second partition portion 2145*b* may be positioned higher than the rotation axis Ax of the agitator 2200.

The upper end 2147*a* of the second partition portion 2145*b* may protrude to a rear side of the first partition portion 2145*a*.

The upper end 2147*a* of the second partition portion 2145*b* may be sharply formed. An inclined surface 2147*b* may be formed at the upper end 2147*a* of the second partition portion 2145*b*. The inclined surface 2147*b* may separate a foreign material attached to a surface of the agitator 2200 and guide the foreign material to the storage space 2104.

When assembling the upper housing 2110 and the lower housing 2140, a discharge surface 2105 that is opened to a front side may be formed. The discharge surface 2105 may be formed at a front surface of the housing assembly 2001, and a dust cover 2150 may open and close the discharge surface 2105.

The dust cover 2150 may be disposed at a front side of the housing assembly 2001 and may cover the discharge surface 2105. The foreign material in the storage space 2104 may be discharged to an outside of the sweep module 2000 through the discharge surface 2105.

The dust cover 2150 may be detachably assembled with the housing assembly 2001. In the present embodiment, the dust cover 2150 and the housing assembly 2001 may be assembled through a mutually-engaged structure (a mutually-fastened structure, a mutually-locked structure, or a mutually-hooked structure). The mutually-engaged structure may be released by operation force of a user.

For the mutually-engaged structure of the dust cover 2150 and the housing assembly 2001, a protrusion 2151 may be formed at one of the dust cover 2150 and the housing assembly 2001, and an engaged groove 2152 may be formed at the other of the dust cover 2150 and the housing assembly 2001.

In the present embodiment, the engaged groove 2152 is formed at the dust cover 2150, and the protrusion 2151 is formed at the housing assembly 2001.

A number of engaged grooves 2152 corresponds to a number of protrusions 2151. A plurality of protrusions 2151 may be disposed. The protrusions 2151 may be disposed at the upper housing 2110 and the lower housing 2140, respectively.

In the present embodiment, two protrusions 2151 are disposed at the upper housing 2110, and two protrusions 2151 are also disposed at the lower housing 2140.

If it is necessary to distinguish, protrusions disposed at the upper housing 2110 are referred to as upper protrusions 2151*a* and 2151*b*, and protrusions disposed at the lower housing 2140 are referred to as lower protrusions 2151*c* and 2151*d*.

The upper protrusions 2151*a* and 2151*b* protrude to an upper side at an upper surface of the upper housing 2110.

The lower protrusion 2151*c* and 2151*d* protrude to a lower side at a bottom surface of the lower housing 2140.

At the dust cover 2150, upper engaged grooves 2152*a* and 2152*b* corresponding to the upper protrusions 2151*a* and 2151*b* are formed, and lower engaged groove 2152*c* and 2152*d* corresponding to the lower protrusions 2151*c* and 2151*d* are formed.

The dust cover 2150 may include a front cover portion 2153, a top cover portion 2154, a left cover portion 2155, and a right cover portion 2156, and a bottom cover portion 2157. The front cover portion 2153 may be disposed to face the discharge surface 2105. The top cover portion 2154 may protrude from an upper edge of the front cover portion 2153 toward the housing assembly. The left cover portion 2155 may protrude from a left edge of the front cover portion 2153 toward the housing assembly, and the right cover portion 2156 may protrude from a right edge of the front cover portion 2153 toward the housing assembly. The bottom cover portion 2157 may protrude from a lower edge of the front cover portion 2153 toward the housing assembly side.

The dust cover 2150 may have a concave insertion space from a rear side to a front side.

The upper engaged groove 2152*a* and 2152*b* are formed at the top cover portion 2154. The lower engaged groove 2152*c* and 2152*d* are formed at the bottom cover portion 2157. The upper engaged groove 2152*a* and 2152*b* and the lower engaged groove 2152*c* and 2152*d* may be preferably disposed to be opposite to each other.

The upper engaged groove 2152*a* and 2152*b* or the lower engaged groove 2152*c* and 2152*d* may have a shape of a groove or a hole.

The housing assembly 2001 may have an insertion portion 2160 being inserted into the insertion space and being in close contact with an inner surface of the dust cover 2150. The insertion portion 2160 may be located at a front side of the upper housing 2110 and the lower housing 2140.

The insertion portion 2160 may include a top insertion portion 2164, a left insertion portion 2165, a right insertion portion 2166, and a bottom insertion portion 2167. The top insertion portion 2164 may form an upper side of the discharge surface 2105 and protrude to a front side. The left insertion portion 2165 may form a left side of the discharge surface 2105 and protrude to a front side. The right insertion portion 2166 may form a right side of the discharge surface 2105 and protrude to a front side. The bottom insertion portion 2167 may form a lower side of the discharge surface 2105 and protrude to a front side.

In the present embodiment, the top insertion portion 2164, the left insertion portion 2165, the right insertion portion 2166, and the bottom insertion portion 2167 are connected. Unlike the present embodiment, the top insertion portion 2164, the left insertion portion 2165, the right insertion portion 2166, and the bottom insertion portion 2167 may be separated. An area of the insertion portion 2160 may become narrower as it goes from a rear side to a front side.

The top insertion portion 2164 may be in close contact with the top cover portion 2154, the left insertion portion 2165 may be in close contact with the left cover portion 2155, the right insertion portion 2166 may be in close contact with the right cover portion 2156, and the bottom insertion portion 2167 may be in close contact with the bottom cover portion 2157.

In the present embodiment, the upper protrusions 2151*a* and 2111*b* are formed at the top insertion portion 2164, and the lower protrusions 2151*c* and 2151*d* are formed at the bottom insertion portion 2167.

The upper protrusions 2151a and 2151b may be inserted into the upper engaged groove 2152a and 2152b from a lower side to an upper side of the upper engaged groove 2152a and 2152b to form a mutually-engaged structure. The lower protrusions 2151c and 2151d may be inserted into the lower engaged groove 2152c and 2152d from an upper side to a lower side of the lower engaged groove 2152c and 2152d to form a mutually-engaged structure.

By operation force of a user to pull the dust cover 2150, the dust cover 2150 or the insertion portion 2160 is elastically deformed and thus the mutually-engaged structure is released.

The agitator 2200 may be disposed to be rotated in the housing assembly 2001.

The agitator 2200 may be disposed between the upper housing 2110 and the lower housing 2140. The agitator 2200 may be disposed at the upper housing 2110. In the present embodiment, the agitator 2200 is disposed at the lower housing 2140 and rotates while being supported by the lower housing 2140.

A rotation axis of the agitator 2200 is disposed in the left-right direction and the agitator 2200 may rotate forward or backward.

The housing assembly 2001 may further include a first journal 2010 and a second journal 2020 supporting the agitator 2200. The first journal 2010 is disposed at a left side of the housing assembly 2001, and the second journal 2020 is disposed at a right side of the housing assembly 2001.

The first journal 2010 and the second journal 2020 penetrate the housing assembly 2001 in the left-right direction and communicate with the collection space 2102.

In the present embodiment, the first journal 2010 and the second journal 2020 may have a cylindrical shape. Unlike the present embodiment, at least one of the first journal and the second journal may have a semi-cylindrical shape. When the first journal and the second journal have a semi-cylindrical shape, the first journal and the second journal are arranged to support the rotation axis of the agitator 2200 at a lower side.

The dust housing 2100 may be mounted on the installation space 325 of the base 32, and a lever 2500 may be disposed to couple or separate the base 32 and the dust housing 2100.

The lever 2500 may be disposed between the base 32 and the dust housing 2100 and may form a mutually-engaged structure with respect to the base 32 and the dust housing 2100. The lever 2500 may form a mutually-engaged structure with the dust housing 2100 in a direction of gravity and suppress the dust housing 2100 from being separated from a lower side of the base 32.

A plurality of levers 2500 may be disposed, and form a mutually-engaged structure at a plurality of places of the dust housing 2100. In the present embodiment, the lever 2500 includes a first lever 2510 and a second lever 2520, and the first lever 2510 and the second lever 2520 are arranged in the left-right direction.

The first lever 2510 is disposed at a left side of the dust housing 2100, and the second lever 2520 is disposed at a right side of the dust housing 2100.

Operation mechanisms of the first lever 2510 and the second lever 2520 are the same, and only operation directions of the first lever 2510 and the second lever 2520 are opposite to each other.

The first lever 2510 disposed at the left side is moved to the right side to release the mutually-engaged structure with the base 32, and the second lever 2520 disposed at the right side is moved to a left side to release the mutually-engaged structure with the base 32.

The sweep module 2000 may include a first lever 2510, a second lever 2520, a first-lever elastic member 2541, and a second-lever elastic member 2542. The first lever 2510 may be disposed at one side of the housing assembly to be relatively movable in the left-right direction. The second lever 2520 may be disposed at the other side of the housing assembly to be relatively movable in the left-right direction. The first-lever elastic member 2541 may be disposed between the first lever 2510 and the dust housing 2100 and provide elastic force to the first lever 2510. The second-lever elastic member 2252 may be disposed between the second lever 2520 and the dust housing 2100 and provide elastic force to the second lever 2520.

Since the first lever 2510 and the second lever 2520 may have the same or similar structures, a structure of the first lever will be described as an example.

In the present embodiment, the dust housing 2100 may be provided with a first side cover 2170 covering or shielding the first lever 2510 and a second side cover 2180 covering or shielding the second lever 2520.

Unlike the present embodiment, the first lever 2510 and the second lever 2520 may be exposed to an outside of the dust housing 2100 without the first side cover 2170 and the second side cover 2180. Also, unlike the present embodiment, the first side cover 2170 may be disposed at a right side and the second side cover 2180 may be disposed at a left side.

The first side cover 2170 may be coupled to a left side of the housing assembly 2001. The first side cover 2170 may have a shape corresponding to a left shape of the housing assembly 2001. The first side cover 2170 may shield a shaft member 2201 of the agitator 2200 from being exposed to an outside. The first side cover 2170 may cover or shield most of the first lever 2510 and exposes only a portion for the mutually-engaged structure with the base 32.

The first side cover 2170 may include a first side cover body 2173, a through hole 2171 or 2172, a hook portion 2174, a journal-coupled portion 2175, and a fastening portion 2176. The first side cover body 2173 may be in close contact with one side of the housing assembly 2001. The through hole 2171 or 2172 may be disposed to penetrate the first side cover body 2173. The hook portion 2174 may protrude from the first side cover body 2173 toward the housing assembly 2001 and may be hooked-coupled with the housing assembly 2001. The journal-coupled portion 2175 may protrude from the first side cover body 2173 toward the housing assembly 2001 and be mutually coupled to the journal 2010 (the first journal 2010 in the present embodiment). The fastening portion 2176 may couple the first side cover body 2173 and the housing assembly 2001 by a fastening member (not shown).

The fastening portion 2176 and the hook portion 2174 are disposed at opposite sides based on the journal-coupled portion 2175. A plurality of hook portions 2174 may be arranged in an up-down direction.

The journal-coupled portion 2175 may be inserted into an inner diameter of the first journal 2010.

The first lever 2510 may include an upper lever body 2512, a lower lever body 2514, and a lever engaging portion 2516. The upper lever body 2512 may be disposed between the housing assembly 2001 and the first side cover 2170 and be elastically supported by the first-lever elastic member 2541. The lower lever body 2514 may be disposed between the housing assembly 2001 and the first side cover 2170, be integral with the upper lever body 2512, be exposed to an outside of the housing assembly 2001, and receive operation force of a user. The lever engaging portion 2516 may protrude from the upper lever body 2512 and be disposed to penetrate the through holes 2171 and 2172 of the first side cover 2170.

The upper lever body 2512 may be disposed in an up-down direction, and the lower lever body 2514 may be disposed in a horizontal direction.

The lower lever body 2514 may be disposed to be exposed to an outside of the dust housing 2100. The lower lever body 2514 may be positioned at a lower side of the upper lever body 2512. The lower lever body 2514 may be exposed to an outside of a lower surface of the lower housing 2140.

In the present embodiment, an operation portion 2519 protruding to a lower side from the lower lever body 2514 may further provided. Since the operation portion 2519 longitudinally extends in the front-rear direction, the operation portion 2519 may easily receive operation force of a user in the left-right direction.

A user may move the first lever 2510 by pushing the operation unit 2519 in the left-right direction.

The lever engaging portion 2516 may protrude from the upper lever body 2512 to an outside (a side opposite to the agitator). Since a number of the lever engaging portions 2516 corresponds to a number of through holes, a first lever engaging portion 2516a and a second lever engaging portion 2516b are disposed in the present embodiment.

The lever engaging portion 2516 has a structure that forms a mutually-engaged structure in a direction of gravity and minimizes forming a mutually-engaged structure in an opposite direction of gravity. Therefore, an upper surface of the lever engaging portion 2516 may have a round shape or an inclined surface to a lower side, and a lower surface of the lever engaging portion 2516 may have a flat surface.

If the levers 2510 and 2520 are not returned to initial positions when the levers 2510 and 2520 move, the sweep module 2000 may be separated from a fixed position because the mutually engaged structure is not formed. To prevent this, the sweep module 2000 may further include a structure for guiding a horizontal movement of the first lever 2510.

The sweep module 2000 may include a first guide 2545, a first guide hole 2518, a second guide 2547, and a second guide hole 2528. The first guide 2545 may protrude to the first lever 2510 at one side (a left side in the present embodiment) of the dust housing 2100 and mutually interfere with the first lever 2510 to guide a movement direction of the first lever 2510. The first guide hole 2518 may be formed at the first lever 2510, and the first guide 2545 may be inserted into the first guide hole 2518 so that the movement of the first guide 2545 is guided. The second guide 2547 may protrude to the second lever 2520 at the other side (a right side in the present embodiment) of the dust housing 2100 and mutually interfere with the second lever 2520 to guide a movement direction of the second lever 2520. The second guide hole 2528 may be formed at the second lever 2520, and the second guide 2547 may be inserted to the second guide hole 2528 so that the movement of the second guide 2547 is guided.

The first guide 2545 may be formed in the movement direction of the first lever 2510, and the second guide 2547 may be formed in the moving direction of the second lever 2520. Thus, the first guide 2545 and the second guide 2547 may be formed in a horizontal direction. The first guide hole 2518 and the second guide hole 2528 may be formed in the horizontal direction to correspond to the first guide 2545 and the second guide 2547.

The guide holes 2518 and 2528 may be disposed at either the upper lever body 2512 or the lower lever body 2514. In the present embodiment, the guide holes 2518 and 2528 are formed to penetrate the upper lever body 2512 in the horizontal direction.

One end of the first-lever elastic member 2541 is supported by the dust housing 2100, and the other end of the first-lever elastic member 2541 is supported by the first lever 2510. The first-lever elastic member 2541 elastically supports the first lever 2510 toward an outside of the dust housing 2100.

The sweep module 2000 may further include a structure for preventing displacement of the lever elastic members 2541 and 2542.

In order to maintain an operation position of the first-lever elastic member 2541, the sweep module 2000 may include a first position fixing portion 2517 and a second position fixing portion 2544. The first position fixing portion 2517 may be disposed at the first lever 2510 and may be inserted into the other end of the first-lever elastic member 2541. The second position fixing portion 2544 may be disposed at the dust housing 2100 and one end of the first-lever elastic member 2541 may be inserted into the second position fixing portion 2544.

In the present embodiment, the first-lever elastic member 2541 and the second-lever elastic member 2542 may be formed of a coil spring. In the present embodiment, the first position fixing portion 2517 may have a boss shape, and the second position fixing portion 2544 may have a groove shape.

The first position fixing portion 2517 may be inserted into the first-lever elastic member 2541, and the first position fixing portion 2517 may allow the first-lever elastic member 2541 to move in the left-right direction. Thus, a movement of the first-lever elastic member 2541 in the front-rear direction or in the up-down direction may be suppressed.

The second position fixing portion 2544 may have a groove shape, and the first-lever elastic member 2541 may be inserted into the second position fixing portion 2544. The second position fixing portion 2544 may allow the first-lever elastic member 2541 to move in the left-right direction. Thus, a movement of the first-lever elastic member 2541 in the front-rear direction or in the up-down direction may be suppressed.

In the present embodiment, the second position fixing portion 2544 may be disposed between the first journal 2010 and the first guide 2545. The second position fixing portion 2544 may include a first position fixing part 2544a and a second position fixing part 2544b. The first position fixing part 2544a may have a concave shape at a portion of a lower side of the first journal 2010, and the second position fixing part 2544b may have a concave shape at a portion of an upper side of the first guide 2545.

When viewed from a later side, each of the first position fixing part 2544a and the second position fixing part 2544b may have a curved surface, and a curvature center of each of the first position fixing part 2544a and the second position fixing part 2544b may be positioned at an inside of the first-lever elastic member 2541.

A radius of curvature of each of the first position fixing part 2544a and the second position fixing part 2544b may be larger than a diameter of the first-lever elastic member 2541.

When the first lever 2510 is moved toward the housing assembly 2001 by operation force of a user, the lever engaging portion 2516 releases the mutually-engaged structure with the base 32. In this instance, since the first-lever elastic member 2541 elastically supports the first lever 2510, when the operation force of the user is removed, the first lever 2510 is moved back to the first side cover 2170 and the lever engaging portions 2516 are exposed to an outside of the through holes 2171 and 2172.

The sweep module 2000 may be maintained in a state mounted on the base 32 through the mutually-engaged structure of the lever engaging portion 2516 protruding to an outside of the through holes 2171 and 2172 and the base 32.

When the mutually-engaged structure between the lever engaging portion 2516 and the base 32 is released, the sweep module 2000 can be separated from the base 32.

In the present embodiment, since the first lever 2510 and the second lever 2520 are disposed at the left and right sides of the sweep module 2000, respectively, the sweep module 2000 can be separated from the body 30 only when all the mutual engagement of the first lever 2510 and the second lever 2520 is released.

The first lever 2510 provides the mutually-engaged structure with the base 32 and releases the mutually-engaged structure with the base 32. The second lever 2520 provides not only an act of the first lever 2510 but also a connection structure with the driving unit 2300.

The second lever 2520 may include an upper lever body 2522, a lower lever body 2524, a lever engaging portion 2526, and an operation portion 2529. The upper lever body 2522 may be disposed between the housing assembly 2001 and the second side cover 2180 and be elastically supported by the second-lever elastic member 2542. The lower lever body 2524 may be disposed between the housing assembly 2001 and the second side cover 2180, be integral with the upper lever body 2522, be exposed to an outside of the housing assembly 2001, and receive operation force of a user. The lever engaging portion 2526 may protrude from the upper lever body 2522 and be disposed to penetrate through holes 2181 and 2182 of the second side cover 2180. The operation portion 2529 may protrude to a lower side from the lower lever body 2524.

The lever engaging portion 2526 may protrude from the lower lever body 2522 to an outside (a side opposite to the agitator). The lever engaging portion 2526 may include a first lever engaging portion 2526*a* and a second lever engaging portion 2526*b*.

The lever engaging portion 2526 may form a mutually-engaged structure with an engaged groove 3266 formed at the storage housing 326 of the base 32.

Since the lever engaging portion 2526 includes the first lever engaging portion 2526*a* and the second lever engaging portion 2526*b*, the engaged groove 3266 may include a first engaged groove 3266*a* and a second engaged groove 3266*b* to correspond to them. With respect to the lever engaging portion 2516 of the first lever 2510, an engaged groove (not shown) having the same structure may be formed. The first engaged groove 3266*a* and the second engaged groove 3266*b* may be formed at a sidewall 3262 of the storage housing 326.

The first engaged groove 3266*a* and the second engaged groove 3266*b* may be at a lower side than a driven coupling 2220 and a driving coupling 2320.

The second side cover 2180 may include a second side cover body 2183, a through hole 2181 or 2182, a hook portion 2184, a fastening portion 2186, and an opening surface 2185. The second side cover body 2183 may be in close contact with the other side (a right side in the present embodiment) of the housing assembly 2001. The through hole 2181 or 2182 may be disposed to penetrate the second side cover body 2183. The hook portion 2184 may protrude from the second side cover body 2183 toward the housing assembly 2001 and may be hooked-coupled with the housing assembly 2001. The fastening portion 2186 may couple the second side cover body 2183 and the housing assembly 2001 by a fastening member (not shown). In order to transmit driving force of the driving unit 2300 to the agitator 2200, the driving unit 2300 may penetrate the opening surface 2185.

The opening surface 2185 may be disposed in the left-right direction. A first coupler 2310 of the driving unit 2300, which will be described later, may be inserted through the opening surface 2185.

The sweep module 2000 may include a second guide 2547, a second guide hole 2528, a third position fixing portion 2527, and a fourth position fixing portion 2546. The second guide 2547 may protrude to the second lever 2520 at the other side (a right side in the present embodiment) of the dust housing 2100 and mutually interfere with the second lever 2520 to guide a movement direction of the second lever 2520. The second guide hole 2528 may be formed at the second lever 2520, and the second guide 2547 may be inserted to the second guide hole 2528 so that the movement of the second guide 2547 is guided. The second position fixing portion 2527 may be disposed at the second lever 2520 and may be inserted into the other end of the second-lever elastic member 2542. The fourth position fixing portion 2546 may be disposed at the dust housing 2100 and one end of the second-lever elastic member 2542 may be inserted into the fourth position fixing portion 2546.

The agitator 2200 may include an agitator assembly 2210, a driven coupling 2220, a coupling elastic member 2230, a coupling stopper 2270. The agitator assembly 2210 may sweep a foreign material on a floor into the collection space 2102 through rotation. The driven coupling 2220 may receive rotational force from the driving unit 2300 and may be relatively movably disposed between the driving unit 2300 and the agitator assembly 2210. The coupling elastic member 2230 may be disposed between the agitator assembly 2210 and the driven coupling 2220, provide elastic force to the driven coupling 2220, and press the driven coupling 2220 toward the driving unit 2300. The coupling stopper 2270 may penetrate the driven coupling 2220 and be coupled to the agitator assembly 2210, and form a mutually-engaged structure with the driven coupling 2220 in a left-right direction to prevent the driven coupling 2220 from being separated.

The agitator assembly 2210 may include an agitator body 2240, a shaft member 2201, a collection member 2250, and a bearing 2600. The agitator body 2240 may be disposed at the collection space 2102, and be rotated by receiving the rotational force of the driving unit 2300. The shaft members 2201 may be disposed at one side and the other side of the agitator body 2240, respectively, provide a rotation center of the agitator body 2240, and be rotatably supported by the dust housing 2100. The collection member 2250 may be installed on an outer circumferential surface of the agitator body 2240 and sweep a foreign material into the collection space 2102. The bearing 2600 may provide rolling friction to the shaft member 2201.

In the present embodiment, the driven coupling 2220 may be assembled detachably with a lever (the second lever 2520 in the present embodiment) and the shaft member 2201 and may move together with the lever. In the present embodiment, the coupling of the driven coupling 2220 with the driving unit 2300 may be released by operation force of a user applied to the second lever 2520.

The driven coupling 2220 may move toward the shaft member 2201, and the coupling with the driving unit 2300 may be released. The driven coupling 2220 may relatively move in a horizontal direction between the agitator assembly 2210 and the driving unit 2300.

The agitator body 2240 may be disposed in the left-right direction. The agitator body 2240 may be disposed at an inside of the collection space 2102.

The collection member 2250 may be formed along an outer circumferential surface of the agitator body 2240. The collection member 2250 may protrude radially outward from the outer circumferential surface of the agitator body 2240. The collection member 2250 may rotate together with the agitator body 2240 when the agitator body 2240 rotates. The collection member 2250 may penetrate the collection opening surface 2101 and be in contact with the floor. The collection member 2250 may be composed of a plurality of brushes.

When the agitator assembly 2210 rotates, the collection member 2250 may be contact with the foreign material on the floor and move the foreign material into the collection space 2102.

The shaft members 2201 may be disposed at one side and the other side of the agitator body 2240, respectively. The shaft member 2201 may form a center of rotation of the agitator assembly 2210.

The shaft member 2201 may be disposed in the left-right direction. The shaft member 2201 may penetrate left and right sides of the collection space 2102.

In the present embodiment, the shaft member 2201 may penetrates the left wall 2011 and the right wall 2012 of the dust housing 2100. The shaft member 2201 may be integral with the agitator body 2240.

In the present embodiment, the shaft member 2201 may be separably or detachably assembled with the agitator body 2240. The shaft member 2201 and the agitator body 2240 may form a mutually-engaged structure in a rotation direction of the agitator 2200, but may be separated in a rotation-axis direction (a left-right direction in the present embodiment) of the agitator 2200.

The agitator assembly 2210 and the shaft member 2201 may be detachably assembled, Therefore, only the agitator assembly 2210 can be replaced. That is, the agitator assembly 2210 may be separated from the dust housing 2100 in a state that each shaft member 2201 is assembled to the dust housing 2100.

Since the agitator 2200 is a consumable element, the agitator 2200 may be periodically replaced. Through a coupling structure of the shaft member 2201 and the agitator body 2240, only the agitator body 2240 may be separated from the dust housing 2100 without an entire separation of the agitator 2200. The shaft member 2201 and the agitator body 2240 maintain a state of a mutually-engaged structure.

The shaft member 2201 may include a rotating shaft body 2202, a shaft portion 2203, and a coupling guide 2204. The rotating shaft body 2202 may be mutually coupled to the agitator body 2240. The shaft portion 2203 may protrudes from the rotating shaft body 2202 toward the driving unit 2300, provide a rotation center of the agitator 2200, and be coupled with the bearing 2260. The coupling guide 2204 may protrude from the shaft portion 2203 toward the driving portion 2300 more and penetrate the driven coupling 2220. The coupling stopper 2270 may be coupled to the coupling guide 2204.

The rotating shaft body 2202 may have a disk shape. The shaft portion 2203 may protrude from the rotating shaft body 2202 toward the driving portion 2300.

A diameter or a size of the shaft portion 2203 may be smaller than a diameter of the rotating shaft body 2202.

The shaft portion 2203 may have a cylindrical shape. An outer surface of the shaft portion 2203 may be inserted into the bearing 2260. The shaft portion 2203 may be inserted into and supported by the bearing 2260.

The coupling guide 2204 may further protrude from the shaft portion 2203 toward the driving portion 2300 more. Curvature centers of the coupling guide 2204 and the shaft portion 2203 may be located on the same rotation center.

A diameter of the coupling guide 2204 may be smaller than a diameter of the shaft portion 2203, and a first step 2205 may be formed between the coupling guide 2204 and the shaft portion 2203 due to a diameter difference.

One end of the coupling elastic member 2230 may be supported by the first step 2205.

The coupling guide 2204 may further include a through portion 2206 penetrating the driven coupling 2220. A coupling stopper 2270 may be fixed to the through portion 2206.

The driven coupling 2220 may move in the left-right direction along the coupling guide 2204. Since the driven coupling 2220 is elastically supported by the coupling elastic member 2230, the driven coupling 2220 may be kept in close contact with the driving unit 2300 when external force is not applied.

In the present embodiment, the coupling guide 2204 may have a circular columnar shape, and the through portion 2206 may have a polygonal column shape (a hexagonal column shape in the present embodiment).

The through portion 2206 may be inserted into the driven coupling 2220 and form a mutually-engaged structure in a rotation direction of the agitator 2200.

On the other hand, the shaft member 2201 is provided with a key groove 2207 for a mutually-engaged structure with the agitator body 2240. The key groove 2207 may be disposed on an opposite side of the shaft portion 2203 based on or with respect to the rotating shaft body 2202. The key groove 2207 may be disposed at a side facing the agitator body 2240. The key groove 2207 may have a shape of an atypical polygon. The key groove 2207 may be open in a radial direction of the rotation axis.

A key 2247, which is inserted into the key groove 2207, may be formed at the agitator body 2240. The key 2247 may protrude toward the shaft member 2201 or the driven coupling 2220.

The driven coupling 2220 may include a coupling body 2222, a first guide groove 2224, a second guide groove 2226, a second step 2225, and a power transmission groove 2228. The coupling body 2222 may be coupled with a lever (the second lever 2520 in the present embodiment). The first guide groove 2224 may be formed at one side (a left side in the present embodiment) of the coupling body 2222 to have a concave shape, The coupling guide 2204 may be inserted and the coupling elastic member 2230 may be inserted into the first guide groove 2224. The second guide groove 2226 may communicate with the first guide groove 2224, and penetrate the coupling body 2222. The through portion 2206 may be inserted to the second guide groove 2226. The second step 2225 may be disposed between the first guide groove 2224 and the second guide groove 2226, and the first step 2205 may be supported by the second step 2225. The power transmission groove 2228 may be formed at the other side (the right side in the present embodiment) of the coupling body 2222 to have a concave shape. The driving coupling 2320 coupled to the driving unit 2300 may be detachably inserted into the power transmission groove 2228.

A diameter of the first guide groove 2224 may be larger than a diameter of the coupling elastic member 2230. A diameter of the coupling elastic member 2230 may be larger than a diameter of the coupling guide 2204 and smaller than a diameter of the first guide groove 2224.

The first guide groove 2224 may have a circular hollow shape.

The second guide groove 2226 may have a shape corresponding to a shape of the through portion 2206. In the present embodiment, the second guide groove 2226 has a hollow shape which side surface has a hexagonal shape.

The coupling body 2222 may be provided with a groove 2223, which has a concave shape to an inside in a radial direction at an outer side surface. A diameter of the groove 2223 may be smaller than an outer surface diameter of the coupling body 2222.

A coupling groove 2523 may be formed at the upper lever body 2522 of the second lever 2520. The coupling groove 2523 may be inserted into the groove 2223 and thus may be engaged with the driven coupling 2220.

The groove 2223 may be perpendicular to a rotation center of the agitator 2200.

The second lever 2520 may be coupled to or separated from the driven coupling 2220 in the up-down direction and form a mutually-engaged structure with the driven coupling 2220 in the left-right direction.

The second lever 2520 may further include a first extension portion 2522a and a second extension portion 2522b extending from an upper side of the upper lever body 2522. The coupling groove 2523 may be formed between the first extension portion 2522a and the second extension portions 2522b.

The first extension portion 2522a and the second extension portion 2522b are structures for more robust assembly with the driven coupling 2220. The first extension portion 2522a and the second extension portion 2522b may be contact with one side surface 2223a and the other side surface 2223b of the groove 2223.

The coupling stopper 2270 may penetrate the driven coupling 2220 and may be fastened to the through portion 2206. The driven coupling 2220 may move in the left-right direction between the coupling stopper 2270 and the shaft member 2201.

A head 2272 of the coupling stopper 2270 may interfere with the power transmission groove 2228 of the driven coupling 2220 and prevent the driven coupling 2220 from being separated to a right side. A coupling portion 2274 of the coupling stopper 2270 may be inserted into and fastened to a fastening groove 2207 of the through portion 2206.

The driving coupling 2320 may be inserted into the power transmission groove 2228 and may be coupled to the power transmission groove 2228 to transmit rotational force. The power transmission groove 2228 may have any of various shapes or forms. In the present embodiment, the power transmission groove 2228 may have a hexagonal groove when viewed from a lateral side.

A diameter of the power transmission groove 2228 may be larger than a diameter of the second guide groove 2226. The power transmission groove 2228 and the second guide groove 2226 may communicate with each other. The first guide groove 2224 may be disposed at one side of the second guide groove 2226 to be communicated with the second guide groove 2226 and the power transmission groove 2228 may be disposed at the other side of the second guide groove 2226 to be communicated with the second guide groove 2226.

The power transmission groove 2228 may be open toward the other side, and the first guide groove 2224 may be open toward one side.

When the driven coupling 2220 is coupled to the upper lever body 2522, the power transmission groove 2228 may be positioned at the other side of the upper lever body 2522 and the first guide groove 2224 may be positioned at one side of the upper lever body 2522.

The second lever 2520 may form a mutually-engaged structure with the driven coupling 2220 with respect to a direction perpendicular to the shaft member 2201. In addition, the lever engaging portion 2526 of the second lever 2520 may form a mutually-engaged structure with the base 32.

When the second lever 2520 is pressed toward the agitator 2200, the second lever 2520 moves toward the agitator 2200. Thus, the mutually-engaged structure of the lever engaging portion 2526 and the base 32 is released and the dust housing 2100 is in a state being able to be separated from the base 32.

In addition, when the second lever 2520 is pressed toward the agitator 2200, the coupling elastic member 2230 may be compressed and the driven coupling 2220 may move toward the agitator 2200.

When the driven coupling 2220 moves toward the agitator 2200 by the second lever 2520, the driven coupling 2220 and the driving unit 2300 are physically separated and the dust housing 2100 is in a state being able to be separated from the base 32.

Since the sweep module 2000 according to the present embodiment has a structure in which the agitator 2200 is installed on the inside of the sweep module 2000, the dust housing 2100 should be physically separated from the driving unit 2300 when the dust housing 2100 is separated from the base 32.

The movement of the second lever 2520 not only releases the coupling of the dust housing 2100 and the base 32 but also releases the coupling of the driven coupling 2220 and the driving unit 2300 at the same time.

In this instance, since the second lever 2520 is hidden or shield inside the dust housing 2100 and only the operation unit 2529 is exposed to the outside, a coupling structure of the driven coupling 2220 is not exposed to the outside. In particular, since the second side cover 2180 shields or blocks most of the second lever 2520, damage to the second lever 2520 due to external impact can be minimized.

Even if the second lever 2520 is repeatedly used, the second lever 2520 moves only at an inside of the dust housing 2100 and thus separation or damage of the second lever 2520 can be minimized.

In addition, since the side covers 2170 and 2180 shield or cover the levers 2510 and 2520 inside the dust housing 2100, an intrusion of an external foreign material or the like to portions where the levers 2510 and 2520 can be minimized. Accordingly, reliability according to the operation can be ensured.

Then, when the operation force applied to the second lever 2520 is removed, the driven coupling 2220 moves toward the other side by elastic force of the coupling elastic member 2230.

In this instance, since the shaft member 2201 penetrates through the driven coupling 2220 and the coupling stopper 2270 is coupled to the shaft member 2201, the driven coupling 2220 can be prevented from being separated from the shaft member 2201. That is, the driven coupling 2220 may move along an axis direction of the shaft member 2201, but may be prevented from being separated from the shaft member 2201 by the coupling stopper 2270.

The driving unit 2300 may include a drive housing 2310, a sweep motor 2330, a power transmission assembly 2340, and a driving coupling 2320. The drive housing 2310 may be assembled with the body 30. The sweep motor 2330 may be assembled with a drive housing 2310. The power transmission assembly 2340 may be disposed at an inside of the drive housing 2310 and be assembled with the sweep motor 2330 to receive rotational force. The driving coupling 2320 may be coupled to the power transmission assembly 2340 and be selectively engaged with the driven coupling 2220.

Since the agitator 2200 is disposed inside the sweep module 2000 and the sweep motor 2330 is disposed inside the body 30, the driving coupling 2320 and the driven coupling 2220 transmitting the rotational force to the agitator 2200 may have selectively-detachable structure. If the driving coupling 2320 and the driven coupling 2220 are not detachable, the dust housing 2100 cannot be separated from the body 30.

The drive housing 2310 may be fixed to the body 30. The drive housing 2310 is fixed to the base 32 in the present embodiment. The drive housing 2310 is a structure for installing the power transmission assembly 2340 and the sweep motor 2330.

The drive housing 2310 may have any of various shapes of forms. In the present embodiment, the drive housing 2310 shields or covers the power transmission assembly 2340 therein, and exposes only the sweep motor 2330 and the driving coupling 2320 to the outside.

The drive housing 2310 may include a first drive housing 2312 and a second drive housing 2314, a coupling-installed portion 2315, and a hole 2316. The first drive housing 2312 and the second drive housing 2314 may form an outer shape. The coupling-installed portion 2315 may be disposed at one of the first drive housing 2312 and the second drive housing 2314, and the driving coupling 2320 may be disposed at the coupling-installed portion 2315. The hole 2316 may be disposed at one of the first drive housing 2312 and the second drive housing 2314, and a motor shaft of the sweep motor 2330 may penetrate the hole 2316.

The power transmission assembly 2340 may be disposed between the first drive housing 2312 and the second drive housing 2314.

In the present embodiment, the first drive housing 2312 is disposed at one side (toward the agitator 2200), and the second drive housing 2314 is disposed at the other side (at an outside).

In the present embodiment, the coupling-installed portion 2315 is disposed at the first drive housing 2312. The driving coupling 2320 is disposed at the coupling-installed portion 2315 and is connected to the power transmission assembly 2340. The driving coupling 2320 may rotate in a state that the driving coupling is installed on the coupling installation unit 2315.

The driving coupling 2320 has a shape corresponding to a shape of the power transmission groove 2228 of the driven coupling 2220. In the present embodiment, the driving coupling 2320 has a hexagonal shape when viewed from a lateral side. The driving coupling 2320 may be selectively engaged with the driven coupling 2220 through the opening surface 2185 of the second side cover 2180.

The driving coupling 2320 may protrude toward the second side cover 2180 than one side (a left side) of the first drive housing 2312 in a state that the driving coupling 2320 is assembled to the drive housing 2310.

A rotation center of the driving coupling 2320 is disposed at the left-right direction and may match the rotation center of the agitator 2200.

In the present embodiment, the first drive housing 2312 may have a space formed therein, and the power transmission assembly 2340 may be rotatably installed in the space. The second drive housing 2314 may have a shape or a form of a cover covering the first drive housing 2312.

The drive housing 2310 may further include a first fastening portion 2317 and a second fastening portion 2318. The first fastening portion 2317 and the second fastening portion 2318 may be disposed at the first drive housing 2312. The first fastening portion 2317 and the second fastening portion 2318 may be formed so that a fastening member is installed on the first fastening portion 2317 or the second fastening portion 2318 in an up-down direction.

A motor axis of the sweep motor 2330 may be disposed in the left-right direction. The sweep motor 2330 may be disposed at one side or the other side of the drive housing 2310.

The sweep motor 2330 may be disposed toward an inside of the body 30 based on or with respect to the drive housing 2310. A volume of the body 30 may be minimized by arranging the sweep motor 2330 at a side of the agitator 2200.

In the present embodiment, a motor axis direction Mx of the sweep motor 2330 and a rotation axis Ax of the agitator 2200 may be parallel. In the present embodiment, a rotation center of the agitator 2200, a rotation center of the shaft member 2201, a center of the driven coupling 2220, and a center of the driving coupling 2320 are located on a line of the rotation axis Ax of the agitator 2200.

In the present embodiment, the sweep motor 2330 is positioned at an upper side than the dust housing 2100. The sweep motor 2330 is positioned at a rear side than the dust housing 2100. The sweep motor 2330 is positioned at an upper side than the installation space 325 and the storage housing 326 of the base 32.

The power transmission assembly 2340 may include a plurality of gears. A number and a shape of gears included in the power transmission assembly 2340 may be various depending on a number of revolutions and transmitted torque.

Meanwhile, the sweep module 2000 may further include a housing elastic member 327 that provides elastic force to the dust housing 2100. The housing elastic member 327 may be disposed at the installation space 325.

The housing elastic member 327 may be disposed at the base 32, and more particularly, may be installed on the storage housing 326. In the present embodiment, the housing elastic member 327 may be a plate spring. In order to install the housing elastic member 327 of the plate spring, an installation structure for fitted-fixing is disposed at the storage housing 326.

The storage housing 326 is provided with an elastic-member storage portion 328 that protrudes to an upper side to have a convex shape at the installation space 325. An elastic-member storage space 328b in which the housing elastic member 327 is accommodated is formed at a lower side of the elastic-member storage portion 328.

The elastic member storage portion 328 may further include an elastic-member opening surface 328a opened in an up-down direction. The elastic-member opening surface 328a may communicate with the elastic-member storage space 328b and the installation space 325.

In addition, an elastic-member support portion 329, which is disposed at a lower side of the elastic-member storage space 328b and is connected to the storage housing 326, may be further disposed.

The elastic-member support portion 329 may be positioned at a lower side than the elastic-member storage portion 328.

The housing elastic member 327 may be inserted between the elastic-member storage portion 328 and the elastic-member support portion 329. The housing elastic member 327 may be exposed to an upper side of the storage housing 326 through the elastic-member opening surface 328a.

The housing elastic members 327 may be positioned at both sides of the elastic-member support portion 329, respectively.

The elastic member storage portion 328 may longitudinally extend in the left-right direction, and the elastic-member support portion 329 may be disposed in the left-right direction.

The housing elastic member 327 may include a first elastic portion 327a, a second elastic portion 327b, and a third elastic portion 327c. The first elastic portion 327a may be positioned at an upper side of the elastic-member support portion 329. The second elastic portion 327b may extend to one side (a left side in the present embodiment) from the first elastic portion 327a and be disposed in the elastic-member storage space 328b. The third elastic portion 327c may extend to the other side (a right side in the present embodiment) from the first elastic portion 327a and be disposed in the elastic-member storage space 328b.

Each of the second elastic portion 327b and the third elastic portion 327c may be bent from the first elastic portion 327a.

The second elastic portion 327b and the third elastic portion 327c may be positioned at a lower side of the elastic-member storage portion 328. The second elastic portion 327b may be disposed to be inclined toward a left down side, and the third elastic portion 327c may be disposed to be inclined toward a right down side.

When the dust housing 2100 is inserted into the installation space 325, the second elastic portion 327b and the third elastic portion 327c may elastically support an upper surface of the dust housing 2100.

When the mutually-engaged structure of the dust housing 2100 and the base 32 is released by the first lever 2510 and the second lever 2520, the second elastic portion 327b and the third elastic portion 327c push the dust housing 2100 to a lower side and moves the dust housing 2100 to an outside of the storage housing 326.

By the elastic force of the housing elastic member 327, a user can easily separate the dust housing 2100 from the installation space 325.

Since the elastic-member support portion 329 supports the housing elastic member 327, the housing elastic member 327 can be prevented from being separated to the installation space 325. Even if the dust housing 2100 is repeatedly mounted and separated, the housing elastic member 327 is firmly supported by the elastic-member support portion 329.

The mobile robot 1 may have a structure in which the body 30 moves by rotational motion of at least one of the mop module 40 and the sweep module 2000 without additional driving wheels. The body 30 may move only by the rotational motion of the mop module 40. The mobile robot 1 may have a structure in which the body 30 moves by rotational motion of a pair of spin mops 41a and 41b without additional driving wheels.

The mobile robot 1 may include a mop driving unit (not shown) that provides driving force to the mop module 40. The rotational force provided by the mop driving unit is transmitted to the spin mop 41 of the mop module 40.

The mobile robot 1 may include a water supply module that supplies water required for mopping a floor. The water supply module may supply water required for the mop module 40 or the sweep module 2000. In the present embodiment, the water supply module supplies water to the mop module 40. The water supply module supplies water to a pair of spin mops 41a and 41b.

The water supply module may include a water supply tank 81 for storing water supplied to the mop module 40 or the sweep module 2000 and a supply member for supplying water from the water tank 81 to the mop module 40.

Figure 22:
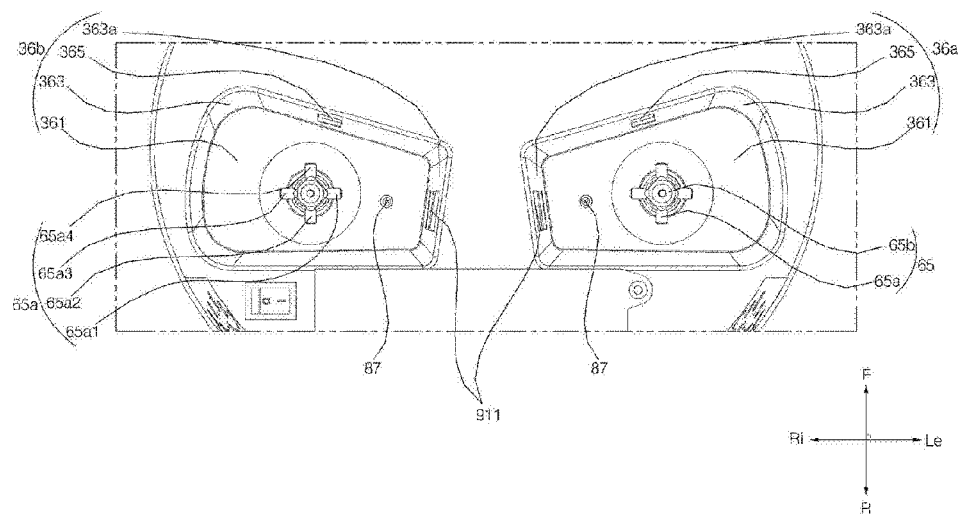
FIG. 22 is a bottom elevational view showing a module seating portion of a body shown in FIG. 18.

Referring to FIG. 22, the water supply module may include a water-supply connection portion 87 for guiding water in the water tank 81 to the mop module 40. Water moves from the body 30 to the mop module 40 through the water-supply connection portion 87. The water-supply connection portion 87 may be disposed at a lower side of the body 30. The water-supply connection portion 87 may be disposed at a module seating portion 36. The water-supply connection portion 87 may be disposed on a lower surface of the module seating portion 36. The water-supply connection portion 87 may be disposed at a lower surface portion 361 of the module seating portion 36.

A pair of water-supply connection portion 87 corresponding to the pair of spin mops 41a and 41b may be provided. The pair of water-supply connection portions 87 may be bisymmetrical or bilaterally symmetrical to each other.

The water-supply connection portion 87 may protrude from the module seating portion 36. The water-supply connection portion 87 may protrude to a lower side from the module seating portion 36. The water-supply connection portion 87 may be engaged with a water-supply counterpart portion 441 of the mop module 40 to be described later. The water-supply connection portion 87 may include a hole penetrating the module seating portion 36 in an up-down direction, and water in the body 30 may move to the mop module 40 through the hole of the water-supply connection portion 87. The water in the body 30 may move to the mop module 40 through the water-supply connection portion 87 and the water-supply counterpart portion 441.

Figure 23:
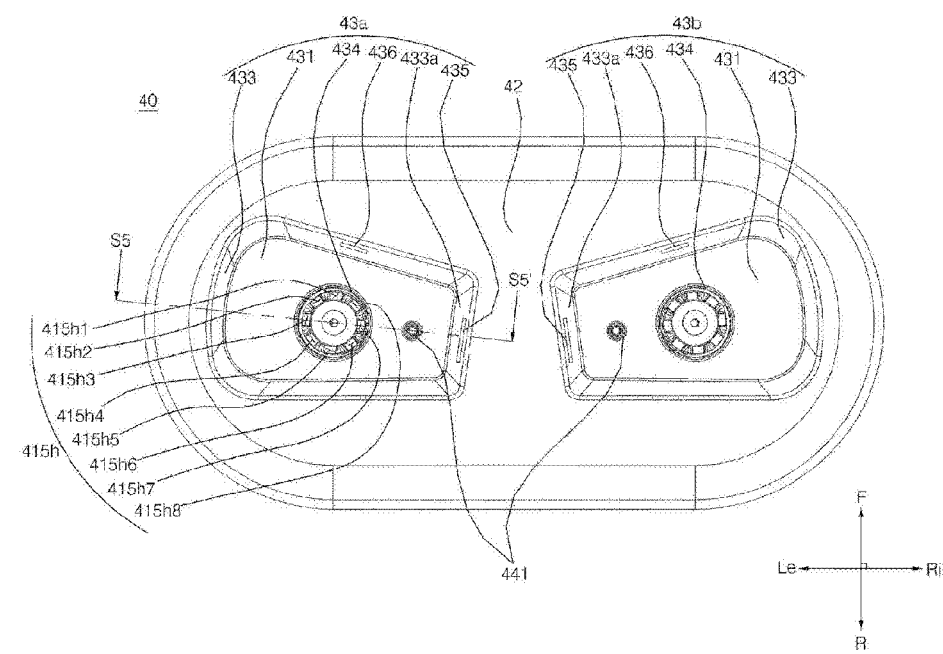
FIG. 23 is a top elevational view of a mop module shown in FIG. 4.
Figure 24:
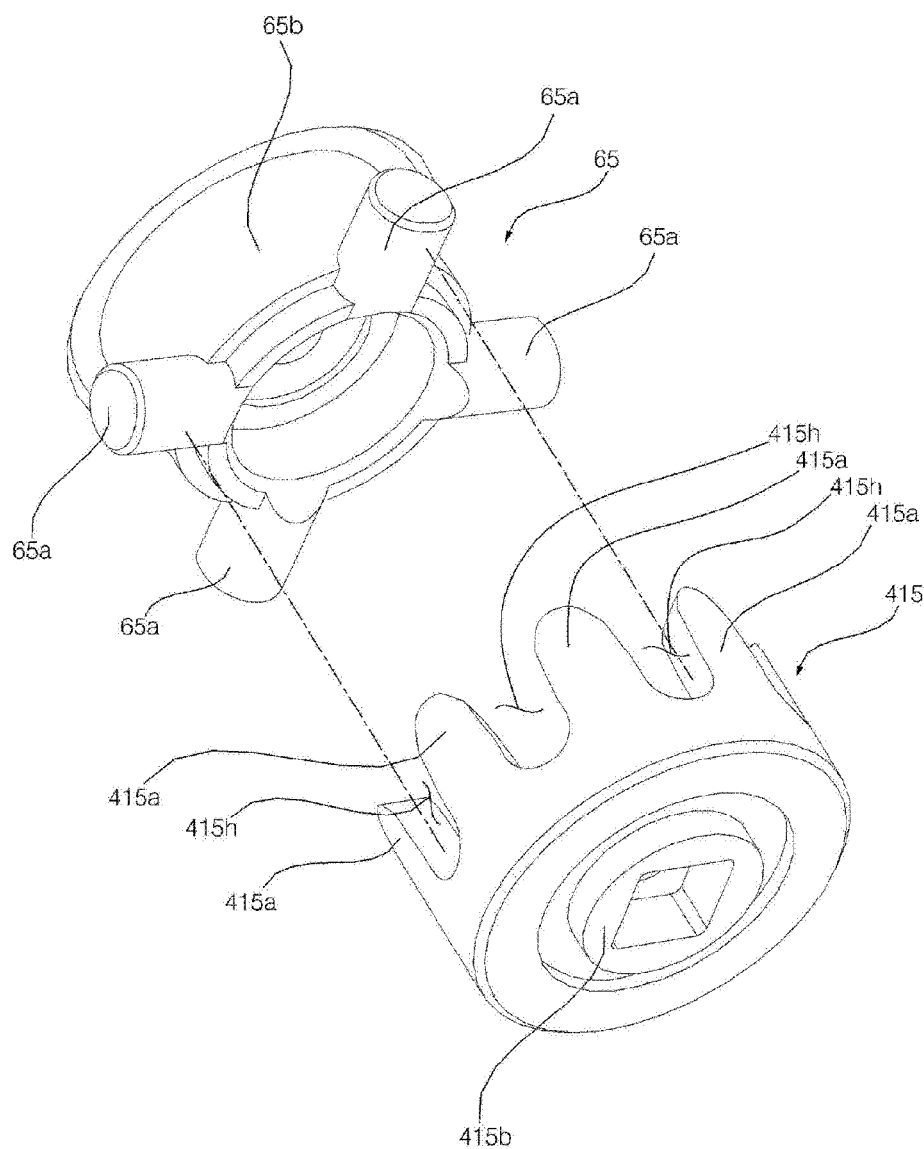
FIG. 24 is an exploded perspective view showing a connection relationship between a driving joint of the body shown in FIG. 4 and a driven joint of the mop module shown in FIG. 23.

Referring to FIG. 22 and FIG. 23, the mop module 40 may include at least one mop portion 411 provided to mop a floor while rotating. The mop module 40 may include at least one spin mop 41 provided to be in contact with the floor while rotating in a clockwise direction or a counterclockwise direction when viewed from an upper side. The mop module 40 may include a pair of spin mops 41a and 41b. The pair of spin mops 41a and 41b may mop the floor by a clockwise or counterclockwise rotation when viewed from an upper side. The pair of spin mops 41a and 41b may include a left spin mop 41a and a right spin mop 41b. In the present embodiment, the spin mop 41 may rotate around rotational axes Osa and Osb extending substantially in an up-down direction.

The mop module 40 may be disposed at a lower side of the body 30. The mop module 40 may be disposed at a rear side of the sweep module 2000.

The left spin mop 41a and the right spin mop 41b may include a mop portion 411, a rotating plate 412, and a spin shaft 414, respectively. The left spin mop 41a and the right spin mop 41b each includes a water container 413. The left spin mop 41a and the right spin mop 41b each includes a driven joint 415. The descriptions of the mop portion 411, the rotating plate 412, the spin shaft 414, the water container 413, and the driven joint 415, which will be described later, may be understood as components or elements included in each of the left spin mop 41a and the right spin mop 41b.

The body 30 and the mop module 40 may be detachably coupled to each other. A state in which the body 30 and the mop module 40 are coupled to each other may be referred to as a 'coupled state'. In addition, a state in which the body 30 and the mop module 40 are separated from each other may be referred to as a 'separation state'. The mobile robot 1 may include a detachable module 90 that detachably hooks the mop module to the body. The detachable module 90 may release the coupling of the mop module 40 and the body 30 in the coupled state. The detachable module 90 operates such that the mop module 40 and the body 30 are detachably coupled to each other so that the mop module 40 is coupled to the body 30 and the mop module 40 is separated from the body 30 as necessary. The detachable module 90 may cause the mop module 40 to hang on or hooked to the body 30 in the separation state. The detachable module 90 may be disposed across the gap between the water tank 81 and the battery Bt.

The mobile robot 1 may include a base 32 forming a lower surface of the body 30. The base 32 may form a lower surface, a front surface, a rear surface, a left surface, and a right surface of the body 30. The mop module 40 may be coupled to the base 32. The sweep module 2000 may be coupled to the base 32. A controller Co and a battery Bt are disposed at an inner space formed by the case 31 and the base 32. In addition, the mop driving unit 60 may be disposed at the body 30. A water supply module may be disposed at the body 30. The detachable module 90 may be disposed at the body 30. The water supply module delivers the water in a water tank 200 to the mop module 40.

The mobile robot 1 may include a module housing 42 that forms an external appearance of the mop module 40. The module housing 42 may be disposed at a lower side of the body 30. The mobile robot 1 may include a module cabinet 52 that forms an external appearance of the sweep module 2000. The module cabinet 52 may be disposed at a lower side of the body 30. The module housing 42 and the module cabinet 52 may be spaced apart in a front-rear direction.

The mop module 40 may be detachably coupled to the body 30. The mop module 40 may be coupled to a lower side of the body 30. The body 30 may be coupled to an upper side of the mop module 40. The body 30 may include a module seating portion 36, and the mop module 40 may include a body seating portion 43. The body seating portion 43 may be detachably coupled to the module seating portion 36.

Referring to FIG. 22, the module seating portion 36 may be provided at a lower side of the body 30. The body seating portion 43 may be provided at an upper side of the mop module 40. The module seating portion 36 may be disposed at a lower surface of the base 32. The body seating portion 43 may be disposed at an upper surface of the module housing 42.

One of the module seating portion 36 and the body seating portion 43 may protrude in an up-down direction and the other of the module seating portion 36 and the body seating portion 43 may be recessed in the up-down direction to be engaged with the one of the module seating portion 36 and the body seating portion 43.

In the present embodiment, the body seating portion 43 may protrude to an upper side from the mop module 40. The module seating portion 36 in the body 30 may be recessed to an upper side to be engagement with the body seating portion 43.

When viewed from an upper side, a shape of the body seating portion 43 may be asymmetrical in the front-rear direction. Through this, when the mop module 40 is coupled to the body 30 in an inverted direction in the front-rear direction, the body seating portion 43 is not engaged with the module seating portion 36. Accordingly. the mop module and the body 30 may be coupled to each other in a predetermined direction.

Referring to FIG. 23, the mop module 40 may include a pair of body seating portions 43a and 43b spaced apart from each other. The pair of body seating portions 43a and 43b correspond to the pair of spin mops 41a and 41b. The pair of body seating portions 43a and 43b correspond to a pair of module seating portions 36a and 36b.

The body 30 may include a pair of module seating portions 36a and 36b that are spaced apart from each other. The pair of module seating portions 36a and 36b correspond to the pair of body seating portions 43a and 43b.

The pair of body seating portions 43a and 43b may protrude to an upper side of the mop module 40. The pair of module seating portions 36a and 36b may be recessed to an upper side to be engaged with the pair of body seating portions 43a and 43b.

The module seating portion 36 includes a lower surface portion 361 forming a lower surface. The lower surface portion 361 may be in contact with an upper surface portion 431 of the body seating portion 43 in the coupled state. The lower surface portion 361 faces a lower side. The lower surface portion 361 may be formed horizontally. The lower surface portion 361 may be disposed at an upper side of a peripheral counterpart portion 363.

The module seating portion 36 includes a peripheral counterpart portion 363 disposed along a circumference of the lower surface portion 361. The peripheral counterpart portion 363 may be in contact with a peripheral portion 433 of the body seating portion 43 in the coupled state. The peripheral counterpart portion 363 may form an inclined surface connecting a lower surface of the base 32 and the lower surface portion 361. The peripheral counterpart portion 363 may be inclined such that a height increases as it goes from the lower surface of the base 32 toward the lower surface portion 361. The peripheral counterpart portion 363 may be disposed to surround the lower surface portion 361.

The pair of module seating portions 36 may include a pair of engaging surfaces 363a inserted between the pair of body seating portions 43. At the peripheral counterpart portion 363 of one of the module seating portions 36, the engaging surface 363a may be disposed at an area close to another adjacent module seating portion 36. The engaging surface 363a may be disposed at a region relatively close to the central vertical surface Po among the peripheral counterpart portion 363. The engaging surface 363a may constitute a part of the peripheral counterpart portion 363.

The module seating portion 36 may form a joint hole 364 to which at least a portion of a driving joint 65 is exposed. The joint hole 364 may be formed at the lower surface portion 361. The driving joint 65 may be disposed through the joint hole 364. The driving joint 65 is coupled to the driven joint 415 to transmit the driving force of the mom driving unit (not shown) to the spin mop.

Among the module seating portion 36 and the body seating portion 43, a surface of one may be provided with engaging portions 915 and 365, and a surface of the other counterpart portions may be provided with engaging counterpart portions 435 and 436 that are recessed to be engaged with the engaging portions 915 and 365 in the coupled state.

The body seating portion 43 may include an upper surface portion 431 forming an upper surface. The upper surface portion 431 may be in contact with the lower surface portion 361 of the module seating portion 36 in the coupled state. The upper surface portion 431 faces an upper side. The upper surface portion 431 may be formed horizontally. The upper surface portion 431 may be disposed at an upper side of the peripheral portion 433.

The body seating portion 43 may include a peripheral portion 433 disposed along a circumference of the upper surface portion 431. The peripheral portion 433 may be in contact with the peripheral counterpart portion 363 of the module seating portion 36 in the coupled state. The peripheral portion 433 may form an inclined surface connecting an upper surface of the module housing 42 and the upper surface portion 431. The peripheral portion 433 may be inclined such that a height increases as it goes from the upper surface of the module housing 42 toward the upper surface portion 431. The peripheral portion 43 may be disposed to surround the upper surface portion 431.

The body seating portion 43 may include an engaging counterpart surface 433a being in contact with the engaging surface 363a in the coupled state. The pair of body seating portions 43 may include a pair of engaging counterpart surfaces 433a. The pair of engaging counterpart surfaces 433a may be disposed to face each other at an angle in a left-right direction. The pair of engaging counterpart surfaces 433a may be formed between the pair of body seating portions 43. At the peripheral portions 433 of one of the body seating portions 43, the engaging counterpart surface 433a may be disposed at an area close to another adjacent body seating portion 43. The engaging counterpart surface 433a may be disposed at a region relatively close to the central vertical surface Po among the peripheral portion 433. The engaging counterpart surface 433a may constitute a part of the peripheral portion 433.

The body seating portion 43 may be provided with a driving hole 434 through which at least a portion of the driven joint 415 is exposed. The driving hole 434 may be formed at the upper surface portion 431. In the coupled state, the driving joint 65 may be inserted into the driving hole 434 and connected to the driven joint 415.

The engaging counterpart portions 435 and 436 may be holes or grooves formed at a surface of the body seating portion 43. The engaging counterpart portions 435 and 436 may be disposed at the peripheral portion 433. A plurality of engaging counterpart portions 435 and 436 corresponding to the plurality of engaging portions 915 and 365 may be provided.

The engaging counterpart portions 435 and 436 may include a first engaging counterpart portion 435 where a first engaging portion 915 is engaged. The first engaging counterpart portion 435 may be formed at the engaging counterpart surface 433a.

The engaging counterpart portions 435 and 436 may include a second engaging counterpart portion 436 where a second engaging portion 365 is engaged. The second engaging counterpart portion 436 may be formed at the peripheral portion 433.

The mop module 40 may include at least one spin mop 41. The at least one spin mop 41 may include a pair of spin mops 41. The pair of spin mops 41a and 41b may be bisymmetrical or laterally symmetrical to each other with respect to an imaginary central vertical surface. The left spin mop 41a and the right spin mop 41b may be bisymmetrical or laterally symmetrical to each other.

A lower surface of the left spin mop 41a and a lower surface of the right spin mop 41b may be inclined, respectively. The lower surface of the left spin mop 41a entirely forms a downward slope in a left direction. The lower surface of the right spin mop 41b entirely forms a downward slope in a right direction. The lowest point Pla at the lower surface of the left spin mop 41a is positioned at a left side portion. The highest point Pha at the lower surface of the left spin mop 41a is positioned at a right side portion. The lowest point Plb at the lower surface of the right spin mop 41b is positioned at a right side portion. The highest point Phb at the lower surface of the right spin mop 41b is positioned at a left side portion.

The movement of the cleaner 1 is achieved by friction force with the floor or the ground generated by the mop module 40.

The mop module 40 may generate 'a forward-moving friction force' for moving the body 30 in a front direction, or 'a rearward-moving friction force' for moving the body 30 in a rear direction. The mop module 40 may generate 'a left-moment friction force' to rotate or turn the body 30 left, or 'a right-moment friction force' to rotate or turn the body 30 right. The mop module 40 may generate friction force in which any one of the forward-moving friction force and the rearward-moving friction force is combined with any one of the left-moment friction force and the right-moment friction force.

In order for the mop module 40 to generate the forward-moving friction force, the left spin mop 41a may rotate at a predetermined rpm R1 in a first normal direction w1f and the right spin mop 41b may rotate at the predetermined rpm R1 in a second normal direction w2f.

In order for the mop module 40 to generate the rearward-moving friction force, the left spin mop 41a may rotate at a predetermined rpm R2 in a first reverse direction w1r and the right spin mop 41b may rotate at the predetermined rpm R2 in a second reverse direction w2r.

The spin mop 41 may include a driven joint 415 that rotate while being engaged with the driving joint 65. The driving joint 65 may be exposed to an outside of the body 30. At least a portion of the driven joint 415 may be exposed to an outside of the mop module 40.

In the separation state, the driving joint 65 and the driven joint 415 are separated from each other. In the coupled state, the driving joint 65 and the driven joint 415 are engaged with each other.

Among the driving joint 65 and the driven joint 415, one may include a plurality of driving protrusions 65a disposed at a circumferential direction around its rotation axis, and the other may include a plurality of driving grooves 415h disposed at a circumferential direction around its rotation axis.

The driving protrusions 65a may be spaced apart from each other at regular intervals. The plurality of driving grooves 415h may be spaced apart from each other at regular intervals. In the coupled state, the driving protrusion 65a is inserted into the driving groove 415h. In the separation state, the driving protrusion 65a is separated from the driving groove 415h.

Among the driving joint 65 and the driven joint 415, one may include a plurality of driving protrusions 65a disposed at a circumferential direction around its rotation axis, and the other may include a plurality of opposing protrusions 415a disposed at a circumferential direction around its rotation axis. The plurality of opposing protrusions 415a may protrude in one direction.

The plurality of opposing protrusions 415a may be spaced apart from each other at regular intervals. In the coupled state, one driving protrusion 65a is provided to be disposed between two adjacent opposing protrusions 415a. In the separation state, the driving protrusion 65a is separated from between two adjacent opposing protrusions 415a. In the coupled state, at least one opposing protrusion 415a is provided to be disposed between two adjacent driving protrusions 65a. In the present embodiment, in the coupled state, two opposing protrusions 415a are provided to be disposed between two adjacent driving protrusions 65a.

A protruding end of the opposing protrusion 415a may be rounded. The protruding end of the opposing protrusion 415a may be rounded according to an arrangement direction of the plurality of opposing protrusions 415a. The protruding end of the opposing protrusion 415a may be a rounded corner portion rounded to a direction of the adjacent opposing protrusion 415a with respect to a central axis of the protruding direction. Through this, when the separation state is changed to the coupled state, the driving protrusion 65a may move smoothly and be inserted into the driving groove 415h along the rounded protruding end of the opposing protrusion 415a.

In the present embodiment, the driving joint 65 includes the driving protrusion 65a, and the driven joint 415 includes the driving groove 415h. In the present embodiment, the driven joint 415 includes the opposing protrusion 415a. Hereinafter, the present embodiment will be described.

The driven joint 415 may be fixed to an upper end of the spin shaft 414. The driven joint 415 may include a driven axis portion 415b fixed to the spin shaft. The driven joint 415 may including opposing protrusions 415a protruding from the driven axis portion 415b. The opposing protrusions 415a may protrude from the driven axis portion 415b in one direction toward the driving joint 65 among an up direction and a down direction.

Figure 25:
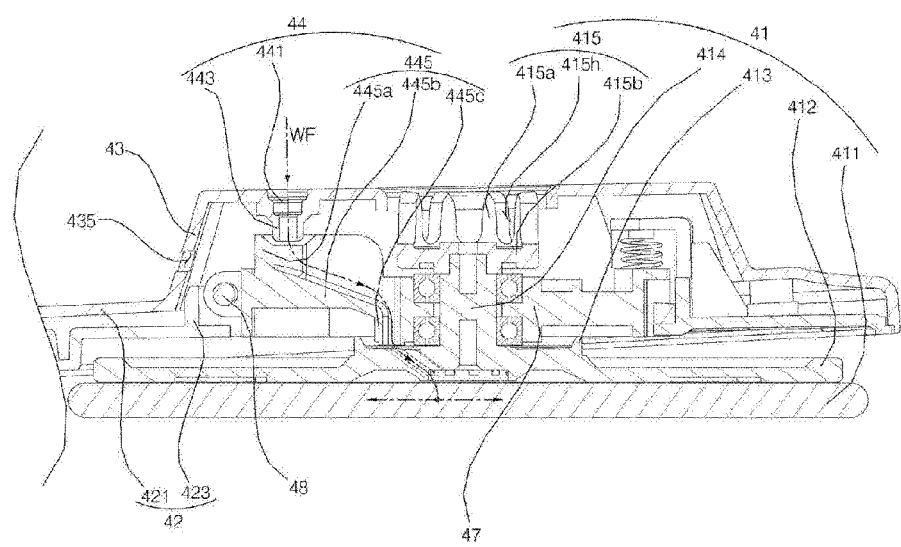
FIG. 25 is a partially cross-sectional view of the mobile robot 1 taken vertically along line S5-S5' of FIG. 23.
Figure 26:
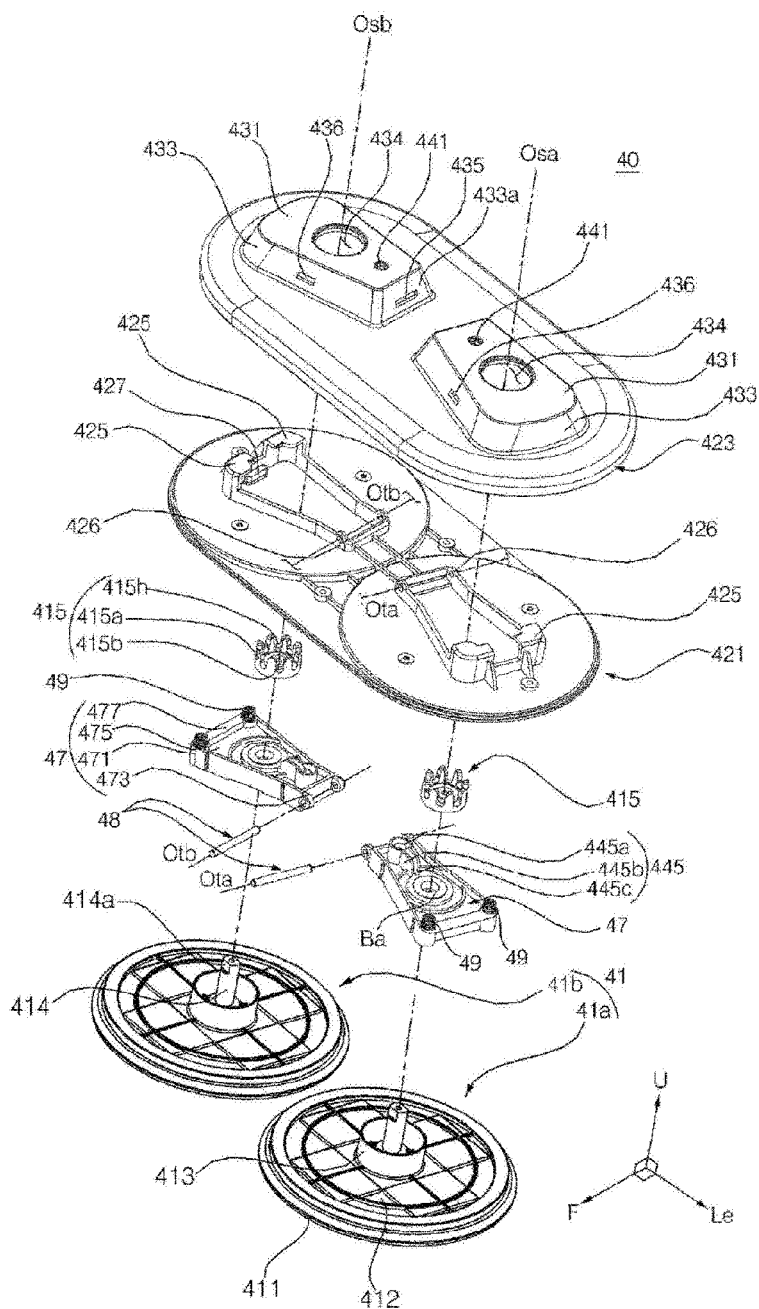
FIG. 26 is an exploded perspective view of the mop module shown in FIG. 23.
Figure 27:
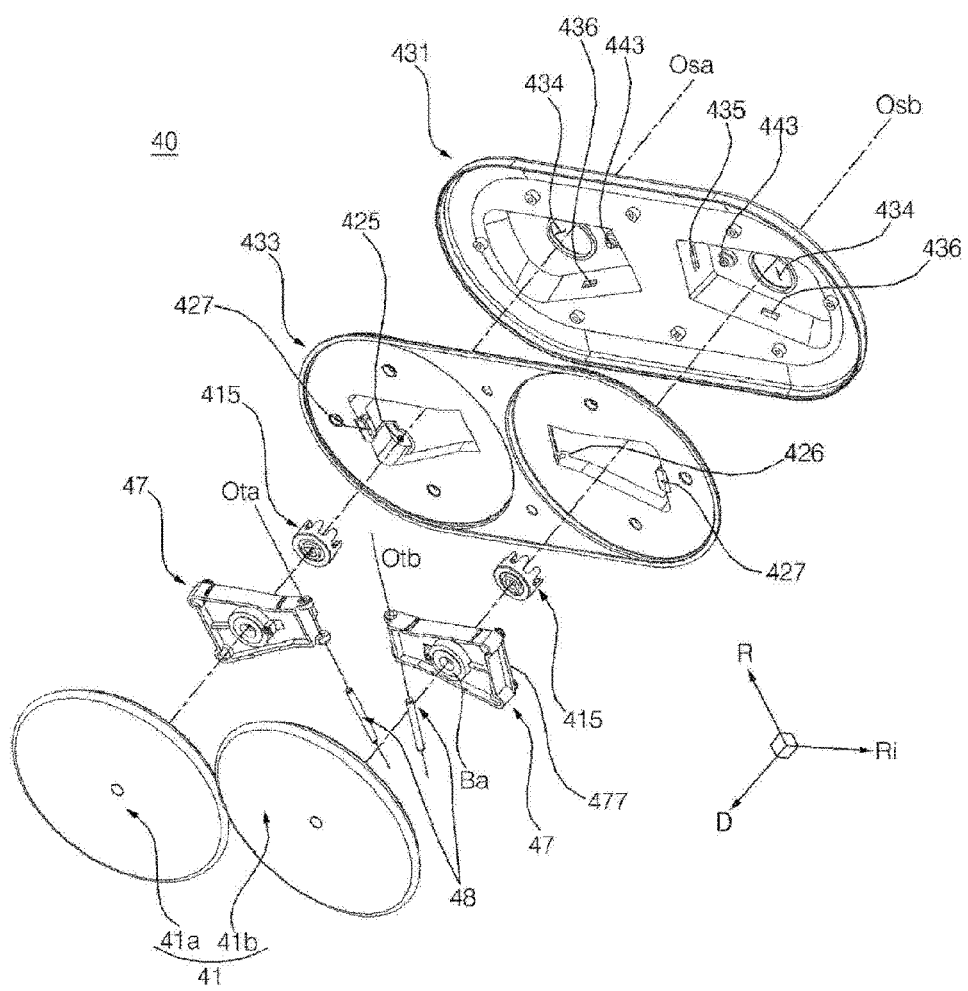
FIG. 27 is an exploded perspective view of the mop module shown in FIG. 26 when viewed from another angle.
Figure 28:
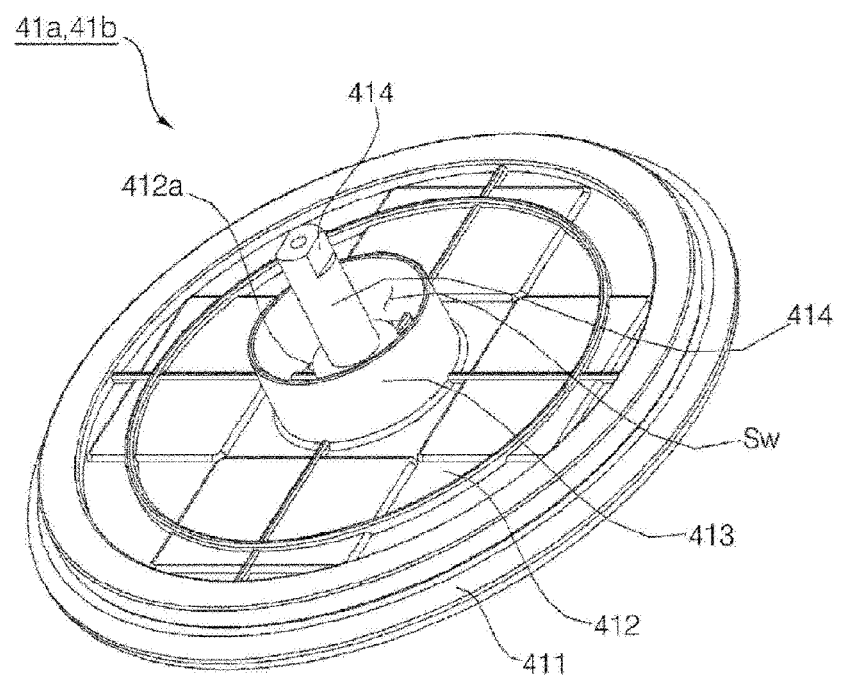
FIG. 28 is a perspective view showing a spin mop shown in FIG. 27.
Figure 29:
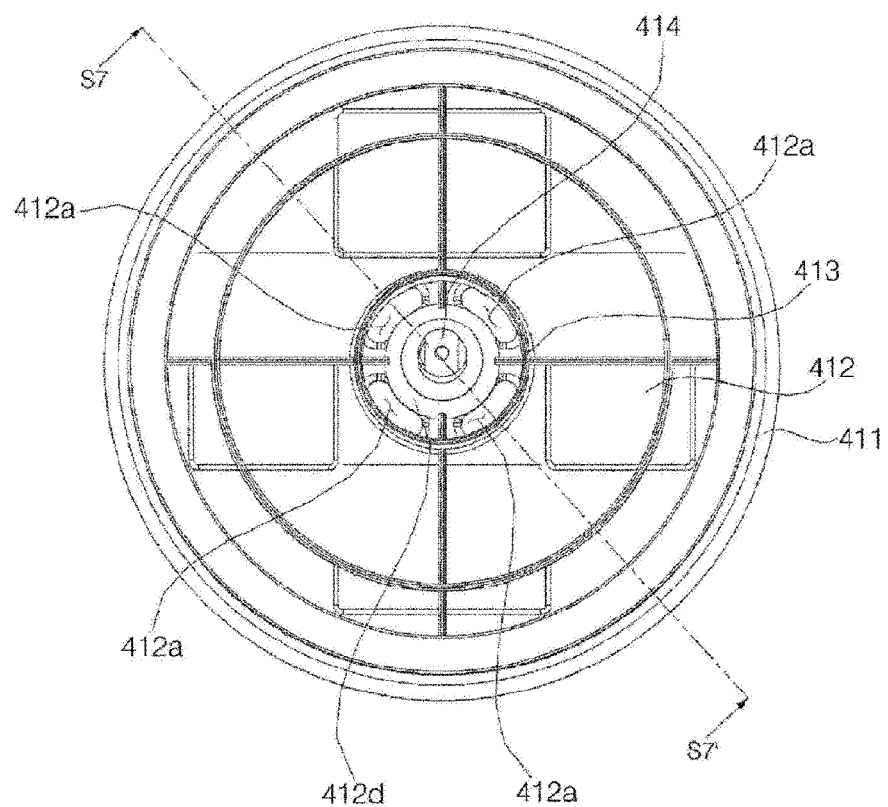
FIG. 29 is an elevational view of the spin mop shown in FIG. 27 when viewed from an upper side.
Figure 30:
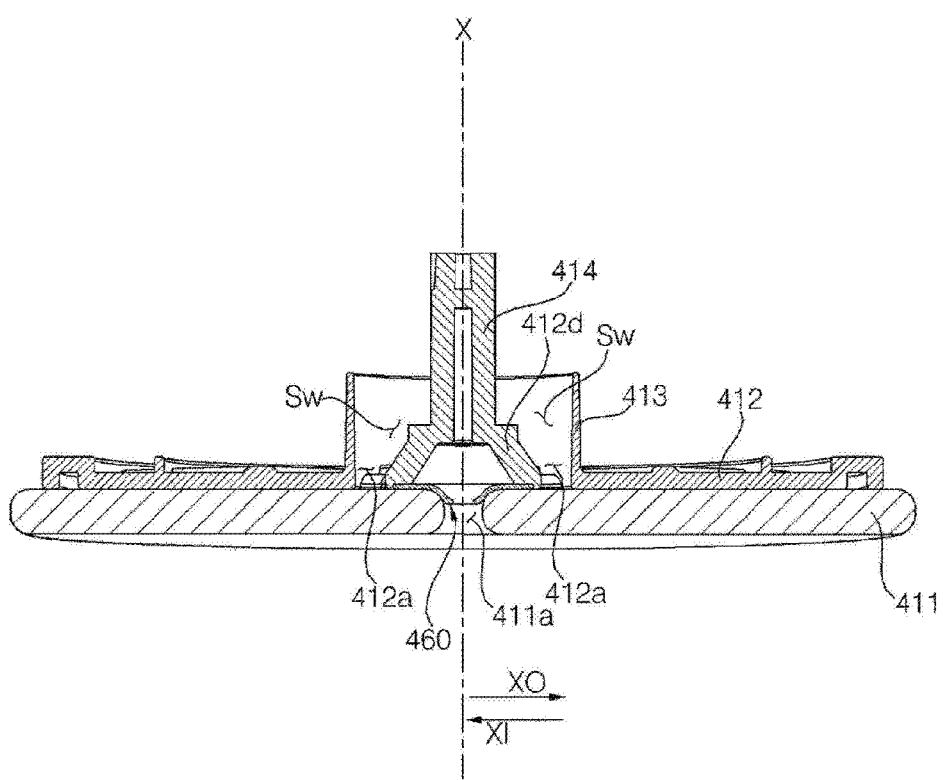
FIG. 30 is a cross-sectional view of the spin mop taken vertically along the lines S7-S7' of FIG. 29.
Figure 31:
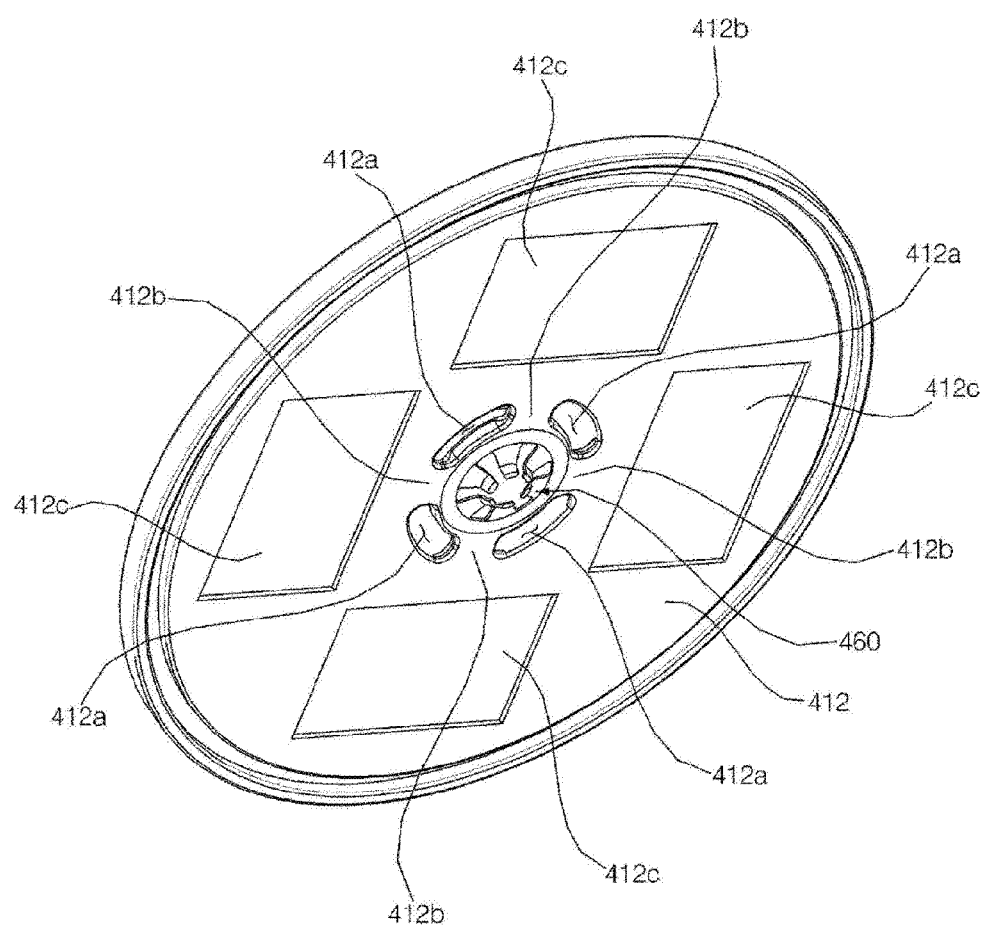
FIG. 31 is a perspective view showing a state in which a rotating plate shown in FIG. 28 and an attachment guider are coupled to each other.
Figure 32:
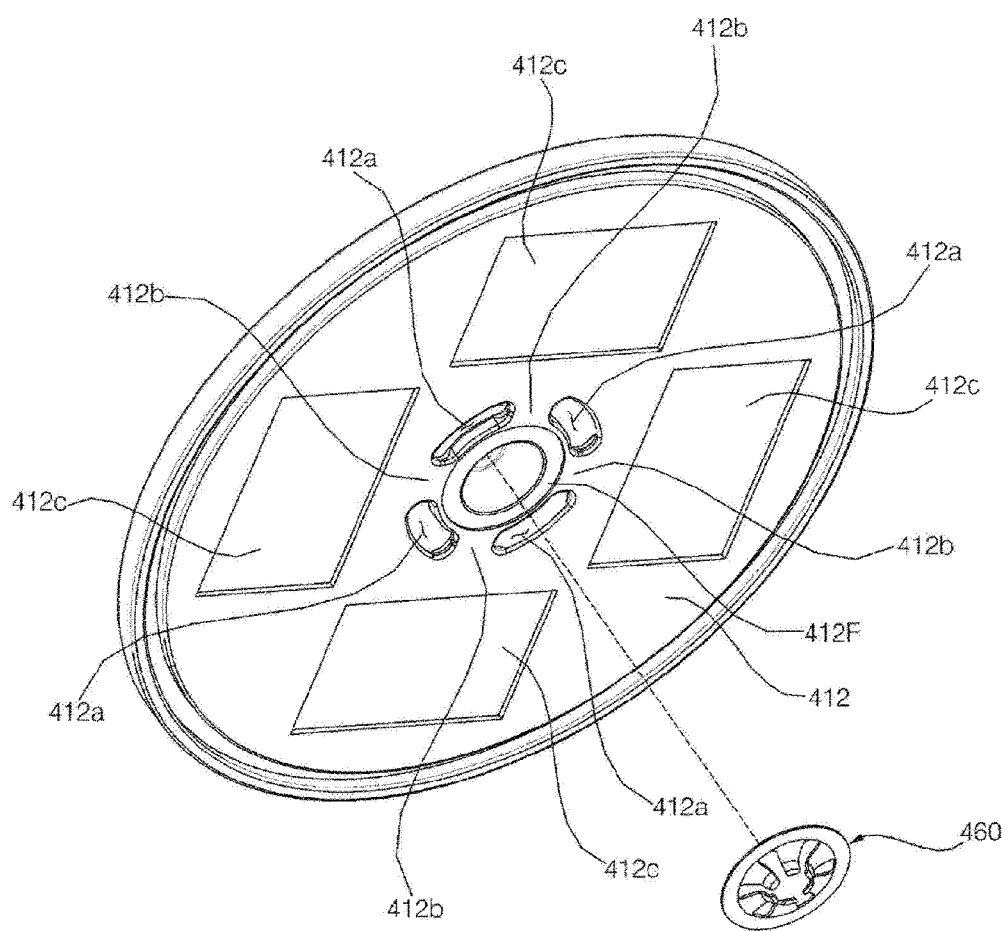
FIG. 32 is an exploded perspective view of the rotating plate and the attachment guider shown in FIG. 31.

Referring to FIG. 25 to FIG. 27, the module housing 42 may connect a pair of spin mops 41a and 41b. By the module housing 42, a pair of spin mops 41a and 41b may be separated from the body 30 together and be coupled to the body 30 together. The body seating portion 43 may be disposed at an upper side of the module housing 42. The spin mops 41 may be rotatably supported by the module housing 42. The spin mops 41 may be disposed by penetrating through the module housing 42.

The module housing 42 may include an upper cover 421 forming an upper portion and a lower cover 423 forming a lower portion. The upper cover 421 and the lower cover 423 may be coupled to each other. The upper cover 421 and the lower cover 423 may form an inner space accommodating a part of the spin mops 41a and 41b.

The suspension units 47, 48, and 49 may be disposed in the module housing 42. The suspension units 47, 48, and 49 may be disposed in an inner space formed by the upper cover 421 and the lower cover 423. The suspension units 47, 48, 49 may support the spin shaft 414 to be movable up and down within a predetermined range. The suspension units 47, 48, 49 according to the present embodiment may include a tilting frame 47, a tilting shaft 48, and an elastic member 49.

The module housing 42 may include a limit that limits a rotation range of the tilting frame 47.

The limit may include a lower limit 427 that limits a rotation range of the tilting frame 47 in a down direction. The lower limit 427 may be disposed at the module housing 42. The lower limit 427 may be provided to be in contact with a lower-limit contacting portion 477 in a state in which the tilting frame 47 is rotated as far as possible to a down side. In a state in which the mobile robot 1 is normally disposed at an external horizontal surface, the lower-limit contacting portion 477 is spaced apart from the lower limit 427. In a state in which there is no force pushing from a lower side to an upper side of the spin mops 41, the tilting frame 47 rotates to have a maximum angle, and the lower-limit contacting portion 477 and the lower limit 427 may become in contact with each other and an inclination angle become the largest.

The limit may include an upper limit (not shown) that limits a rotation range of the tilting frame 47 in an upper direction. In the present embodiment, a rotation range of the tilting frame 47 to an upper side may be limited by a close contact between the driving joint 65 and the driven joint 415. In a state in which the mobile robot 1 is normally disposed at an external horizontal surface, the driven joint 415 may be in close contact with the driving joint 65 to the maximum, and an inclination angle may become the smallest.

The module housing 42 may include a second support portion 425 that fixes an end of the elastic member 49. When the tilting frame 47 rotates, the elastic member 49 may be elastically deformed or restored by a first support portion 475 fixed to the tilting frame 47 and the second support portion 425 fixed to the module housing 42.

The module housing 42 may include a tilting-shaft support portion 426 that supports the tilting shaft 48. The tilting-shaft support portion 426 may support both ends of the tilting shaft 48.

The mop module 40 may include a water supply portion 44 that guides the water introduced from the water tank 81 to the spin mops 41 in a coupled state. The water supply portion 44 guides water from an upper side to a lower side. A pair of water supply portion 44 may be provided to correspond to the pair of the spin mops 41a and 41b.

The water supply portion 44 may include one water-supply counterpart portion 441 that receives water from the water tank 81. The water-supply counterpart portion 441 may be connected to the water-supply connection portion 87. The water-supply counterpart 441 may be provided with a groove or a hole into which one end of the water-supply connection portion 87 is inserted. The water-supply counterpart portion 441 may be disposed at a body seating portion 43. The water-supply counterpart portion 441 may be disposed at an upper surface portion 431 of the body seating portion 43. The water-supply counterpart portion 441 may be formed by a recessed portion of a surface of the body seating portion 43 to a lower side.

The water supply portion 44 may include a water delivery portion 443 that guides water flowing into the water-supply counterpart portion 441 to a water guidance portion 445. The water delivery portion 443 may be disposed at the module housing 42. The water delivery portion 443 may protrude downward or to a lower side than an inner upper surface of the upper cover 421. The water delivery portion 443 may be disposed at a lower side of the water-supply counterpart portion 441. The water delivery portion 443 may be provided to drop water downward or to a lower side. The water-supply counterpart portion 441 and the water delivery portion 443 may form a hole connected vertically or in an up-down direction, and water flows downward along the hole.

The water supply portion 44 may include a water guidance portion 445 that guides water flowing into the water-supply counterpart portion 441 to the spin mop 41. The water flowing into the water-supply counterpart portion 441 flows into the water guidance portion 445 through the water delivery portion 443.

The water guidance portion 445 may be disposed at a tilting frame 47. The water guidance portion 445 may be fixed to a frame base 471. Water flows into a space formed by the water guidance portion 445 through the water-supply counterpart portion 441 and the water delivery portion 443. All water can flow into the water container 413 by minimizing water scattering through using the water guidance portion 445.

The water guidance portion 445 may include an inlet portion 445*a* forming a recessed space from an upper side to a lower side. The inlet portion 445*a* may accommodate a lower end portion of the water delivery portion 443. The inlet portion 445*a* may form a space in which an upper side is opened. Water that has passed through the water supply delivery portion 443 is introduced through the upper opened portion of the space of the inlet portion 445*a*. The space of the inlet portion 445*a* may be connected to a flow path where a flow path portion 445*b* is formed.

The water guidance portion 445 may include a flow path portion 445*b* connecting the inlet portion 445*a* and an outlet portion 445*c*. One end of the flow path portion 445*b* is connected to the inlet portion 445*a*, and the other end of the flow path portion 445*b* is connected to the outlet portion 445*c*. A space formed by the flow path portion 445*b* may become a movement path for water. The space of the flow path portion 445*b* is connected to the space of the inflow portion 445*a*. The flow path portion 445*b* may have a channel shape with an open top side. The flow path portion 445*b* may have a downward slope that is gradually lowered from the inflow portion 445*a* to the outflow portion 445*c*.

The water guidance portion 445 may include an outflow portion 445*c* that discharges water into a water supply space Sw of a water container 413. A lower end of the outlet portion 445*c* may be disposed at the water supply space Sw. The outlet portion 445*c* may form a hole connected to an upper space of the rotating plate 412 at an inner space of the module housing 42. The hole of the outlet portion 445*c* may connect two spaces vertically or in an up-down direction. The outlet portion 445*c* may form a hole penetrating the tilting frame 47 vertically or in an up-down direction. The space of the flow path portion 445*b* may be connected to the hole of the outlet portion 445*c*. The lower end of the outlet portion 445*c* may be disposed at an inside of the water supply space Sw of the water container 413.

The tilting frame 47 may be connected to the module housing 42 through the tilting shaft 48. The tilting frame 47 may support the spin shaft 414 to be rotatable.

The tilting frame 47 may be rotatable within a predetermined range around a tilting rotation axis Ota or Otb. The tilting rotation axes Ota and Otb may extend in a direction transverse to the rotation axes Osa and Osb of the spin shaft 414. The tilting shaft 48 may be disposed at the tilting rotation axes Ota and Otb. The tilting frame 47 at a left side may be provided to be rotatable within a predetermined range around the tilting rotation axis Ota. The tilting frame 47 at a right side may be provided to be rotatable within a predetermined range around the tilting rotation axis Otb.

The tilting frame 47 may be disposed to be tiltable within a predetermined angular range with respect to the mop module 40. An inclination angle of the tilting frame 47 may be changed according to a condition of a floor. The tilting frame 47 may function as a suspension (supporting weight and reducing vibration in an up-down direction at the same time) of the spin mops 41.

The tilting frame 47 may include a frame base 471 forming a lower surface. The spin shaft 414 may penetrates a frame base 471 in an up-down direction. The frame base 471 may have a plate shape having a thickness in the up-down direction. The tilting shaft 48 may rotatably connect the module housing 42 and the frame base 471.

A bearing Ba may be provided between the rotation-axis support 473 and the spin shaft 414. The bearing Ba may include a first bearing B1 disposed at a lower side and a second bearing B2 disposed at an upper side.

A lower end of the rotation-axis support portion 473 may be inserted into the water supply space Sw of the water container 413. An inner circumferential surface of the rotation-axis support portion 473 may support the spin shaft 414.

The tilting frame 47 may include a first support portion 475 for supporting one end of the elastic member 49. The other end of the elastic member 49 may be supported by a second support portion 425 disposed in the module housing 42. When the tilting frame 47 is tilted around the tilting shaft 48, a position of the first support portion 475 is changed and a length of the elastic member 49 is changed.

The first support portion 475 may be fixed to the tilting frame 47. The first support portion 475 is disposed at a left side of the left tilting frame 47. The first support portion 475 may be disposed at a right side of the right tilting frame 47. The second support portion 425 may be disposed at a left region of the left spin mop 41*a*. The second support portion 425 may be disposed at a right region of the right spin mop 41*b*.

The first support portion 475 may be fixed to the tilting frame 47. The first support portion 475 may be tilted together with the tilting frame 47 during a tilting operation of the tilting frame 47. A distance between the first support portion 475 and the second support portion 425 may be closest when an inclination angle is minimized, and a distance between the first support portion 475 and the second support portion 425 may be farthest away when an inclination angle is maximized. The elastic member 49 may elastically deformed to provide a restoring force in a state where the inclination angle is minimized.

The tilting frame 47 may include a lower-limit contacting portion 477 provided to be in contact with the lower limit 427. A lower side of the lower-limit contacting portion 477 may be in contact with an upper side of the lower limit 427.

The tilting shaft 48 may be disposed at the module housing 42. The tilting shaft 48 may be a rotation axis of the tilting frame 47. The tilting shaft 48 may extend in a direction perpendicular to an inclined direction of the spin mops 41. The tilting shaft 48 may extend in a horizontal direction. In the present embodiment, the tilting shaft 48 may extend in an inclined direction to having an acute angle with the front-rear direction.

The elastic member 49 may apply elastic force to the tilting frame 47. The elastic force is applied to the tilting frame 47 so that an inclination angle of a lower surface of the spin mops 41 with respect to a horizontal surface increases.

The elastic member 49 may be elongated when the tilting frame 47 rotates to a lower side and be shortened when the tilting frame 47 rotates to an upper side. The elastic member 49 allows the tilting frame 47 to operate to absorb shock (elastically). The elastic member 49 may apply moment force to the tilting frame 47 in a direction in which an inclination angle is increased.

The spin mop 41 may include a rotating plate 412 provided at a lower side of the body 30 to be rotatable. The rotating plate 412 may be formed of a plate member of a circular shape having a center at the spin shaft 414. A mop portion 411 may be fixed to a lower surface of the rotating plate 412. The rotating plate 412 rotates the mop portion 411. The spin shaft 414 may be fixed to a center portion of the rotating plate 412.

The rotating plate 412 may include a left rotating plate 412 and a right rotating plate 412 spaced apart from the left rotating plate 412. A lower surface of the left rotating plate 412 may form a downward slope to a left front side, and a lower surface of the right rotating plate 412 may form a downward slope to a right front side.

The rotating plate 412 may include a mop fixing portion 412*c* for fixing the mop portion 411. The mop fixing portion 412*c* may fix the mop portion 411 to be detachable. The mop fixing portion 412*c* may be a velcro or the like disposed at a lower side of the rotating plate 412. The mop fixing portion 412*c* may be a hook or the like disposed at an edge of the rotating plate 412.

A water supply hole 412*a* penetrating the rotating plate 412 in an up-down direction may be formed. The water supply hole 412*a* may connect a water supply space Sw and a lower side of the rotating plate 412. Water in the water supply space Sw may move to a lower side of the rotating plate 412 through the water supply hole 412*a*. The water in the water supply space Sw may move to the mop portion 411 through the water supply hole 412*a*. The water supply hole 412*a* may be disposed at a center portion of the rotating plate 412. The water supply hole 412*a* may be disposed at a position where the spin shaft 414 is not formed. Specifically, the water supply hole 412*a* may be disposed at a position not vertically overlapping the spin shaft 414.

The rotating plate 412 may be provided with a plurality of water supply holes 412*a*. A connection portion 412*b* may be disposed between the plurality of water supply holes 412*a*. The connection portion 412*b* may connect a centrifugal-direction XO portion and an opposite centrifugal-direction XI portion based on the water supply hole 412*a*. In this instance, the centrifugal-direction XO may mean a direction away from the spin shaft 414, and the opposite centrifugal-direction XI may mean a direction that approaches the spin shaft 414.

A plurality of water supply holes 412*a* may be spaced apart from each other along a circumferential direction of the spin shaft 414. The plurality of water supply holes 412*a* may be arranged to be spaced apart from each other at regular intervals. A plurality of connection portions 412*b* may be spaced apart from each other along the circumferential direction of the spin shaft 414. The water supply hole 412*a* may be disposed between the plurality of connection portions 412*b*.

The rotating plate 412 may include an inclined portion 412*d* disposed at a lower end of the spin shaft 414. The water in the water supply space Sw may flow down along the inclined portion 412*d* by gravity. The inclined portion 412*d* may be formed along a circumference of a lower end of the spin shaft 414. The inclined portion 412*d* may form a downward slope in the opposite centrifugal-direction XI. The inclined portion 412*d* may form a lower surface of the water supply hole 412*a*.

The spin mop 41 may include a mop portion 411 that is coupled to a lower side of the rotating plate 412 to be in contact with the floor. The mop portion 411 may be disposed to the rotating plate 412 to be replaceable. The mop portion 411 may be fixed to the rotating plate 412 to be detachable by a Velcro, hook, or so on. The mop portion 411 may be formed only of a mop, or may include a mop and a spacer (not shown). The mop is a part that mops or wipes a floor while being in direct contact with the floor.

The spin mop 41 may include a spin shaft 414 that rotates the rotating plate 412. The spin shaft 414 is fixed to the rotating plate 412 and transmits rotational force of the mop driving unit 60 to the rotating plate 412. The spin shaft 414 may be connected to an upper side of the rotating plate 412. The spin shaft 414 may be disposed at an upper center of the rotating plate 412. The spin shaft 414 may be fixed to a rotation center Osa or Osb (a rotation axis) of the rotating plate 412. The spin shaft 414 may include a joint fixing portion 414*a* for fixing a driven joint 415. The joint fixing portion 414*a* may be disposed at an upper end of the spin shaft 414.

The mop module 40 may include a water container 413 positioned at an upper side of the rotating plate 412 for accommodating water. The water container 413 may form a water supply space Sw in which water is accommodated. The water container 413 may surround a circumference of the spin shaft 414 and be spaced apart from the spin shaft 414 to form a water supply space Sw. The water container 413 allows water supplied to an upper side of the rotating plate 412 to be collected in the water supply space Sw before passing through the water supply hole 412*a*. The water supply space Sw may be disposed at an upper center portion of the rotating plate 412. The water supply space Sw may have a volume having a cylindrical shape as a whole. An upper side of the water supply space Sw may be opened. Water may be introduced into the water supply space Sw through the upper side of the water supply space Sw.

The water container 413 may protrude to an upper side of the rotating plate 412. The water container 413 may extend along a circumferential direction of the spin shaft 414. The water container 413 may have a shape of a ring-shaped rib. The water supply hole 412*a* is disposed at an inner lower surface of the water container 413. The water container 413 may be spaced apart from the spin shaft 414.

A lower end of the water container 413 may be fixed to the rotating plate 412. An upper end of the water container 413 may have a free end 463.

Referring to FIG. 28 to FIG. 32, the spin mop 41 may include a rotating plate 412 provided at a lower side of the body 30 to be rotatable. The rotating plate 412 may be formed of a plate member of a circular shape having a center at the spin shaft 414. A mop portion 411 may be fixed to a lower surface of the rotating plate 412. The rotating plate 412 rotates the mop portion 411. The spin shaft 414 may be fixed to a center portion of the rotating plate 412.

The rotating plate 412 may include a left rotating plate 412 and a right rotating plate 412 spaced apart from the left rotating plate 412. A lower surface of the left rotating plate 412 may form a downward slope to a left front side, and a lower surface of the right rotating plate 412 may form a downward slope to a right front side.

The rotating plate 412 may include a mop fixing portion 412*c* for fixing the mop portion 411. The mop fixing portion 412*c* may fix the mop portion 411 to be detachable. The mop fixing portion 412*c* may be a velcro or the like disposed at a lower side of the rotating plate 412. The mop fixing portion 412*c* may be a hook or the like disposed at an edge of the rotating plate 412.

A water supply hole 412*a* penetrating the rotating plate 412 in an up-down direction may be formed. The water supply hole 412*a* may connect a water supply space Sw and a lower side of the rotating plate 412. Water in the water supply space Sw may move to a lower side of the rotating plate 412 through the water supply hole 412*a*. The water in the water supply space Sw may move to the mop portion 411 through the water supply hole 412a. The water supply hole 412a may be disposed at a center portion of the rotating plate 412. The water supply hole 412a may be disposed at a position where the spin shaft 414 is not formed. Specifically, the water supply hole 412a may be disposed at a position not vertically overlapping the spin shaft 414.

The rotating plate 412 may be provided with a plurality of water supply holes 412a. A connection portion 412b may be disposed between the plurality of water supply holes 412a. The connection portion 412b may connect a centrifugal-direction XO portion and an opposite centrifugal-direction XI portion based on the water supply hole 412a. In this instance, the centrifugal-direction XO may mean a direction away from the spin shaft 414, and the opposite centrifugal-direction XI may mean a direction that approaches the spin shaft 414.

A plurality of water supply holes 412a may be spaced apart from each other along a circumferential direction of the spin shaft 414. The plurality of water supply holes 412a may be arranged to be spaced apart from each other at regular intervals. A plurality of connection portions 412b may be spaced apart from each other along the circumferential direction of the spin shaft 414. The water supply hole 412a may be disposed between the plurality of connection portions 412b.

The rotating plate 412 may include an inclined portion 412d disposed at a lower end of the spin shaft 414. The water in the water supply space Sw may flow down along the inclined portion 412d by gravity. The inclined portion 412d may be formed along a circumference of a lower end of the spin shaft 414. The inclined portion 412d may form a downward slope in the opposite centrifugal-direction XI. The inclined portion 412d may form a lower surface of the water supply hole 412a.

A receiving groove 412F where an attachment guider 460 for guiding an attachment position of the mop portion 411 is seated or settled may be formed at the rotating plate 412. The attachment guider 460 may be attached to a lower surface of the rotating plate 412, or may be integrally formed with the rotating plate 412.

The receiving groove 412F is formed of a recessed portion recessed to an upper side at a lower surface of the rotating plate 412. Specifically, the receiving groove 412F may have a ring shape surrounding the spin shaft 414 at the lower surface of the rotating plate 412. The receiving groove 412F accommodates the attachment guider 460 and exposes a lower portion of the attachment guider 460.

The spin mop 41 may include a mop portion 411 that is coupled to a lower side of the rotating plate 412 to be in contact with the floor. The mop portion 411 may be disposed to the rotating plate 412 to be replaceable. The mop portion 411 may be fixed to the rotating plate 412 to be detachable by a Velcro, hook, or so on. The mop portion 411 may be formed only of a mop, or may include a mop and a spacer (not shown). The mop is a part that mops or wipes a floor while being in direct contact with the floor.

The spacer may be disposed between the rotating plate 412 and the mop portion 411 to adjust a position of the mop portion 411. The spacer may be detachably fixed to the rotating plate 412, and the mop portion 411 may be detachably fixed to the spacer. As another example, a mop portion 411 may directly detachable to the rotating plate 412 without a spacer.

A guide hole 411a through which a part of the attachment guider 460 is inserted is formed at the mop portion 411. At least a part of a free end 463 of an elastic piece 462 of the attachment guider 460 may be inserted into the guide hole 411a. The guide hole 411a provides a reference for alignment of the attachment guider 460 and the mop portion 411.

The spin mop 41 may include a spin shaft 414 that rotates the rotating plate 412. The spin shaft 414 is fixed to the rotating plate 412 and transmits rotational force of the mop driving unit to the rotating plate 412. The spin shaft 414 may be connected to an upper side of the rotating plate 412. The spin shaft 414 may be disposed at an upper center of the rotating plate 412. The spin shaft 414 may be fixed to a rotation center Osa or Osb (a rotation axis) of the rotating plate 412. The spin shaft 414 may include a joint fixing portion 414a for fixing a driven joint 415. The joint fixing portion 414a may be disposed at an upper end of the spin shaft 414.

The spin shaft 414 may extend to be perpendicular to the rotating plate 412. A left spin shaft 414 may be disposed to be perpendicular to a lower surface of the left spin mop 41a and a right spin shaft 414 may be disposed to be perpendicular to a lower surface of the right spin mop 41b. In an embodiment in which a lower surface of the spin mop 41a or 41b has an inclination with respect to a horizontal plane, the spin shaft 414 may be inclined with respect to an axis in an up-down direction. An upper end of the spin shaft 414 may be inclined to one side with respect to a lower end of the spin shaft 414.

An inclination angle between the axis of the spin shaft 414 in the up-down direction may be changed according to a rotation of a tilting frame 47 around a tilting shaft 48. The spin shaft 414 may be rotatably coupled to the tilting frame 47 and may be provided to be able to tilt integrally with the tilting frame 47. When the tilting frame 47 is tilted, the spin shaft 414, the rotating plate 412, the water container 413, the driven joint 415, and the mop portion 411 may be inclined integrally with the tilting frame 47.

The mop module 40 may include a water container 413 positioned at an upper side of the rotating plate 412 for accommodating water. The water container 413 may form a water supply space Sw in which water is accommodated. The water container 413 may surround a circumference of the spin shaft 414 and be spaced apart from the spin shaft 414 to form a water supply space Sw. The water container 413 allows water supplied to an upper side of the rotating plate 412 to be collected in the water supply space Sw before passing through the water supply hole 412a. The water supply space Sw may be disposed at an upper center portion of the rotating plate 412. The water supply space Sw may have a volume having a cylindrical shape as a whole. An upper side of the water supply space Sw may be opened. Water may be introduced into the water supply space Sw through the upper side of the water supply space Sw.

The water container 413 may protrude to an upper side of the rotating plate 412. The water container 413 may extend along a circumferential direction of the spin shaft 414. The water container 413 may have a shape of a ring-shaped rib. The water supply hole 412a is disposed at an inner lower surface of the water container 413. The water container 413 may be spaced apart from the spin shaft 414.

A lower end of the water container 413 may be fixed to the rotating plate 412. An upper end of the water container 413 may have a free end 463.

Figure 33:
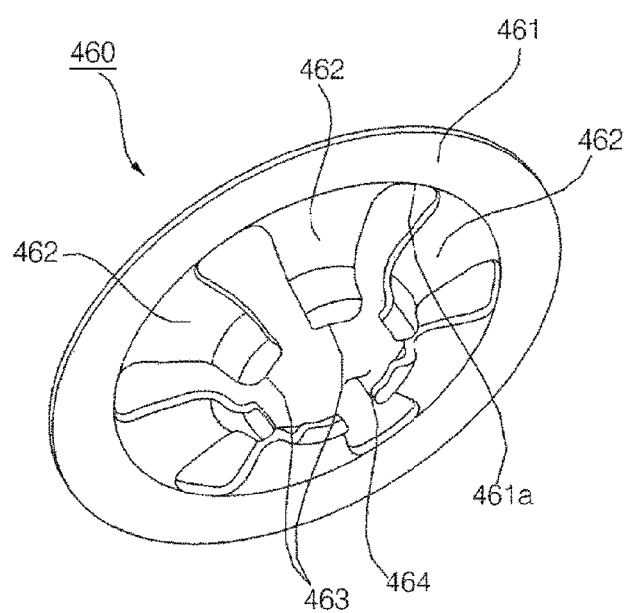
FIG. 33 is a perspective view of the attachment guider shown in FIG. 31.
Figure 34:
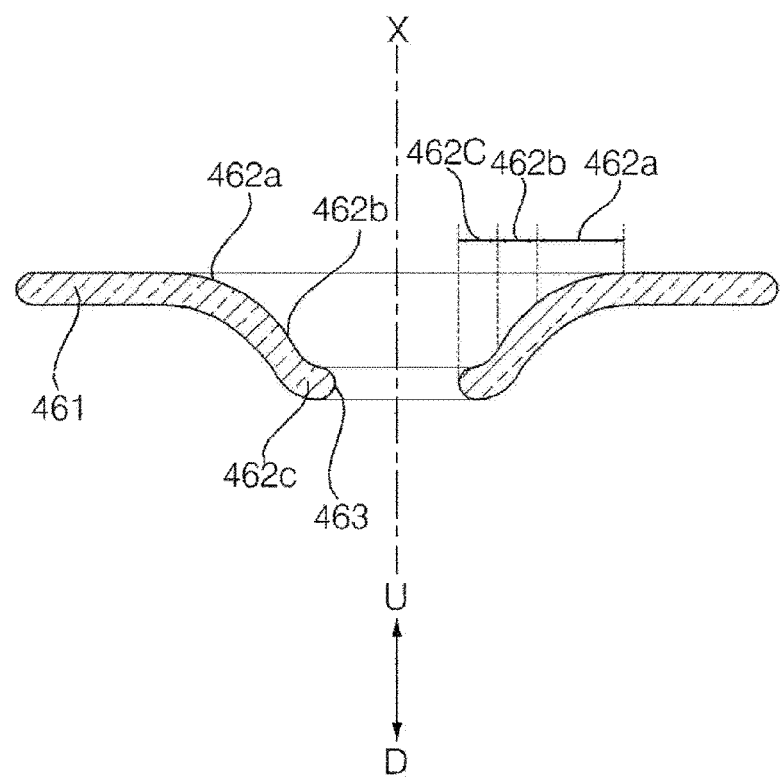
FIG. 34 is a vertical sectional view of the attachment guider shown in FIG. 33.
Figure 35:
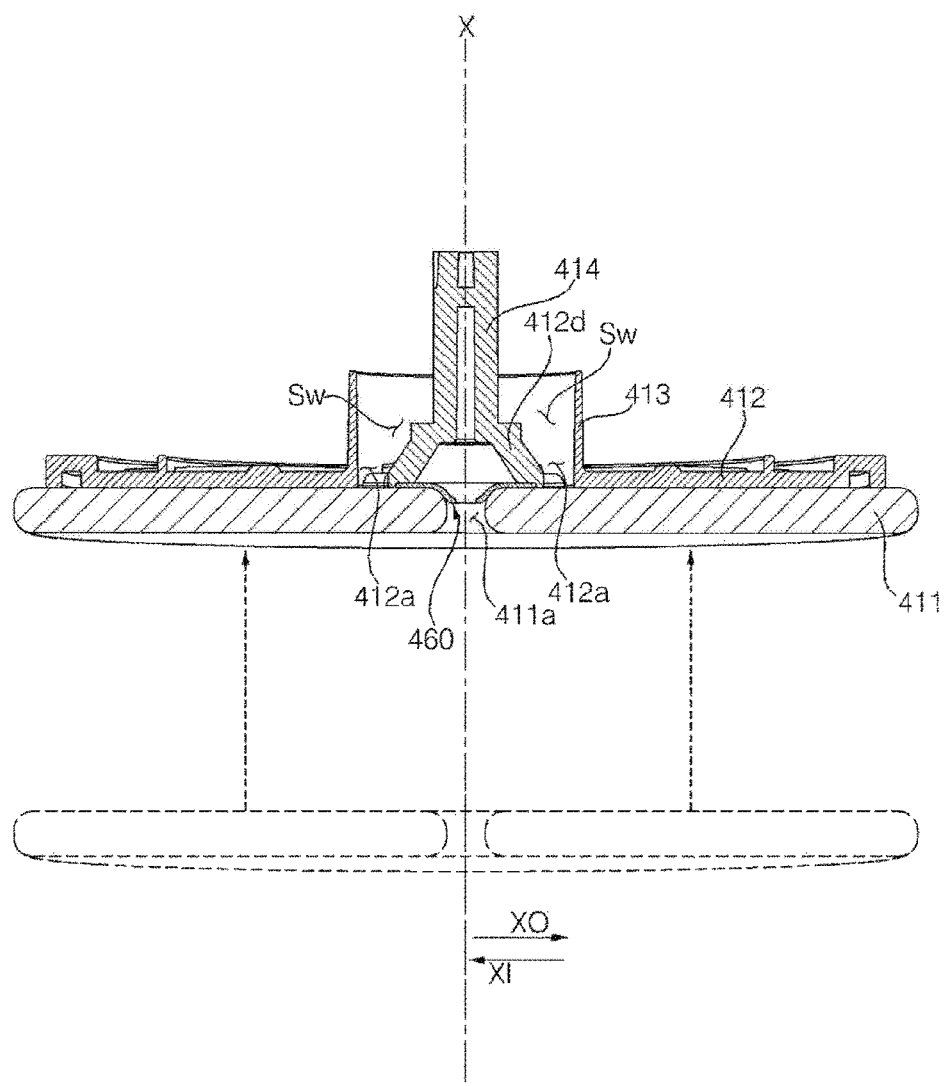
FIG. 35 is a view showing a state that a mop portion is attached to its original position of the rotating plate.
Figure 36:
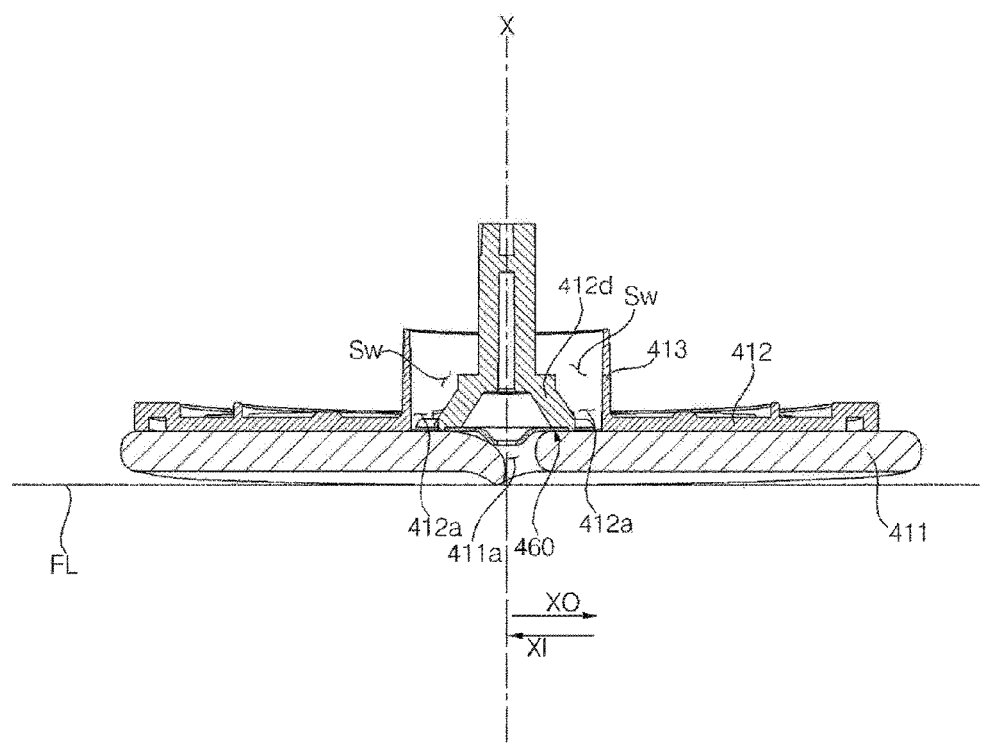
FIG. 36 is a view showing a state that a mop portion is attached to a position out of its original position of a rotating plate.
Figure 37:
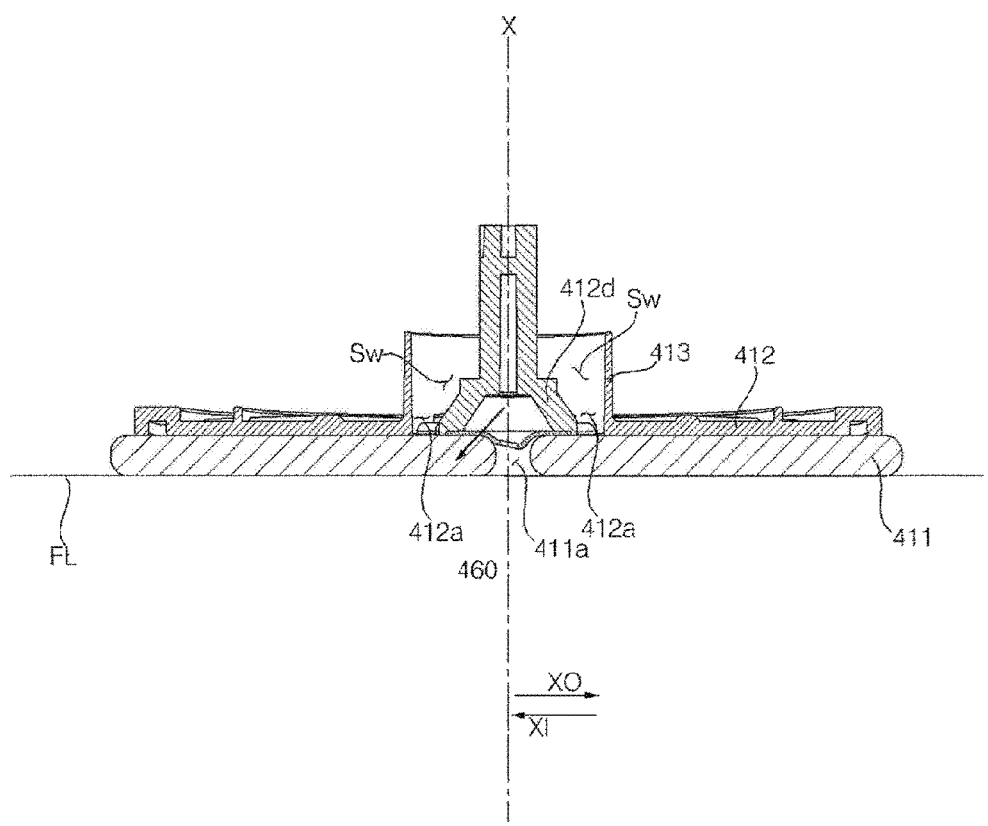
FIG. 37 is a view showing a state that the attachment guider is deformed so that a mop portion is moved to its original position and an entire portion of the mop portion is in contact with a floor.
Figure 38:
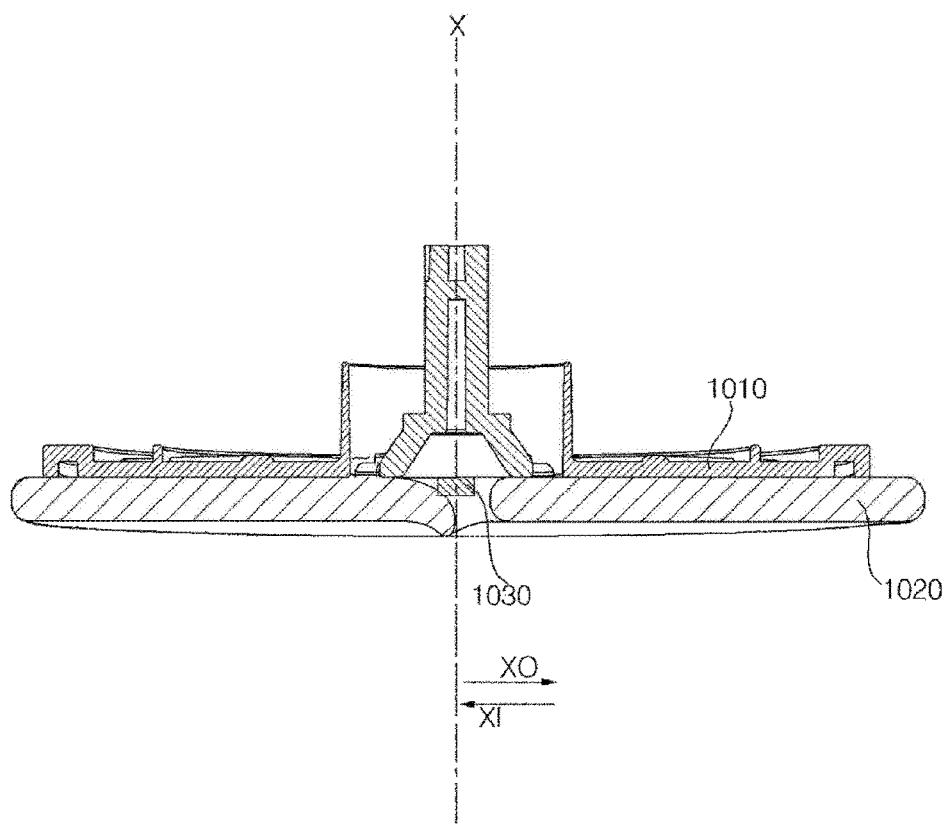
FIG. 38 is a view showing a state that a mop portion is attached to a position out of its original position in comparative embodiment.

Referring to FIG. 33 and FIG. 34, the attachment guider 460 is installed on the lower surface of the rotating plate 412 to guide an attachment position of the mop portion 411. The attachment guider 460 may visually guide a user to a mounting position of the mop portion 411, provide force to the mop portion 411 so that the mop 411 moves to a fixed position when the mop portion 411 is incorrectly attached, and prevent floating of the mop portion 411 when the mop portion is incorrectly attached.

The attachment guider 460 may have elasticity or provide elastic force. Specifically, the attachment guider 460 may include a metal material or a resin material having elasticity. The attachment guider 460 may have a shape that is fitted with the guide hole 411a and elastically deformed by self-load or tare weight of the mobile robot.

For example, the attachment guider 460 may include a guide rim 461 and an elastic piece 462. The guide rim 461 is disposed to surround a rotation axis Osa or Osb of the rotating plate 412. The rotation axis may mean a rotation axis, and also, mean an extension line of a rotation axis. Hereinafter, the rotation axis may include an extension line of a rotation axis. Specifically, the guide rim 461 may have a shape surrounding an arbitrary center point on a two-dimensional plane. The guide rim 461 may have a shape of a polygonal ring or a circular ring. Preferably, the guide rim 461 may have a shape of a circular ring.

The guide rim 461 may be in contact with the rotating plate 412 or may be fixed to the rotating plate 412. Specifically, the guide rim 461 may be accommodated in the receiving groove 412F.

The elastic piece 462 may be connected to the guide rim 461 and may be elastically deformed by external force. A part of the guide hole 411a of the mop portion 411 may be inserted into the elastic piece 462. The elastic piece 462 may be provided in singular or plural. For example, one elastic piece 462 formed of a single member may be formed along an inner circumference of the guide rim 461 to have a ring shape. For another example, a plurality of elastic pieces 462 may be disposed along an inner circumference of the guide rim 461. Hereinafter, it will be described on the basis that a plurality of elastic pieces 462 are provided.

The elastic piece 462 extends from the guide rim 461 in a direction toward the rotation axis Osa or Osb (in a direction toward a center of the guide rim 461). Specifically, one end of each of the plurality of elastic pieces 462 may be connected to an inner circumference 461a of the guide rim 461.

The plurality of elastic pieces 462 may be spaced apart from each other along a circumference of the guide rim 461. Specifically, the plurality of elastic pieces 462 are disposed along the inner circumference of the guide rim 461 and are spaced apart from each other at regular intervals or same intervals. At least four elastic pieces 462 may be provided, and preferably, six elastic pieces 462 may be provided.

The elastic piece 462 may extend from the guide rim 461 in a direction toward an inner side of the guide rim 461 (toward a center of the guide rim 461). One end of the elastic piece 462 may be positioned at a lower side than the guide rim 461. Specifically, one end of the elastic piece 462 may be a fixed end coupled to the guide rim 461, and the other end of the elastic piece 462 may be a free end 463. Each elastic piece 462 may have or provide elastic restoring force to a lower side or downward.

For example, each elastic piece 462 may form a downward slope in a direction toward a center of the guide rim 461 (in a direction toward the rotation axis Osa or Osb). When each elastic piece 462 forms a downward slope in the direction toward the center of the guide rim 461, the free end 463 of each elastic piece 462 protrudes to a lower side or downward than the guide rim 461.

When the guide hole 411a of the mop portion 411 is attached to be overlapped with a center of the guide rim 461, even if the self-load or the tare weight of the mobile robot is applied, there is no or slight deformation of each elastic piece 462 due to the guide hole. However, when the guide hole 411a of the mop portion 411 is attached to have a state that is partially overlapped with or is not overlapped with the center of the guide rim 461, the mop portion 411 is pressed by the self-load or the tare weight of the mobile robot, and each of the elastic pieces 462 is deformed by the pressure of the mop portion 411, thereby providing external force to the mop portion 411.

An inclination or a slope of each elastic piece 462 may decrease, increase, or be constant as it goes away from the guide rim 461. In addition, each elastic piece 462 may have a line shape or a curved shape.

Each elastic piece 462 may have an optimum shape as follows. Then, elastic restoring force of the elastic piece 462 can be excellent, damage to the mop portion 411 when the mop portion 411 is attached can be prevented, and the mop portion 411 and the guide hole 411a can be efficiently fitted or fixed.

One end of each elastic piece 462 may include a first portion 462a, a second portion 462b, and a third portion 462c. The first portion 462a may have one end connected to the inner circumference of the guide rim 461 and have a first slope. One end of the second portion 462b may be connected to the other end of the first portion 462a and have a second slope greater than the first slope. One end of the third portion 462c may be connected to the other end of the second portion 462b and the other end of the third portion 462c may be a free end 463. The third portion 462c may have a slope smaller than the second slope. The second slope of the second portion 462b may increase as it approaches a central axis.

The first portion 462a has a small slope to space the second portion 462b from the guide rim 461. The second portion 462b has a large slope and a curved shape, and thus, the second portion 462b is responsible for most of the elastic restoring force. The third portion 462c has a smaller slope than the second portion 462b. Thus, when each elastic piece 462 is elastically deformed, the third portion 462c makes the free end 463 of each elastic piece 462 not protrude to the mop portion 411 and to provide a shape fitted with the guide hole.

More specifically, the other end of the third portion 462c may be positioned at a lower side than the other end of the second portion 462b, and the other end of the second portion 462b may be positioned at a lower side than the other end of the first portion 462a, and the other end of the first portion 462a may be disposed at a lower side than the guide rim.

Each of the free ends 463 of the plurality of elastic pieces 462 may be spaced apart from the rotation axis Osa or Osb. Accordingly, a center of the guide rim and the free ends 463 of the plurality of elastic pieces 462 may be spaced apart from each other. A shape of each free end 463 is not limited. In order to facilitate coupling with the guide hole 411a of the mop portion 411, each free end 463 of the plurality of elastic pieces 462 may form a part of a circular orbit having a center at the rotation axis Osa or Osb.

Specifically, in a plan view, the free ends 463 of the plurality of elastic pieces 462 may form a part of a circular orbit having a center at the rotational axis Osa or Osb, and thus, may be in contact with an edge of the guide hole 411a.

In addition, in order to facilitate elastic deformation of each elastic piece 462, a width of each elastic piece 462 may increase as it approaches the guide rim 461. A length of the elastic piece 462 may be greater than a maximum width of the elastic piece 462. In this instance, the width of the elastic piece 462 may mean a size of the elastic piece 462 in a circumferential direction, and the length of the elastic piece 462 may mean a size of the elastic piece 462 in a radial direction.

When bottoms of the pair of spin mops 41a and 41b provided to be symmetrical to each other with respect to the central longitudinal line Po are parallel to a horizontal plane, a robot cleaner may not stably drive and a driving control may be difficult. Therefore, according to the present disclosure, each spin mop 41 is inclined downward toward an outside front side. Hereinafter, an inclination and a motion of a spin mop 41 will be described.

The central longitudinal line Po means a line parallel to a front-rear direction and passing through a geometric center Tc of a body. The central longitudinal line Po may be defined as a line passing through the geometric center Tc of the body while being perpendicular to an imaginary line connecting a central axis of the left spin mop and a central axis of the right spin mop.

Figure 39:
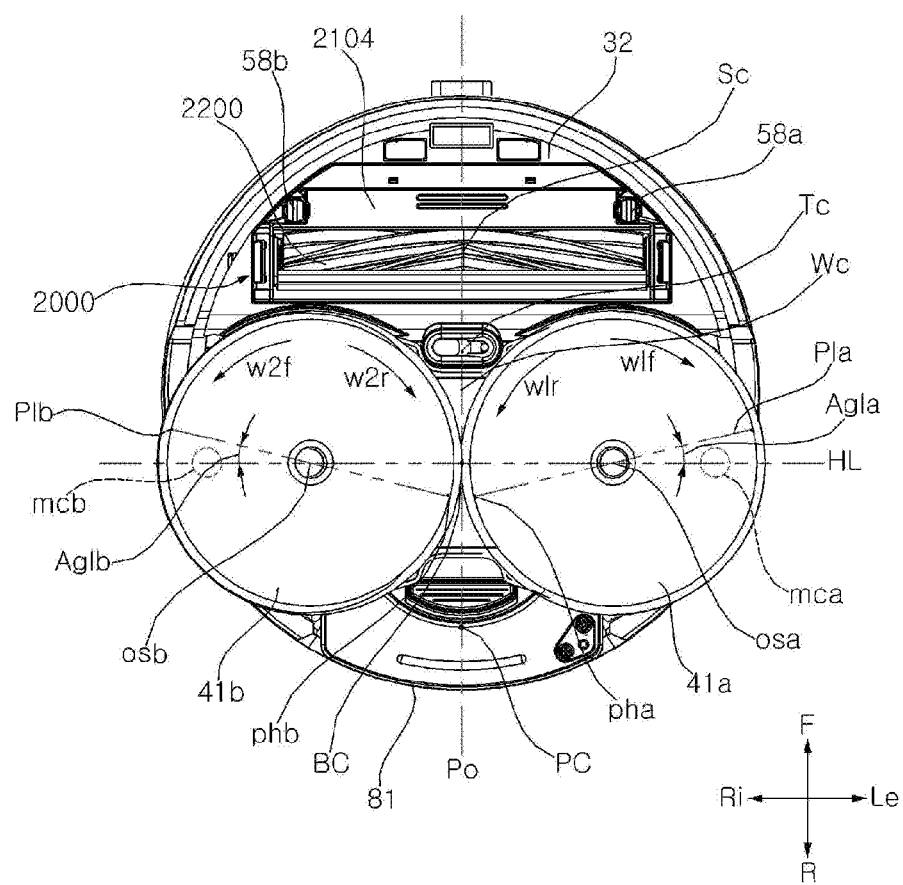
FIG. 39 is a bottom view showing the mobile robot of FIG. 1 for explaining a weight center and lowest ends of spin mops according to the present disclosure.

Referring to FIG. 39, a point where the spin rotation axis Osa of the left spin mop 41a and a lower surface of the left spin mop 41a cross is shown, and a point where the spin rotation axis Osb of the right spin mop 41b and a lower surface of the right spin mop 41b intersect is shown. When viewed from a lower side, among rotational directions of the left spin mop 41a, a clockwise direction is defined as a first normal direction w1f and a counterclockwise direction is defined as a first reverse direction w1r. When viewed from a lower side, among rotational directions of the right spin mop 41b, a clockwise direction is defined as a second normal direction w2f and a counterclockwise direction is defined as a second reverse direction w2r. In addition, when viewed from a lower side, 'an acute angle between an inclined direction of a lower surface of the left spin mop 41a and a left-right direction axis' and 'an acute angle between an inclined direction of a lower surface of the right spin mop 41a and a left-right direction axis' are defined as inclination-direction angles Ag1a and Ag1b, respectively. The inclination-direction angle Ag1a of the left spin mop 41a and the inclination-direction angle Ag1b of the right spin mop 41b may be the same. Further, 'an angle between a lower surface I of the left spin mop 41a and an imaginary horizontal surface H' and 'an angle between a lower surface I of the right spin mop 41b and an imaginary horizontal surface H' are defined as inclination angles Ag2a and Ag2b.

A right end of the left spin mop 41a and a left end of the right spin mop 41b may be in contact with each other or adjacent or close to each other. Therefore, an area where mopping or wiping is not performed between the left spin mop 41a and the right spin mop 41b can be reduced.

When the left spin mop 41a rotates, a point Pla that receives the greatest friction force from a floor or a ground at a lower surface of the left spin mop 41a may be positioned at a left side of a rotation center Osa of the left spin mop 41a. Among the lower surface of the left spin mop 41a, a greater load may be transmitted to the floor or the ground at the point Pla than the other point. Thus, the greatest friction force may be generated at the point Pla. In the present embodiment, the point Pla is disposed at a left front side of the rotation center Osa. In another embodiment, the point Pla may be disposed at an exact left side or at a left rear side based on the rotation center Osa.

When the right spin mop 41b rotates, a point Plb that receives the greatest friction force from a floor or a ground at a lower surface of the right spin mop 41b may be positioned at a right side of a rotation center Osb of the right spin mop 41b. Among the lower surface of the right spin mop 41b, a greater load may be transmitted to the floor or the ground at the point Plb than the other point. Thus, the greatest friction force may be generated at the point Plb. In the present embodiment, the point Plb is disposed at a right front side of the rotation center Osb. In another embodiment, the point Pla may be disposed at an exact right side or at a right rear side based on the rotation center Osb.

The lower surface of the left spin mop 41a and the lower surface of the right spin mop 41b may be inclined, respectively. The inclination angle Ag2a of the left spin mop 41a and the inclination angle Ag2b of the right spin mop 41b may be an acute angle. The inclination angles Ag2a and Ag2b may be small so that points having the greatest friction force are positioned at the points Pla and Plb and entire portions of lower surfaces of the mop portions 411 are in contact with or touch the floor according to rotational motion of the left spin mop 41a and the right spin mop 41b.

Figure 6:
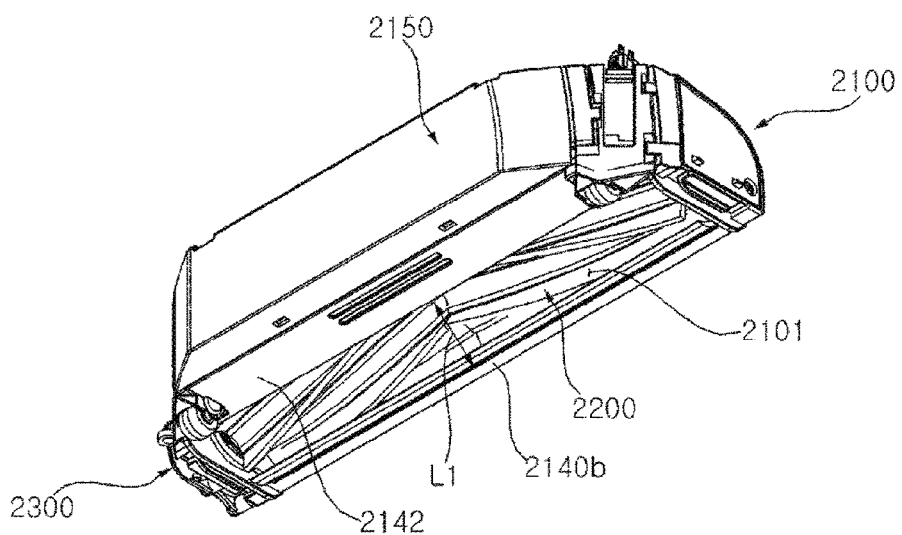
FIG. 6 is a bottom perspective view of the sweep module shown FIG. 5.
Figure 7:
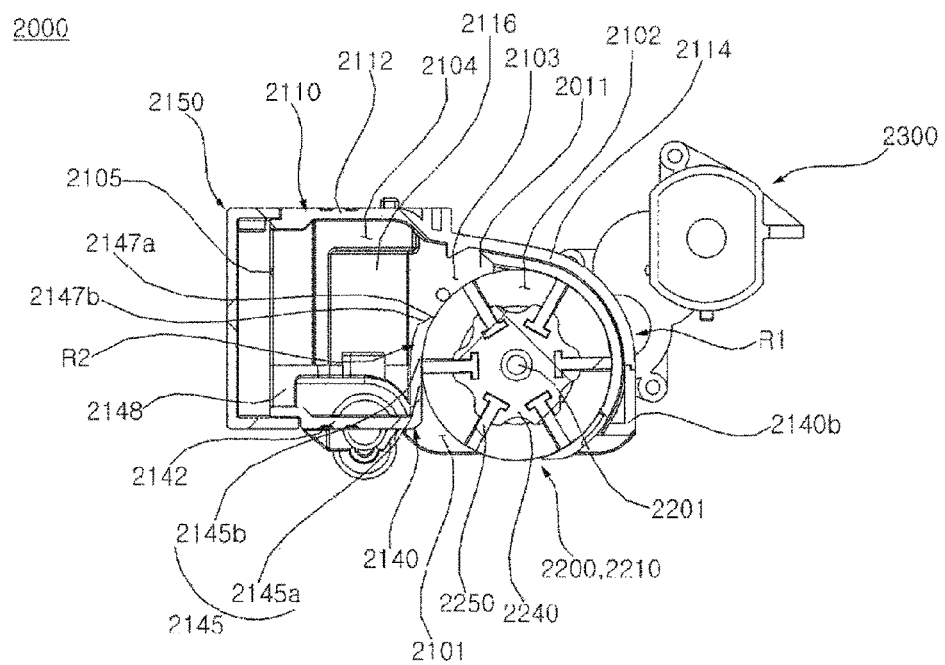
FIG. 7 is a right cross-sectional view of the sweep module shown in FIG. 5.
Figure 8:
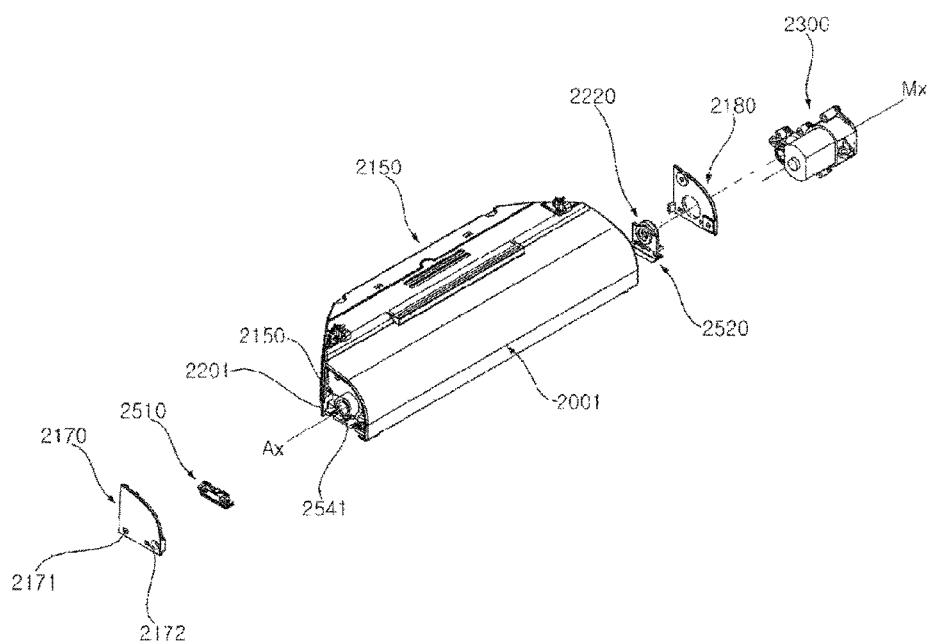
FIG. 8 is an exploded perspective view of the sweep module shown in FIG. 3.
Figure 9:
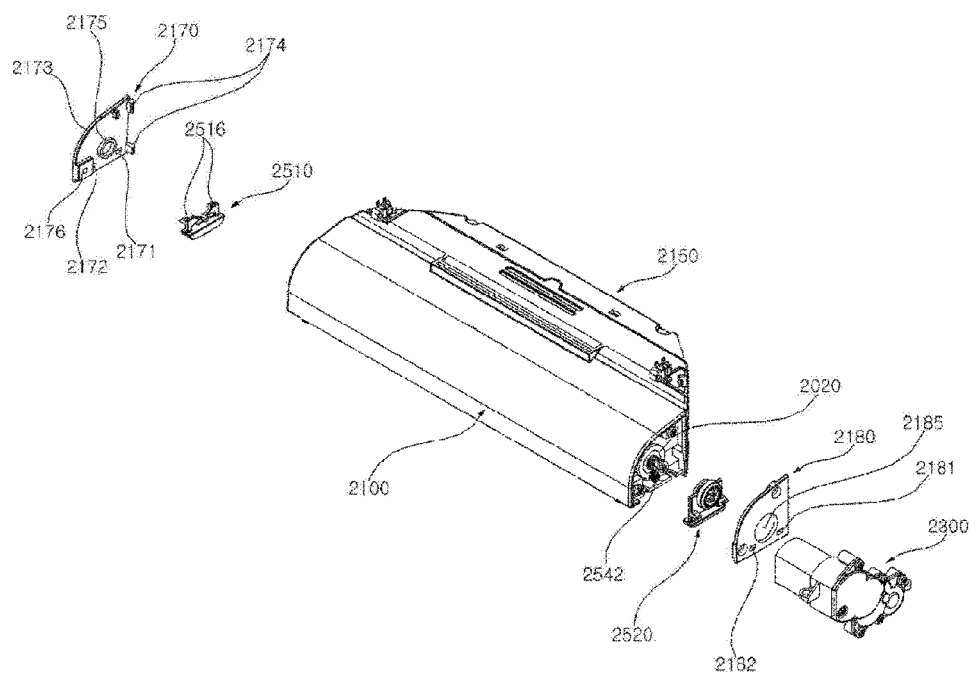
FIG. 9 is an exploded perspective view of the sweep module viewed from a right side of FIG. 8.
Figure 10:
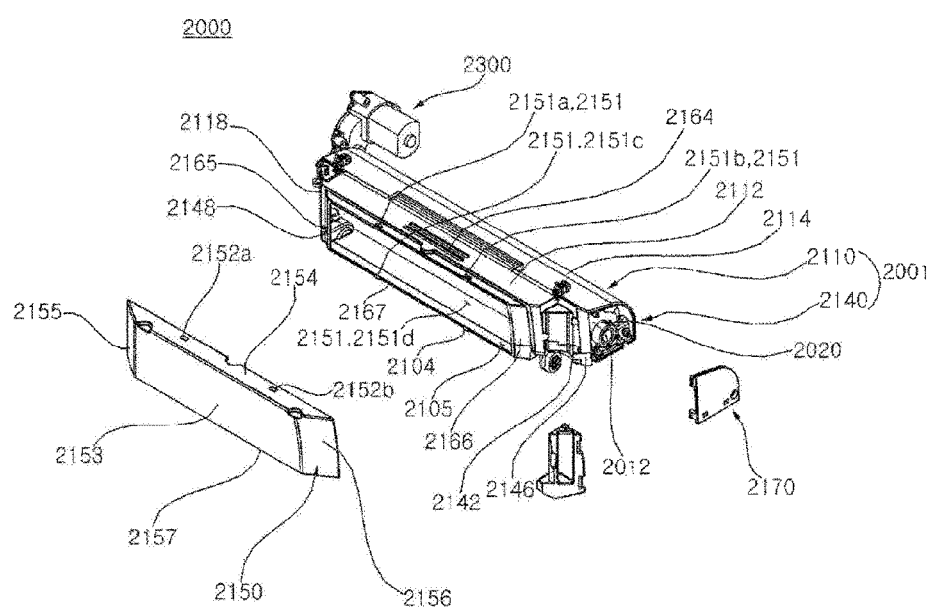
FIG. 10 is a partially exploded perspective view of the sweep module shown in FIG. 5.
Figure 11:
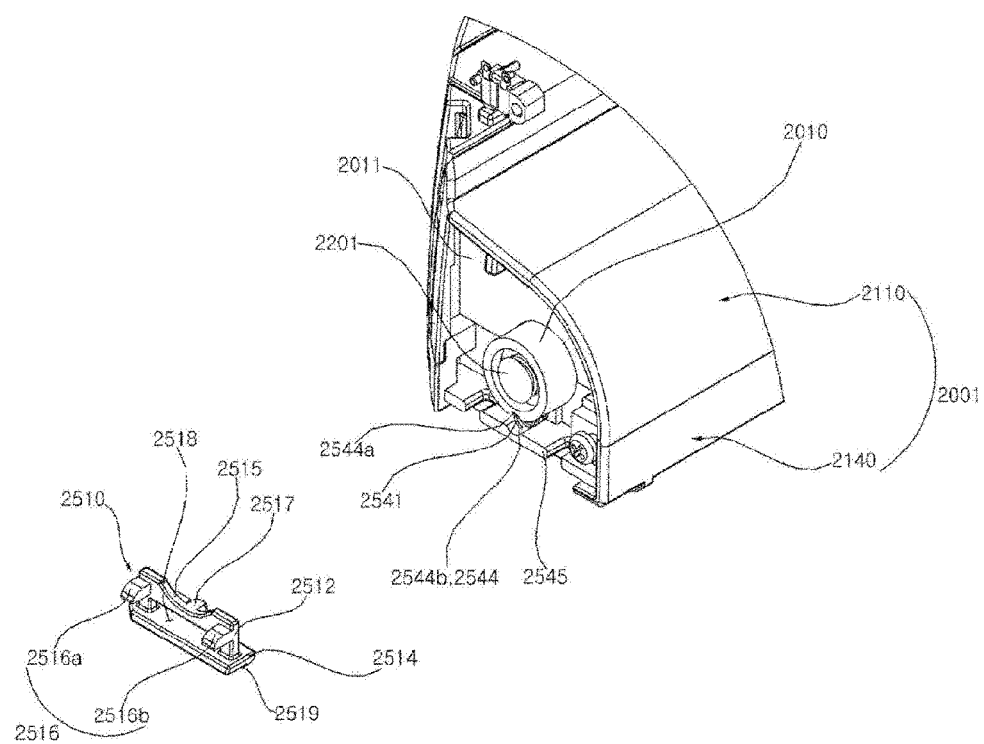
FIG. 11 is an enlarged perspective view of a first lever shown in FIG. 8.
Figure 12:
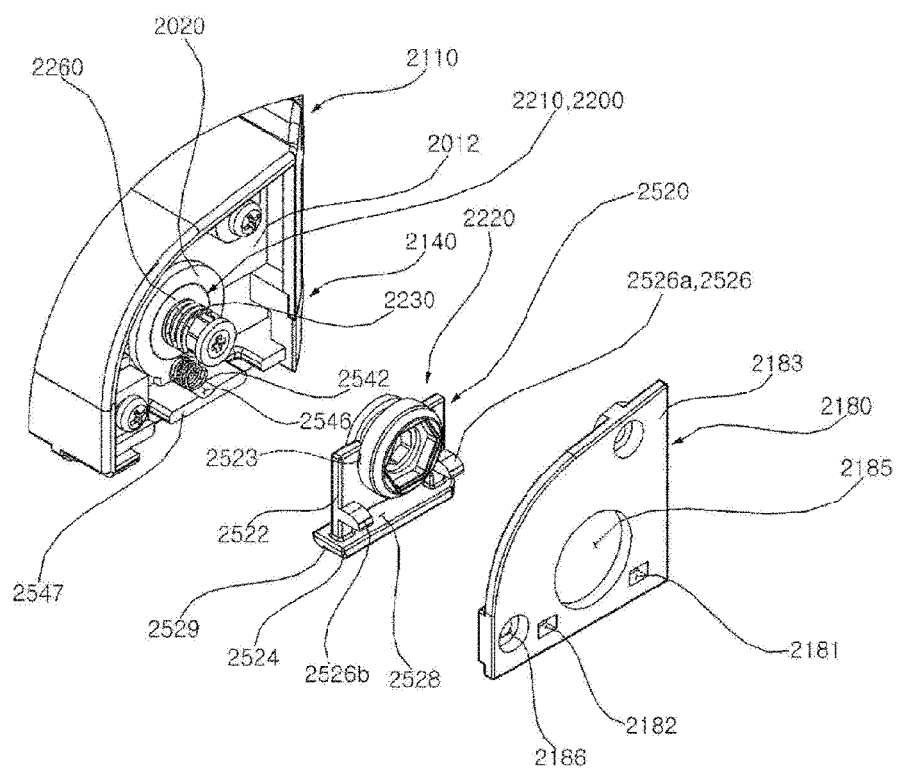
FIG. 12 is an enlarged perspective view of a second lever shown in FIG. 9.
Figure 13:
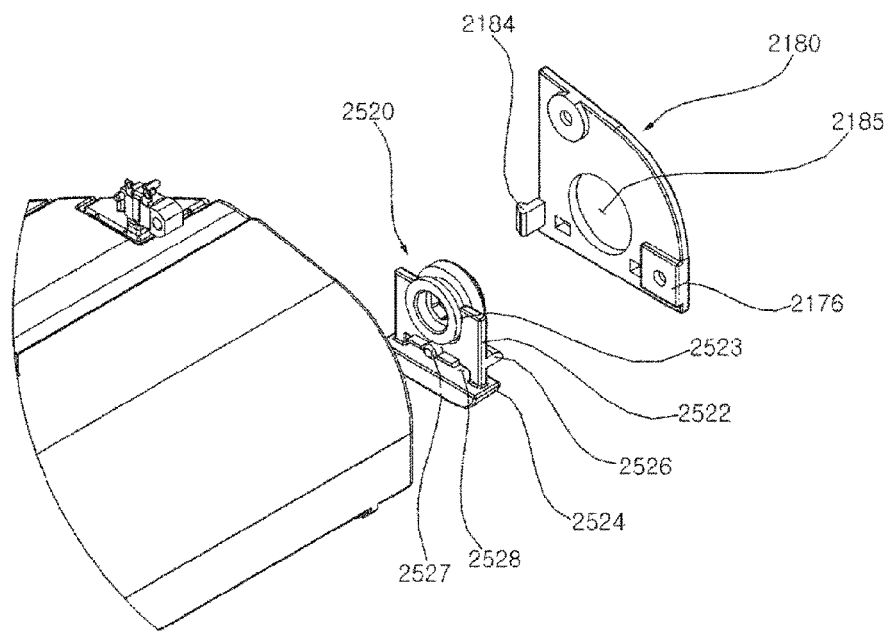
FIG. 13 is an enlarged perspective view of the second lever viewed from a left side of FIG. 12.
Figure 14:
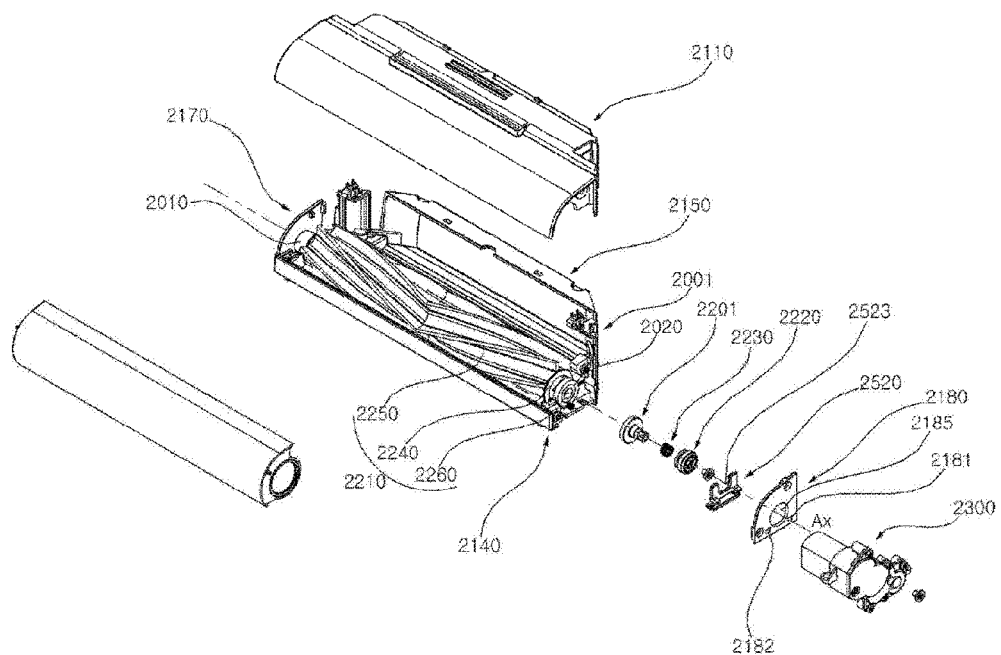
FIG. 14 is a partially exploded perspective view of the sweep module showing a coupled structure of an agitator shown in FIG. 5.
Figure 15:
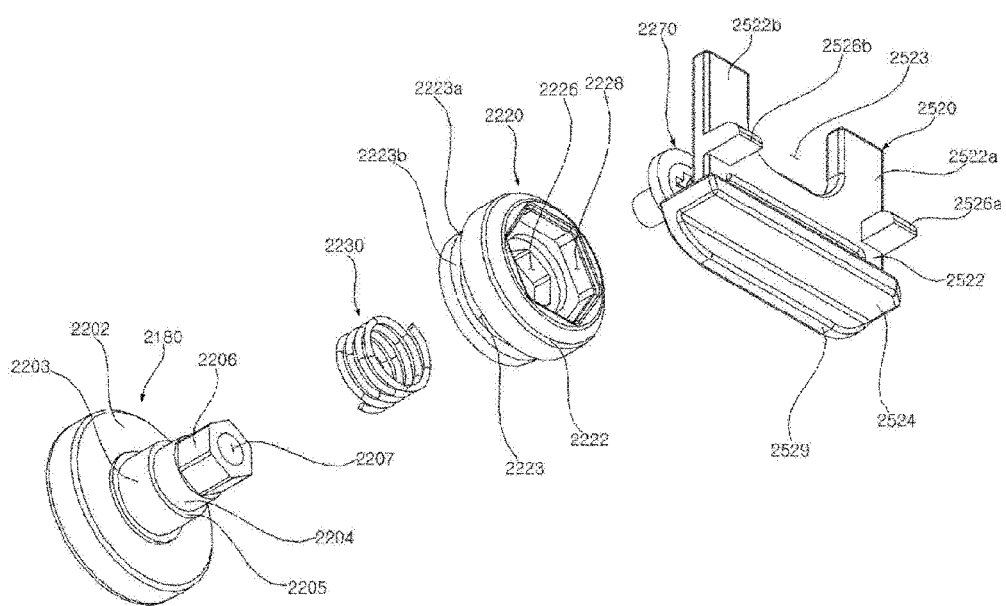
FIG. 15 is an exploded perspective view showing an assembled structure of a driven coupling shown in FIG. 14.
Figure 16:
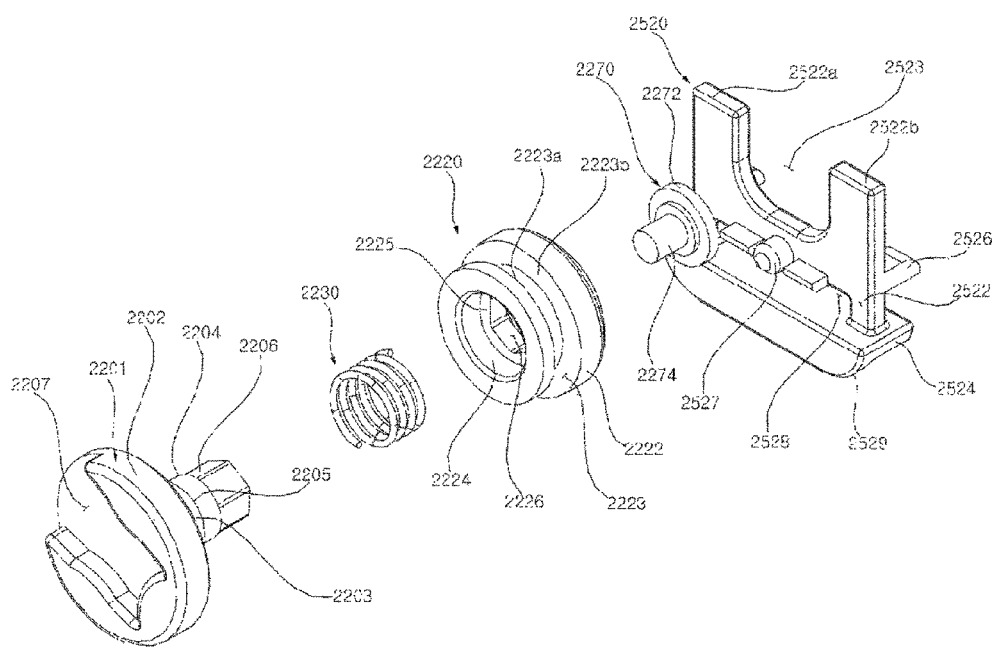
FIG. 16 is a perspective view viewed from a left side of FIG. 15.
Figure 17:
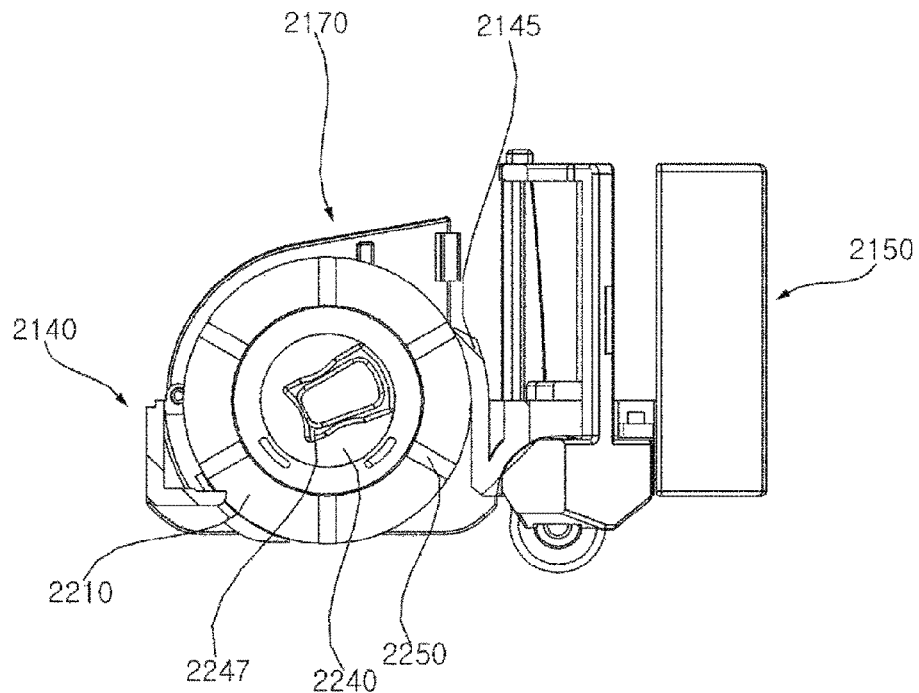
FIG. 17 is a right cross-sectional view showing the agitator of FIG. 14.
Figure 18:
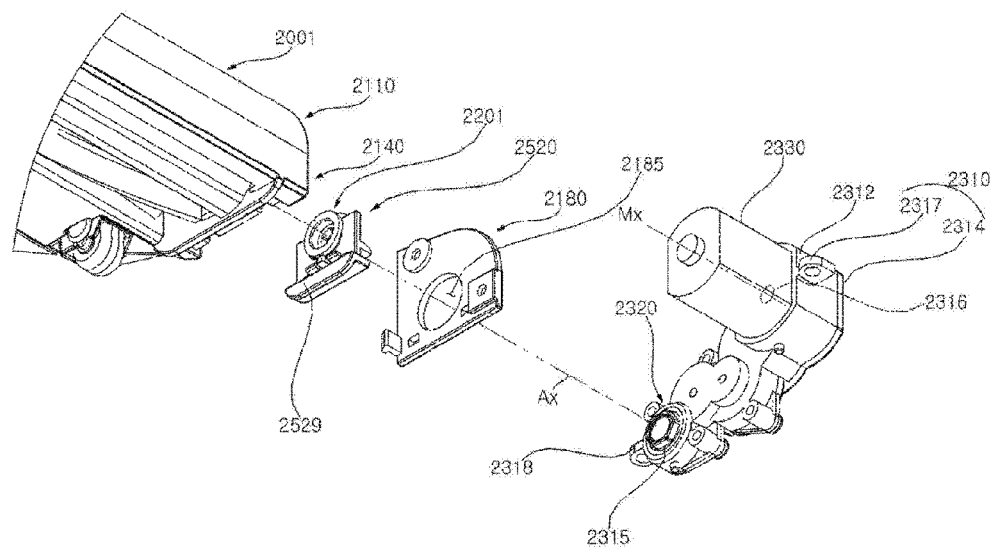
FIG. 18 is an exploded perspective view of a driving unit viewed from a left side of FIG. 14.
Figure 19:
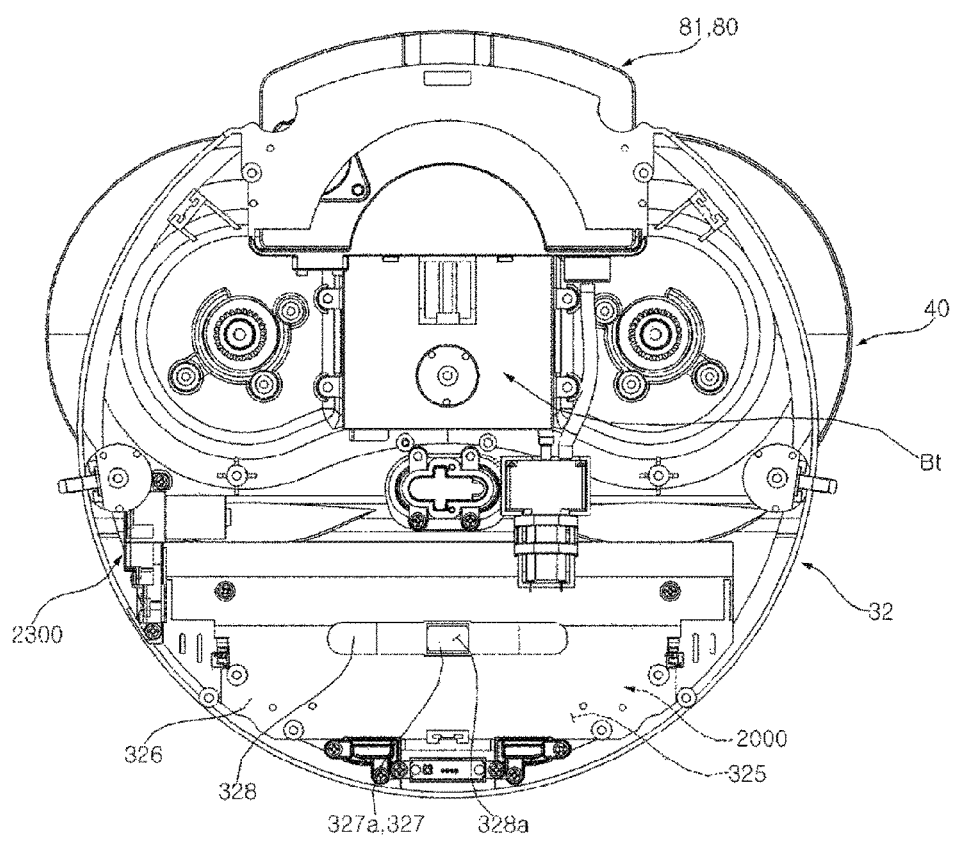
FIG. 19 is a plan view of the mobile robot of FIG. 1 in a state that a case is removed.
Figure 20:
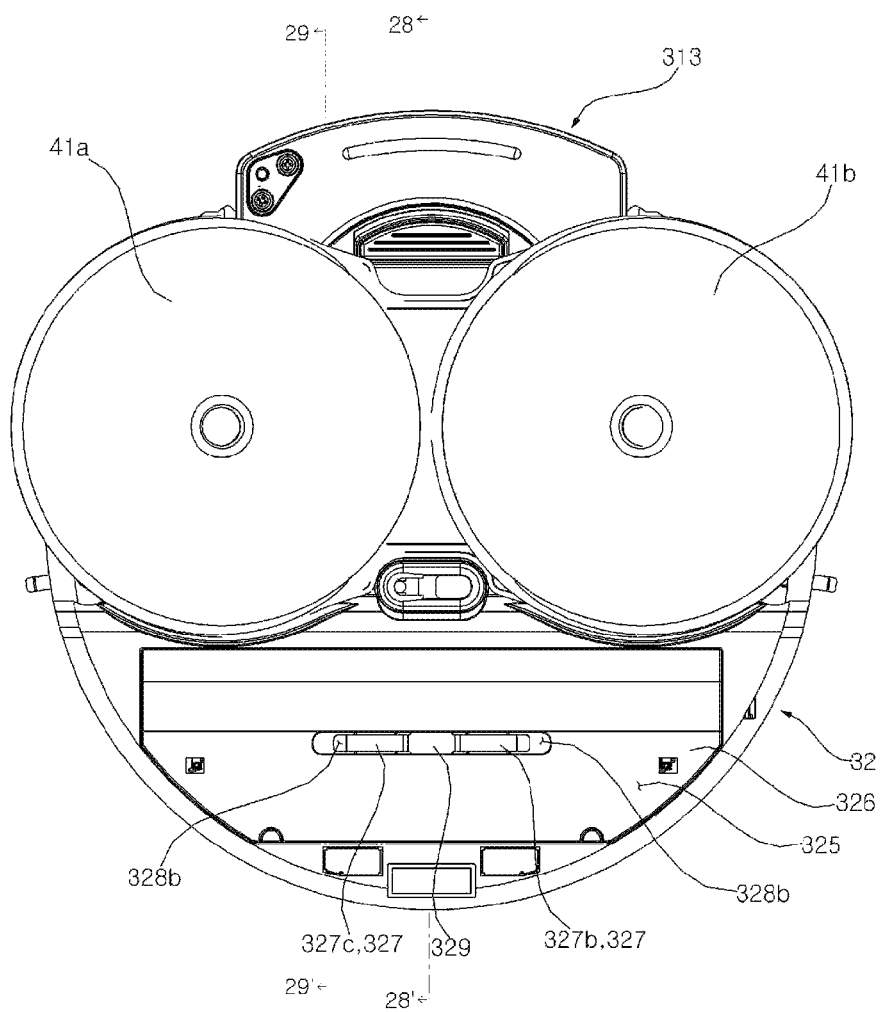
FIG. 20 is a bottom view of the mobile robot shown in FIG. 19.
Figure 21:
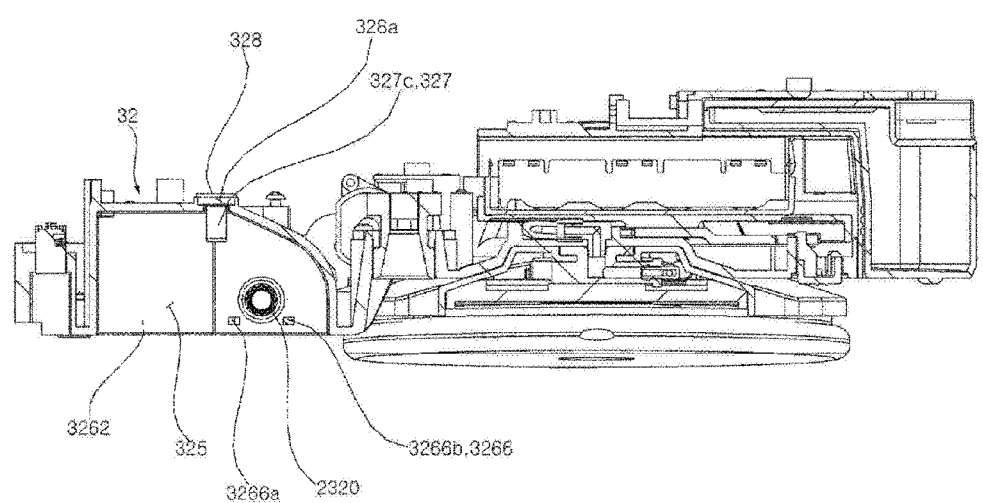
FIG. 21 is a right cross-sectional view of the mobile robot shown in FIG. 19.

The lower surface of the left spin mop 41a forms a downward slope as a whole in a left direction. The lower surface of the right spin mop 41b forms a downward slope as a whole in a right direction. Referring to FIG. 6, the lowest point Pla at the lower surface of the left spin mop 41a is positioned at a left side portion. The highest point Pha at the lower surface of the left spin mop 41a is positioned at a right side portion. The lowest point Plb at the lower surface of the right spin mop 41b is positioned at a right side portion. The highest point Phb at the lower surface of the right spin mop 41b is positioned at a left side portion.

According to the embodiment, an inclination-direction angles Ag1a and Ag1b may be 0 degrees. Further, according to the embodiment, when viewed from a lower side, a lower surface of the left spin mop 41a may be inclined to have an inclined-direction angle Ag1a in a clockwise direction with respect to a left-right direction axis, and a lower surface of the right spin mop 41b may be inclined to have an inclined-direction angle Ag1b in a counterclockwise direction with respect to the left-right direction axis. In the present embodiment, when viewed from a lower side, a lower surface of the left spin mop 41a is inclined to have an inclined-direction angle Ag1a in a counterclockwise direction with respect to the left-right direction axis, and a lower surface of the right spin mop 41b is inclined to have an inclined-direction angle Ag1b in a clockwise direction with respect to the left-right direction axis.

The movement of the cleaner 1 is achieved by friction force with the floor or the ground generated by the mop module 40.

The mop module 40 may generate 'a forward-moving friction force' for moving the body 30 in a front direction, or 'a rearward-moving friction force' for moving the body 30 in a rear direction. The mop module 40 may generate 'a left-moment friction force' to rotate or turn the body 30 left, or 'a right-moment friction force' to rotate or turn the body 30 right. The mop module 40 may generate friction force in which any one of the forward-moving friction force and the rearward-moving friction force is combined with any one of the left-moment friction force and the right-moment friction force.

In order for the mop module 40 to generate the forward-moving friction force, the left spin mop 41a may rotate at a predetermined rpm R1 in a first normal direction w1f and the right spin mop 41b may rotate at the predetermined rpm R1 in a second normal direction w2f.

In order for the mop module 40 to generate the rearward-moving friction force, the left spin mop 41a may rotate at a predetermined rpm R2 in a first reverse direction w1r and the right spin mop 41b may rotate at the predetermined rpm R2 in a second reverse direction w2r.

In order for the mop module 40 to generate the right-moment friction force, the left spin mop 41a may rotate at a predetermined rpm R3 in the first normal direction w1f, and the right spin mop 41b may rotate in the second reverse direction w2r, may stop without rotation, or may rotate at a rpm R4 smaller the rpm R3 in the second normal direction w2f.

In order for the mop module 40 to generate the left-moment friction force, the right spin mop 41b may rotate at a predetermined rpm R5 in the second normal direction w2f, and the left spin mop 40b may rotate in the first reverse direction w1r, may stop without rotation, or may rotate at a rpm R6 smaller the rpm R5 in the first normal direction w1f.

Hereinafter, an arrangement of components or elements for improving friction force of the spin mops 41 arranged at a left side and a right side, improving stability in a left-right direction and a front-rear direction, and achieving stable driving regardless of a water level in a water tank 81.

Figure 40:
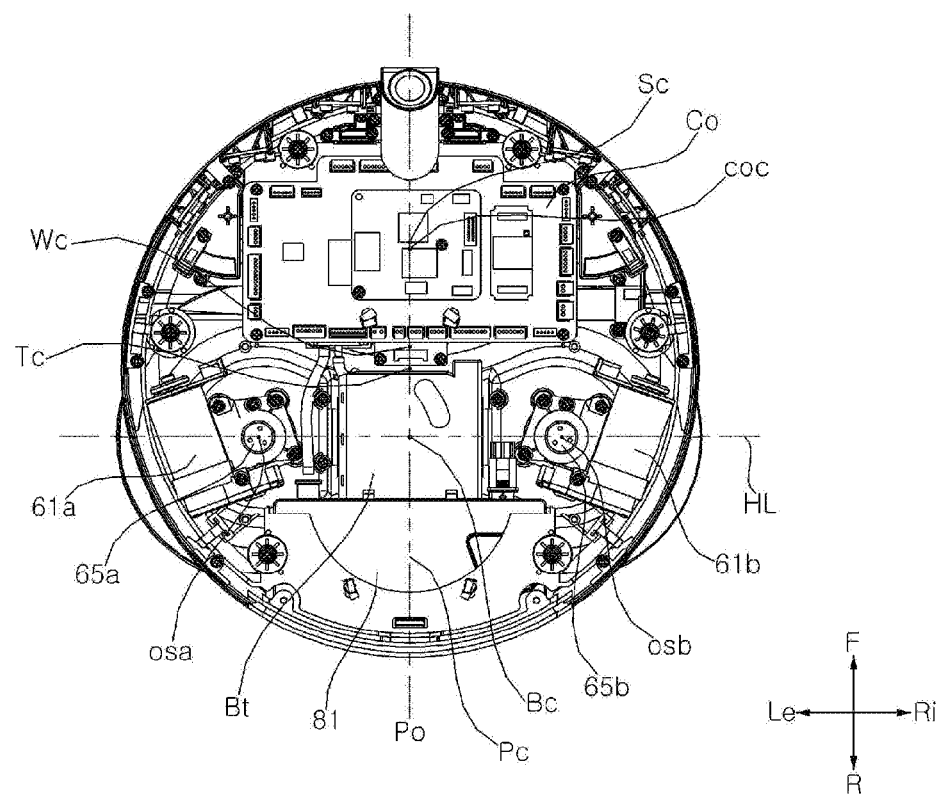
FIG. 40 is a plan view of the mobile robot of FIG. 1 viewed from an upper side in a state that a case is removed from the body for explaining the weight center according to the present disclosure.

Referring to FIG. 39 and FIG. 40, so as to increase the friction force by a spin mop 41 and limit occurrence of eccentricity in one direction when the mobile robot rotates, a mop motor 61 and a battery Bt that are relatively heavy may be disposed on an upper portion of a spin mop 41.

Specifically, a left-mop motor 61a may be disposed on a left spin mop 41a (at an upper side of the left spin mop 41a), and a right-mop motor 61b may be disposed on a right spin mop 41b (at an upper side of the right spin mop 41b). That is, at least a part of the left-mop motor 61a may be vertically overlapped with the left spin mop 41a. Preferably, an entire portion of the left-mop motor 61a may be vertically overlapped with the left spin mop 41a. At least a part of the right-mop motor 61b may be vertically overlapped with the right spin mop 41b. Preferably, an entire portion of the right-mop motor 61b may be vertically overlapped with the right spin mop 41b.

More specifically, the left-mop motor 61a and the right-mop motor 61b may be vertically overlapped with an imaginary central horizontal line HL connecting a spin rotation axis Osa of the left spin mop 41a and a spin rotation axis Osb of the right spin mop 41b. Preferably, a weight center (a center of gravity) MCa of the left-mop motor 61a and a weight center (a center of gravity) MCb of the right-mop motor 61b may be vertically overlapped with the imaginary central horizontal line HL connecting the spin rotation axis Osa of the left spin mop 41a and the spin rotation axis Osb of the right spin mop 41b. Alternatively, a geometric center of the left-mop motor 61a and a geometric center of the right-mop motor 61b may be vertically overlapped with the imaginary central horizontal line HL connecting the spin rotation axis Osa of the left spin mop 41a and the spin rotation axis Osb of the right spin mop 41b. The left-mop motor 61a and the right-mop motor 61b may be symmetrical with respect to a central longitudinal line Po.

Since the weight center MCa of the left-mop motor 61a and the weight center MCb of the right-mop motor 61b do not deviate from the spin mop 41, and the left-mop motor 61a and the right-mop motor 61b are symmetrical to each other. Accordingly, the friction force of the spin mop 41 can be enhanced and running performance and a left-right balance can be maintained.

Hereinafter, the spin rotation axis Osa of the left spin mop 41a is referred to as a left spin rotation axis Osa, and the spin rotation axis Osb of the right spin mop 41b is referred to as a right spin rotation axis Osb.

The water tank 81 is disposed at a rear side than the central horizontal line HL, and an amount of water in the water tank 81 is variable. In order to maintain a stable front-rear balance regardless of a water level of the water tank 81, the left-mop motor 61a may be deviated to a left side from the left spin rotation axis Osa. The left-mop motor 61a may be deviated to a left front side from the left spin rotation axis Osa. Preferably, the geometric center of the left-mop motor 61a or the weight center MCa of the left-mop motor 61a may be deviated to the left side from the left spin rotation axis Osa, or the geometric center of the left-mop motor 61a or the weight center MCa of the left-mop motor 61a may be deviated to the left front side from the left spin rotation axis Osa.

The right-mop motor 61b may be deviated to a right direction from the right spin rotation axis Osb. The right-mop motor 61b may be deviated to a right front side from the right spin rotation axis Osb. Preferably, the geometric center of the right-mop motor 61b or the weight center MCb of the right-mop motor 61b may be deviated to the right side from the right spin rotation axis Osb, or the geometric center of the right-mop motor 61b or the weight center MCb of the right-mop motor 61b may be deviated to the right front side from the right spin rotation axis Osb.

Since the left-mop motor 61a and the right-mop motor 61b apply pressure at a position deviated from an outer front side from a center of each spin mop 41, pressure is concentrated on the outer front side of each spin mop 41. Therefore, running performance can be improved by the rotational force of the spin mop 41.

The left spin rotation axis Osa and the right spin rotation axis Osb are disposed at a rear side than the center of the body 30. The central horizontal line HL may be disposed at a rear side of the geometric center Tc of the body 30 and a weight center (a center of gravity) WC of the mobile robot. The left spin rotation axis Osa and the right spin rotation axis Osb are spaced apart at the same distance from the central longitudinal line Po.

A left driving joint 65a may be disposed on the left spin mop 41a (at an upper side of the left spin mop 41a), and a right driving joint 65a may be disposed on the right spin mop 41b (at an upper side of the right spin mop 41b).

In the present embodiment, one battery Bt may be installed. At least a part of the battery Bt may be disposed on the left spin mop 41a and the right spin mop 41b (at upper sides of the left spin mop 41a and the right spin mop 41b). The battery Bt that is relative heavy is disposed on the spin mop 41 (at the supper side of the spin mop 41) to improve friction force by the spin mop 41 and reduce eccentricity caused by the rotation of the mobile robot.

Specifically, a part of a left portion of the battery Bt may be vertically overlapped with the left spin mop 41a, and a part of a right portion of the battery Bt may be vertically overlapped with the right spin mop 41b. The battery Bt may be vertically overlapped with the central horizontal line HL and may be vertically overlapped with the central longitudinal line Po.

More specifically, a weight center (a center of gravity) BC of the battery Bt or a geometric center of the battery Bt may be disposed at the central longitudinal line Po and may be disposed at the central horizontal line HL. The weight center BC of the battery Bt or the geometric center of the battery Bt may be disposed at the central longitudinal line Po, may be disposed at a front side of the central horizontal line HL, and may be disposed at a rear side of the geometric center Tc of the body 30.

The weight center of the battery Bt or the geometric center of the battery Bt may be disposed at a front side than the water tank 81 or a weight center PC of the water tank 81. The weight center BC of the battery Bt or the geometric center Tc of the battery Bt may be disposed at a rear side than a weight center (a center of gravity) SC of the sweep module 2000.

One battery Bt is disposed at a middle portion between the left spin mop 41a and the right spin mop 41b and is disposed at the central horizontal line HL and the central longitudinal line Po. The battery Bt that is heavy holds centers during rotation of the spin mops 41 and provides weight on the spin mop 41, thereby improving friction force by the spin mop 41.

A height of the battery Bt (a height of a lower end of the battery Bt) may be the same as heights of the left-mop motor 61a and the right-mop motor 61b (heights of lower ends of the left-mop motor 61a and the right-mop motor 61b). Alternatively, the battery Bt may be disposed on the same plane as the left-mop motor 61a and the right-mop motor 61b. The battery Bt may be disposed between the left-mop motor 61a and the right-mop motor 61b. The battery Bt may be disposed at an empty space between the left-mop motor 61a and the right-mop motor 61b.

At least a part of the water tank 81 may be disposed on the left spin mop 41a and the right spin mop 41b (at upper sides of the left spin mob 41a and the right spin mop 41b). The water tank 81 may be disposed at a rear side than the central horizontal line HL and may be vertically overlapped with the central longitudinal line Po.

More specifically, a weight center (a center of gravity) PC of the water tank 81 or a geometric center of the water tank 81 may be disposed at the central longitudinal line Po and may be positioned at a front side than the central horizontal line HL. As another example, the weight center PC of the water tank 81 or the geometric center of the water tank 81 may be disposed at the central longitudinal line Po and may be positioned at a rear side than the central horizontal line HL. In this instance, the phrase that the weight center PC of the water tank 81 or the geometric center of the water tank 81 is disposed at the rear side than the central horizontal line HL may mean that weight center PC of the water tank 81 or the geometric center of the water tank 81 is vertically overlapped with a region deviated rearward from the central horizontal line HL. The weight center PC of the water tank 81 or the geometric center of the water tank 81 may be vertically overlapped with the body 30 without going beyond the body 30.

The weight center PC of the water tank 81 or the geometric center of the water tank 81 may be disposed at a rear side than the weight center BC of the battery Bt. The weight center of the water tank 81 PC or the geometric center of the water tank 81 may be disposed at a rear side than the weight center SC of the sweep module 2000.

A height of the water tank 81 (a height of a lower end of the water tank 81) may be the same as heights of the left-mop motor 61a and the right-mop motor 61b (heights of lower ends of the left-mop motor 61a and the right-mop motor 61b). Alternatively, the water tank 81 may be disposed on the same plane as the left-mop motor 61a and the right-mop motor 61b. The water tank 81 may be disposed at an empty space between the left-mop motor 61a and the right-mop motor 61b.

The sweep module 2000 may be disposed at a front side than the spin mops 41, the battery Bt, the water tank 81, the mop driving unit 60, the right-mop motor 61b, and the left-mop motor 61a at the body.

The weight center SC of the sweep module 2000 or a geometric center of the sweep module 2000 may be disposed at the central longitudinal line Po and may be disposed at a front side than the geometric center Tc of the body 30. When viewed from an upper side, the body 30 may have a circular shape and the base 32 may have a circular shape. The geometrical center Tc of the body 30 may means a center of the body 30 when the body 30 has the circular shape. Specifically, when viewed from an upper side, the body 30 may have a circular shape with a half-diameter error of less than 3%.

Specifically, the weight center SC of the sweep module 2000 or the geometric center of the sweep module 2000 may be disposed at the central longitudinal line Po, and may be disposed at a front side than the weight center BC of the battery Bt, the weight center PC of the water tank 81, the weight center MCa of the left-mop motor 61a, the weight center MCb of the right-mop motor 61b, and the weight center WC of the mobile robot.

Preferably, the weight center SC of the sweep module 2000 or the geometric center of the sweep module 2000 may be disposed at a front side than the central horizontal line HL and a front end of the spin mops 41.

The sweep module 2000 may include a dust housing 2100 having a storage space 2104, an agitator 2200, and a sweep motor 2330 as described above.

The agitator 2200 may be rotatably installed on the dust housing 2100 and may be disposed at a rear side than the storage space 2104. Therefore, the agitator 2200 may have an appropriate length to cover the left and right spin mops 41 and not to protrude to an outside of the body.

A rotation axis of the agitator 2200 may be parallel to the central horizontal line HL, and a center of the agitator 2200 may be positioned at the imaginary central longitudinal line Po. Therefore, a large foreign material flowing into the spin mops 41 can be effectively removed by the agitator 2200. The rotation axis of the agitator 2200 may be disposed at a front side of the geometric center Tc of the body 30. A length of the agitator 2200 may be preferably longer than a distance between the left spin rotation axis Osa and the right spin rotation axis Osb. The rotation axis of the agitator 2200 may be disposed to be adjacent to a front end of the spin mop 41.

A left caster 58a and a right caster 58b being in contact with the floor may be further provided at both ends of the dust housing 2100. The left caster 58a and the right caster 58b are rolled while being in contact with the floor and may move up and down by elastic force. The left caster 58a and the right caster 58b may support the sweep module 2000 and a part of the body. The left caster 58a and the right caster 58b may protrude from a lower end of the dust housing 2100 to a lower side.

In this instance, the left caster 58a and the right caster 58b may broadly mean the first wheel assembly 2610 and the second wheel assembly 2620 of FIG. 1 to FIG. 29, and narrowly mean the left and right wheels 2640.

The left caster 58a and the right caster 58b are disposed at a line parallel to the central horizontal line HL, and may be disposed at a front side than the central horizontal line HL and the agitator 2200. An imaginary line connecting the left caster 58a and the right caster 58b may be disposed at a front side than the central horizontal line HL, the agitator 2200, and the geometric center Tc of the body 30. The left caster 58a and the right caster 58b may be bisymmetrical to each other with respect to the central longitudinal line Po. The left caster 58a and the right caster 58b may be spaced apart at the same distance from the central longitudinal line Po.

The geometric center Tc of the body 30, the weight center WC of the mobile robot, the weight center SC of the sweep module 2000, and the weight center BC of the battery Bt may be disposed in an imaginary quadrangle formed by sequentially connecting the left caster 58a, the right caster 58b, the right spin rotation axis Osb, and the left spin rotation axis Osa. The battery Bt, which is relatively heavy, the left spin rotation axis Osa, and the right spin rotation axis Osb may be disposed to be adjacent to the central horizontal line HL. Then, a main load of the mobile robot may be applied to the spin mops 41 and a remaining sub-load may be the left caster 58a and the right caster 58b.

The sweep motor 2330 may disposed at the central longitudinal line Po. When the sweep motor 2330 is disposed at one side based on the central longitudinal line Po, the pump 85 is disposed at the other side based on the central longitudinal line Po (refer to FIG. 19) so that a sum weight center of the sweep motor 2330 and the pump 85 may be disposed on the central longitudinal line Po.

Therefore, the weight center of the mobile robot at a relatively front side is maintained regardless of the water level of the water tank 81 disposed at a rear side, thereby increasing friction force by the spin mop 41. Also, the weight center WC of the mobile robot is disposed to be adjacent to the geometric center Tc of the body 30 and thus stable driving can be achieved.

A weight center (a center of gravity) COC of a controller Co or a geometric center of the controller Co may be disposed at a front side than the geometric center Tc of the body 30 and the central horizontal line HL. At least a 50% or more portion of the controller Co may be vertically overlapped with the sweep module 2000.

The weight center WC of the mobile robot may be disposed at the central longitudinal line Po, may be disposed at a front side than the central horizontal line HL, may be disposed at a front side than the weight center BC of the battery Bt, and may be disposed at a front side than the weight center PC of the water tank 81, may be disposed at a rear side than the weight center SC of the sweep module 2000, and may be disposed at a rear side than the left caster 58a and the right caster 58b.

By disposing components or elements symmetrically with respect to the central longitudinal line Po or considering weights of the components or elements, the weight center WC of the mobile robot is disposed at the central longitudinal line Po. Accordingly, stability in a left-right direction can be improved.

Figure 41:
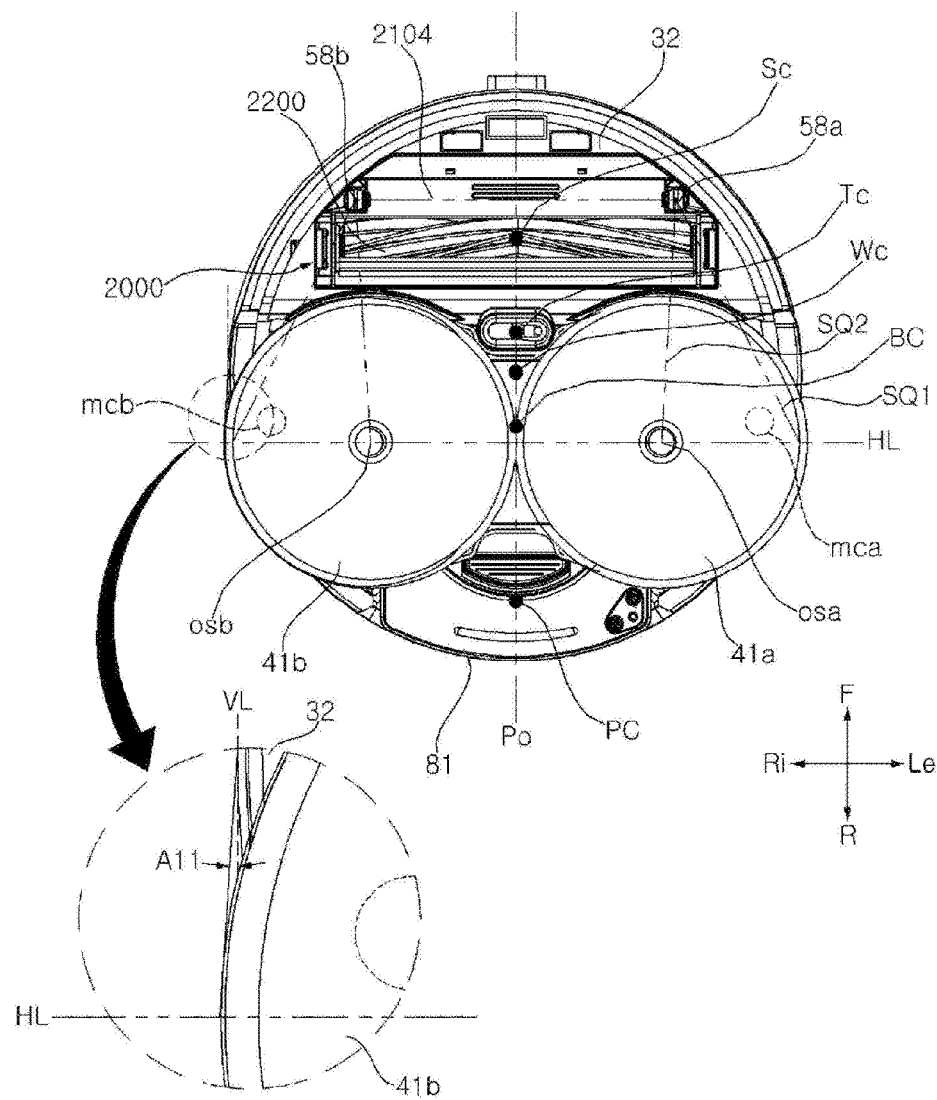
FIG. 41 is a bottom view of a mobile robot according to another embodiment of the present disclosure for explaining a relationship between a weight center and other components.

FIG. 41 is a bottom view of a mobile robot according to another embodiment of the present disclosure for explaining a relationship between a weight center and other components.

Referring to FIG. 41, an embodiment will be described. A difference compared to the embodiment described with reference to FIG. 39 will be mainly described. A component or an element that is not described with respect to FIG. 41 may be regarded as the same as that of the embodiment described with reference to FIG. 39.

A weight center WC of a mobile robot and a geometric center Tc of a body 30 may be disposed in an imaginary second quadrangle SQ2 formed by sequentially connecting a left caster 58a, a right caster 58b, a right spin rotation axis Osb, and a left spin rotation axis Osa. A weight center MCa of a left-mop motor, a weight center MCb of a right-mop motor, and a weight center PC of a water tank may be disposed at an outside of the imaginary second quadrangle SQ2.

Also, a weight center WC of a mobile robot, a geometric center Tc of a body 30, a weight center BC of a battery Bt may be disposed in an imaginary second quadrangle SQ2 formed by sequentially connecting a left caster 58a, a right caster 58b, a right spin rotation axis Osb, and a left spin rotation axis Osa.

In addition, a weight center WC of a mobile robot, a geometric center Tc of a body 30, and a weight center SC of a sweep module 2000, may be disposed in an imaginary second quadrangle SQ2 formed by sequentially connecting a left caster 58a, a right caster 58b, a right spin rotation axis Osb, and a left spin rotation axis Osa.

Further, a weight center WC of a mobile robot, a geometric center Tc of a body 30, a weight center SC of a sweep module 2000, and a weight center BC of a battery Bt may be disposed in an imaginary second quadrangle SQ2 formed by sequentially connecting a left caster 58a, a right caster 58b, a right spin rotation axis Osb, and a left spin rotation axis Osa.

The weight center WC of the mobile robot, the geometric center TC of the body, the weight center SC of the sweep module 2000, and the weight center BC of the battery Bt may be disposed in the second quadrangle SQ2, and the weight center MCa of the left-mop motor and the weight center MCb of the right-mop motor may be disposed at an outside of the second quadrangle SQ2. Then, the mobile robot can apply appropriate friction force to the mop portion while stably travelling.

The weight center WC of the mobile robot and the geometric center TC of the body may be disposed in the second quadrangle SQ2, and the weight center MCa of the left-mop motor and the weight center MCb of the right-mop motor may be disposed at an outside of the second quadrangle SQ2. Then, the mobile robot can apply appropriate friction force to the mop portion while stably travelling.

The weight center WC of the mobile robot and the geometric center TC of the body may be disposed in an imaginary first quadrangle SQ1 formed by sequentially connecting the left caster 58a, the right caster 58b, the lowest point at a lower surface of the right spin mop 41b, and the lowest point at a lower surface of the left spin mop 41a. The weight center MCa of the left-mop motor and the weight center MCb of the right-mop motor may be disposed at an outside of the first quadrangle SQ1.

A part of each spin mop 41 may be overlapped with the body vertically, and the other part of each spin mop 41 may be exposed to an outside of the body.

A ratio of an area where the left spin mop 41a or the right spin mop 41b is vertically overlapped with the body 30 may be preferably 85% to 95% of each spin mop. Specifically, an angle A11 between a line L11 connecting a right end of the right spin mop 41b and a vertical line VL parallel to the central longitudinal line Po at the right end of the body may be 0 to 5 degrees.

A length of a portion of each spin mop 41 exposed to an outside of the body may be preferably ⅟₇ to ½ of a radius of each spin mop 41. The length of the portion of each spin mop 41 exposed to the outside of the body may mean a distance from one end of each spin mop 41 exposed to the outside of the body to an end of the body in a radial axis.

A distance between a geometric center TC and one end of the portion of each spin mop 41 exposed to the outside of the body may be greater than an average radius of the body.

Considering a relationship with a sweep module, a portion of each spin mop exposed to the outside may be located between a lateral side of the body 30 and a rear side of the body 30. That is, quadrants are sequentially positioned in a clockwise direction when viewed from a lower side of the body, the portion of each spin mop exposed to the outside may be a ²⁄₄ quadrant or a ³⁄₄ quadrant of the body 30.

According to the present disclosure, an attachment guider is disposed at a rotating plate to allow a user to visually recognize an attachment position of a mop portion.

According to the present disclosure, an attachment guider includes a plurality of elastic pieces inclined to a lower side or downward in a direction toward a rotation axis. Thus, even when a mop portion is attached by a user at a position out of its original position, a mop portion is moved by elastic force of the plurality of elastic pieces to be close to the original position. Accordingly, even when a user incorrectly attaches a mop portion, a mobile robot can operate normally and damage to the mobile robot can be prevented.

According to the present disclosure, an attachment guider includes a plurality of elastic pieces inclined to a lower side or downward in a direction toward a rotation axis. Thus, even when a mop portion is attached by a user at a position out of its original position and thus a part of the mop portion is protruded, a height of a bottom surface of the mop portion is adjusted uniformly by elastic deformation of the plurality of elastic pieces. Accordingly, even when a user incorrectly attaches a mop portion, a mobile robot can mop a floor.

In addition, according to the present disclosure, mopping efficiency can be enhanced since a mobile robot is supported by a mop module.

Further, according to the present disclosure, stability of a mobile robot in a left-right direction can be secured by a pair of spin mops arranged in a left-right direction. Also, a sweep module spaced apart from a mop module in a front-rear direction are in contact with a floor by an auxiliary wheel, thereby stability of a mobile robot in a front-rear direction can be also increased.

In addition, according to the present disclosure, a sweep module provides friction force against shaking of a mop module in a left-right direction, and thus, a mobile robot can move straight while moving due to the friction force of the mop surface.

In addition, a pair of collection portions where foreign materials are accommodated are provided to be bisymmetrical or bilateral-symmetrical to each other with respect to an imaginary central vertical plane, which is a reference plane in which a pair of spin mops are bisymmetrical or bilateral-symmetrical to each other, thereby achieving an accurate driving control by the pair of spin mops at a left side and a right side and preventing an unexpected eccentric movement.

In addition, according to the present disclosure, a body has a circular shape and a dry-type module does not protrude to an outside of the body. Accordingly, a mobile robot can be freely rotated at any position in a cleaning area and an agitator can have a sufficiently large width. Therefore, a cleaning range can be wide, and collecting a foreign material having a relatively large size and then mopping a floor can be operated.

What is claimed is:

1. A mobile robot, comprising:
   a body;
   a rotating plate rotatably installed on the body and having a lower surface;
   a mop portion attached to the lower surface of the rotating plate; and
   an attachment guider positioned on the lower surface of the rotating plate, wherein the attachment guider is configured to guide the attachment of the mop portion to the lower surface of the rotating plate,
   wherein the attachment guider comprises:
      a guide rim extending around a rotation axis of the rotating plate; and
      an elastic piece extending from the guide rim in a direction towards the rotation axis, wherein a first end of the elastic piece is attached to the guide rim and a second end of the elastic piece is vertically spaced apart from the first end.

2. The mobile robot of claim 1, wherein the elastic piece is configured to provide elastic restoring force to the mop portion.

3. The mobile robot of claim 1, wherein the second end of the elastic piece is spaced apart from the rotation axis.

4. The mobile robot of claim 1, wherein the elastic piece comprises a plurality of elastic pieces, and
   wherein the second ends of the plurality of elastic pieces form a circular pattern having a center at the rotation axis.

5. The mobile robot of claim 1, wherein a width of the elastic piece increases from the second end to the first end.

6. The mobile robot of claim 1, wherein the elastic piece comprises:
   a first portion having one end forming the first end of the elastic piece, the first end being connected to an inner circumference of the guide rim, and the first portion having a first slope;
   a second portion having one end connected to an opposite end of the first portion, and the second portion having a second slope greater than the first slope; and
   a third portion having one end connected to an opposite end of the second portion and an opposite end forming the second end of the elastic piece, the second end being a free end, the third portion having a third slope smaller than the second slope.

7. The mobile robot of claim 6, wherein the second slope of the second portion increases in a direction towards the rotation axis.

8. The mobile robot of claim 6, wherein the opposite end of the third portion is positioned lower than the opposite end of the second portion, and
   wherein the opposite end of the second portion is positioned lower than the opposite end of the first portion.

9. The mobile robot of claim 6, wherein the opposite end of the first portion is positioned lower than the guide rim.

10. The mobile robot of claim 6, wherein a length of the elastic piece is greater than a maximum width of the elastic piece.

11. The mobile robot of claim 1, wherein the elastic piece comprises a plurality of elastic pieces, and
    wherein the plurality of elastic pieces are equally spaced apart from each other.

12. The mobile robot of claim 1, wherein the elastic piece slopes downward in a direction toward a center of the guide rim.

13. The mobile robot of claim 1, wherein the attachment guider includes a metal material.

14. The mobile robot of claim 1, wherein the lower surface of the rotating plate includes a receiving groove recessed towards an upper surface of the rotating plate, the receiving groove being configured to accommodate the attachment guider such that a lower portion of the attachment guider is exposed.

15. The mobile robot of claim 1, wherein the mop portion includes a guide hole at a center of the mop portion, and wherein a portion of the attachment guider is inserted into the guide hole.

16. The mobile robot of claim 1, further comprising:
    a water supply module for supplying water to the mop portion.

17. The mobile robot of claim 1, further comprising:
a mop motor configured to rotate the rotating plate.

18. The mobile robot of claim 1, wherein the rotating plate comprises a left rotating plate and a right rotating plate spaced apart from the left rotating plate, and
   wherein a lower surface of the left rotating plate slopes downward toward a left front side, and a lower surface of the right rotating plate slopes downward toward a right front side.

19. The mobile robot of claim 1, wherein the elastic piece comprises a plurality of elastic pieces spaced apart from each other along a circumference of the guide rim.

20. A mobile robot, comprising:
   a body;
   a rotating plate rotatably installed on the body and having a lower surface;
   a mop portion attached to the lower surface of the rotating plate; and
   an attachment guider installed on the lower surface of the rotating plate, the attachment guider being configured to guide the attachment of the mop portion to the lower surface of the rotating plate,
   wherein the attachment guider comprises:
      a guide rim extending around a rotation axis of the rotating plate; and
      an elastic piece extending from the guide rim in a direction towards the rotation axis and sloping downward in the direction towards the rotation axis.

* * * * *